(12) United States Patent
Kesler et al.

(10) Patent No.: US 11,543,811 B2
(45) Date of Patent: *Jan. 3, 2023

(54) MANUFACTURE MODELING AND MONITORING

(71) Applicant: Etegent Technologies Ltd., Cincinnati, OH (US)

(72) Inventors: Joseph M. Kesler, Cincinnati, OH (US); Thomas D. Sharp, Terrace Park, OH (US); Uriah M. Ligget, Independence, KY (US); Brian Bahr, Cincinnati, OH (US); Chris M. Hodapp, Reading, OH (US); Gary E. Coyan, Terrace Park, OH (US)

(73) Assignee: Etegent Technologies Ltd., Cincinnati, OH (US)

( * ) Notice: Subject to any disclaimer, the term of this patent is extended or adjusted under 35 U.S.C. 154(b) by 1218 days.

This patent is subject to a terminal disclaimer.

(21) Appl. No.: 15/863,534

(22) Filed: Jan. 5, 2018

(65) Prior Publication Data

US 2019/0212721 A1   Jul. 11, 2019
US 2020/0218242 A9   Jul. 9, 2020

Related U.S. Application Data

(63) Continuation of application No. 14/211,600, filed on Mar. 14, 2014, now Pat. No. 9,864,366.
(Continued)

(51) Int. Cl.
*G05B 19/418* (2006.01)
*G05B 19/4063* (2006.01)

(52) U.S. Cl.
CPC ..... *G05B 19/41885* (2013.01); *G05B 19/4063* (2013.01); *G05B 2219/31444* (2013.01);
(Continued)

(58) Field of Classification Search
CPC .......... G05B 19/41885; G05B 19/4063; G05B 2219/31444; G05B 2219/32385;
(Continued)

(56) References Cited

U.S. PATENT DOCUMENTS 4,141,347 A    2/1979   Green et al.
4,649,380 A    3/1987   Penna
(Continued)

OTHER PUBLICATIONS

U.S. Patent and Trademark Office; Office Action in related U.S. Appl. No. 15/799,583 dated Aug. 22, 2019; 13 pages.
(Continued)

*Primary Examiner* — Charles R Kasenge
(74) *Attorney, Agent, or Firm* — Wood Herron & Evans LLP

(57) ABSTRACT

Methods, apparatus, and computer program products for analyzing, monitoring, and/or modeling the manufacture of a type of part by a manufacturing process. Non-destructive evaluation data and/or quality related data collected from manufactured parts of the type of part may be aligned to a simulated model associated with the type of part. Based on the aligned data, the manufacturing process may be monitored to determine whether the manufacturing process is operating properly; aspects of the manufacturing process may be spatially correlated to the aligned data; and/or the manufacturing process may be analyzed.

18 Claims, 44 Drawing Sheets

Related U.S. Application Data

(60) Provisional application No. 61/791,139, filed on Mar. 15, 2013.

(52) U.S. Cl.
CPC ............. *G05B 2219/32359* (2013.01); *G05B 2219/32368* (2013.01); *G05B 2219/32385* (2013.01)

(58) Field of Classification Search
CPC .......... G05B 2219/32368; G05B 2219/32359; Y02P 90/02
See application file for complete search history.

(56) References Cited

U.S. PATENT DOCUMENTS

| | | | |
|---|---|---|---|
| 4,872,130 A | 10/1989 | Pagano | |
| 4,876,728 A | 10/1989 | Roth | |
| 5,027,110 A | 6/1991 | Chang et al. | |
| 5,028,100 A | 7/1991 | Valleau et al. | |
| 5,042,305 A | 8/1991 | Takishita | |
| 5,088,045 A | 2/1992 | Shimanaka et al. | |
| 5,146,556 A | 9/1992 | Hullot et al. | |
| 5,168,530 A | 12/1992 | Peregrim et al. | |
| 5,293,326 A | 3/1994 | Arima et al. | |
| 5,371,462 A | 12/1994 | Hedengren et al. | |
| 5,459,410 A | 10/1995 | Henley | |
| 5,475,613 A | 12/1995 | Itoga et al. | |
| 5,541,846 A | 7/1996 | Secrest | |
| 5,550,376 A | 8/1996 | Gupta et al. | |
| 5,568,263 A | 10/1996 | Hanna | |
| 5,608,814 A | 3/1997 | Gilmore et al. | |
| 5,619,429 A | 4/1997 | Aloni et al. | |
| 5,640,199 A | 6/1997 | Garakani et al. | |
| 5,655,084 A | 8/1997 | Pinsky et al. | |
| 5,706,213 A | 1/1998 | Takakura et al. | |
| 5,734,742 A | 3/1998 | Asaeda et al. | |
| 5,848,115 A | 12/1998 | Little et al. | |
| 6,064,759 A | 5/2000 | Buckley et al. | |
| 6,259,960 B1 | 7/2001 | Inokuchi | |
| 6,314,379 B1 | 11/2001 | Hu et al. | |
| 6,378,387 B1 | 4/2002 | Froom | |
| 6,508,403 B2 | 1/2003 | Arsenault et al. | |
| 6,546,137 B1 | 4/2003 | Lai et al. | |
| 6,549,820 B1 | 4/2003 | Barrett et al. | |
| 6,714,679 B1 | 3/2004 | Scola et al. | |
| 6,760,639 B2 | 7/2004 | Kallela et al. | |
| 6,807,453 B1* | 10/2004 | Suzuki | G06Q 10/04 700/109 |
| 6,820,023 B1 | 11/2004 | Klassen et al. | |
| 6,848,081 B1 | 1/2005 | Yoda et al. | |
| 6,882,745 B2 | 4/2005 | Brankner et al. | |
| 6,985,238 B2 | 1/2006 | Isaacs et al. | |
| 7,024,032 B2 | 4/2006 | Kidd et al. | |
| 7,027,642 B2 | 4/2006 | Rubbert et al. | |
| 7,069,263 B1 | 6/2006 | Yee et al. | |
| 7,116,825 B2 | 10/2006 | Lee et al. | |
| 7,149,342 B2 | 12/2006 | Biazik et al. | |
| 7,162,373 B1 | 1/2007 | Kadioglu et al. | |
| 7,327,869 B2 | 2/2008 | Boyer | |
| 7,409,081 B2 | 8/2008 | Ogi | |
| 7,499,772 B2 | 3/2009 | Wilcox et al. | |
| 7,801,353 B2 | 9/2010 | Almogy et al. | |
| 7,865,316 B2 | 1/2011 | Turner et al. | |
| 8,108,168 B2 | 1/2012 | Sharp et al. | |
| 8,473,236 B2 | 6/2013 | Kesler et al. | |
| 8,521,480 B2 | 8/2013 | Kesler et al. | |
| 8,983,794 B1 | 3/2015 | Motzer et al. | |
| 9,285,296 B2 | 3/2016 | Georgeson et al. | |
| 9,864,366 B2* | 1/2018 | Kesler | G06Q 10/06 |
| 2002/0088282 A1 | 7/2002 | Zayicek et al. | |
| 2002/0118892 A1 | 8/2002 | Nguyen et al. | |
| 2004/0073411 A1 | 4/2004 | Alston et al. | |
| 2004/0117133 A1 | 6/2004 | Burkhardt et al. | |
| 2004/0121496 A1 | 6/2004 | Brankner et al. | |
| 2007/0003117 A1 | 1/2007 | Wheeler et al. | |
| 2007/0112539 A1 | 5/2007 | Kirchner | |
| 2007/0280527 A1 | 12/2007 | Almogy et al. | |
| 2008/0263469 A1 | 10/2008 | Nasle et al. | |
| 2008/0306709 A1 | 12/2008 | Fisker et al. | |
| 2009/0048789 A1 | 2/2009 | Yu et al. | |
| 2009/0287427 A1 | 11/2009 | Dubois et al. | |
| 2010/0097662 A1 | 4/2010 | Churilla et al. | |
| 2010/0235111 A1* | 9/2010 | Sharp | G06F 17/10 702/35 |
| 2010/0235112 A1* | 9/2010 | Kesler | G06Q 10/06 702/35 |
| 2010/0235153 A1* | 9/2010 | Sharp | G06Q 10/04 703/6 |
| 2010/0250148 A1* | 9/2010 | Meredith | G01M 5/0033 702/34 |
| 2010/0307249 A1* | 12/2010 | Lesage | G01N 29/4481 73/623 |
| 2011/0029114 A1 | 2/2011 | Rose et al. | |
| 2011/0125477 A1 | 5/2011 | Lightner et al. | |
| 2013/0289943 A1* | 10/2013 | Sharp | G06Q 10/06 702/189 |
| 2014/0022281 A1* | 1/2014 | Georgeson | G06F 3/1454 345/633 |
| 2014/0200832 A1* | 7/2014 | Troy | G01N 29/00 702/38 |

OTHER PUBLICATIONS

International Searching Authority, International Search Report and Written Opinion of the International Searching Authoirty; or the Declaration, dated Mar. 10, 2010, 20 pgs.

Roth, D.J., Tokars, R.P., Martin, R.E., Rauser, R.W., Aldrin, J.C., Ultrasonic Phased Array Inspection Simulations of Welded Components at NASA, Mar. 3, 2009, retrieved from the Internet Feb. 22, 2010, 19 pgs.

Buckley, J., Servent, R., "Improvements in Ultrasonic Inspection of Resistance Spot Welds," The British Institute of Non-Destructive Testing, Feb. 2009, retrieved from the Internet Feb. 22, 2010, 11 pgs.

Deng, W., Matuszewski, B.J., Shark, L-K., Smith, J.P. and Cavaccini, G., Multi-Modality NDT Image Fusion and It's Mapping on Curved 3D CAD Surface, Wrold Conference NDT, 2004. (8 pages).

Deng, W., Shark, L-K, Matuszewski, B.J., Smith J.P. and Cavaccini, G., CAD Model-Based Inspection and Visualisation for 3D Non-Destructive Testing of Complex Aerostructures, Insight vol. 46, Mar. 2004, pp. 157-161. (5 pages).

Matuszewski, B.J., Shark, L-K, Smith, J.P and Varley, M.R., Automatic Fusion of Multiple Non-Destructive Testing Images and CAD Models, Image Processing and it's Applications, Conference Publication No. 465, 1999. (5 pages).

Noble, A., Gupta, R., Mundy, J., Schmitz, A., Hartley, R. and Hoffman, W., CAD-Based Inspection Using X-Ray Stereo, IEEE International Conference on Robotics and Automation 0-7803-1965-6195, 1995. (6 pages).

Power INSPECT, dowloaded from www.delcam.com on Sep. 2008. (2 pages).

Kesler, Joseph M., Automated Alignment of Aircraft Wing Radiography Images Using a Modified Rotation, Scale, and Translation Invariant Phase Correlection Algorithm Employing Local Entropy for Peak Detection, Thesis submitted to Department of Electrical and Computer Engineering, Unversity of Cincinnati, College of Engineering, Division of Graduate Studies, Aug. 12, 2008. (79 pages).

U.S. Patent and Trademark Office, Office Action issued in related U.S. Appl. No. 12/617,315, dated May 31, 2012.

U.S. Patent and Trademark Office, Office Action issued in related U.S. Appl. No. 12/617,315, dated Oct. 22, 2012.

U.S. Patent and Trademark Office, Notice of Allowance issued in related U.S. Appl. No. 12/617,315, dated Apr. 23, 2013.

F. Lu, Globally consistent range scan alignment for environment mapping, Apr. 17, 1997, p. 1-31.

(56) References Cited

OTHER PUBLICATIONS

U.S. Patent and Trademark Office, Office Action issued in related U.S. Appl. No. 12/403,274, dated Aug. 23, 2011.
U.S. Patent and Trademark Office, Notice of Allowance issued in related U.S. Appl. No. 12/403,274, dated Nov. 30, 2010.
U.S. Patent and Trademark Office, Office Action issued in related U.S. Appl. No. 12/557,136, dated Aug. 31, 2012.
U.S. Patent and Trademark Office, Office Action issued in related U.S. Appl. No. 12/557,136, dated Dec. 13, 2012.
U.S. Patent and Trademark Office, Notice of Allowance issued in related U.S. Appl. No. 12/557,136, dated Feb. 25, 2013.
http:/www.merriam-webster.com/dictionary/asset, p. 1, Dec. 7, 2012.
Supplementary European Search Report, European Search Report and Written Opinion of the European Patent Office, dated Dec. 13, 2012.
U.S. Patent and Trademark Office, Office Action in U.S. Appl. No. 14/211,600, dated Sep. 21, 2016.

\* cited by examiner

FIG. 39C

MANUFACTURE MODELING AND MONITORING

CROSS-REFERENCE TO RELATED APPLICATION

This application is a Continuation of U.S. application Ser. No. 14/211,600 filed on Mar. 14, 2014 by Joseph M. Kesler et al., and that Application claims the benefit of U.S. Provisional Application No. 61/791,139 filed on Mar. 15, 2013 by Joseph M. Kesler et al., the entire disclosure of those Applications being incorporated by reference herein in their entireties.

FIELD OF THE INVENTION

The present invention relates to computing systems, and more particularly to the modeling and monitoring of part manufacture with inspection data and/or non-destructive evaluation ("NDE") data.

BACKGROUND OF THE INVENTION

Non-destructive Evaluation and Inspection ("NDE/I") technologies generally provide ways to nondestructively scan, image, sense or otherwise evaluate characteristics of materials and/or components. In particular, NDE/I technologies may be used to detect minute flaws and defects in those materials and/or component parts. As such, NDE/I technologies have become increasingly used to help assure structural and functional integrity, safety, and cost effective sustainment of various assets, during both initial manufacture and operational service.

Non-destructive evaluation ("NDE") data is often based on raw data gathered from NDE data collection devices and may include x-ray images of at least a portion of a part or asset, such as the wing of an aircraft or some other type of part that may be manufactured. NDE data is often large in size, associated with merely a portion of the part, and also must be matched with a particular location on the part. Such large data sets of NDE data become increasingly difficult to manage, particularly if such NDE datasets are collected for many parts manufactured in a manufacturing process. In addition, other types of quality related data, including for example visual inspection data from an inspector, may further complicate management and analysis of NDE data and/or quality related data on a large scale, such as in a manufacturing environment.

To determine wear and tear, structural damage and/or other irregularities of a part may require the analysis of tens (if not hundreds) of individual datasets of NDE data and/or quality related data. This may result in numerous datasets of NDE data and/or quality related data for each manufactured part of a manufacturing process, and thus even more datasets of NDE data and/or quality related data for a plurality of parts manufactured by the manufacturing process. As each dataset is analyzed, this results in large amounts of data that are difficult to categorize and otherwise analyze in whole. Moreover, the NDE data and/or other such quality related data may be discarded after it has been analyzed, and thus there is often little inspection data related to the manufacture of parts over time.

To account for such data management issues, in some conventional systems, NDE data and/or quality related data may be discarded or ignored if such data does not correspond to a part on which a manufacturing defect has been detected. Moreover, in conventional systems, analysis of NDE data and/or quality related data is time consuming due to the cumbersome nature of the data. Hence, when utilizing NDE data and/or other such types of inspection data for parts manufactured in a manufacturing process, the usefulness of such NDE data and/or other such types of inspection data is limited due to the inefficiencies associated with management and analysis of such data.

Consequently, there is a continuing need to manage and analyze inspection data for a manufacturing process.

SUMMARY OF THE INVENTION

Embodiments of the invention provide for a method, apparatus, and program product to manage and analyze non-destructive evaluation ("NDE") data and/or other types of quality related data corresponding to parts manufactured by a manufacturing process to thereby monitor and model the manufacturing process.

Consistent with embodiments of the invention, a manufacture of a type of part may be monitored. In these embodiments, an NDE dataset associated with a particular part of the type of part may be received, where each NDE dataset for the part includes NDE data, where such NDE data may be referred to herein as one or more NDE data points, and each NDE dataset may correspond to data (i.e., raw data) collected during non-destructive evaluation of the particular part. The NDE dataset may be aligned to a simulated model associated with the type of part, where such aligning may include aligning NDE data points of the dataset to corresponding simulated locations on the simulated model. Respective NDE data points of the aligned NDE data points may be analyzed to determine a spatially correlated statistic corresponding to the particular part based at least in part on the respective NDE data points and the corresponding simulated locations of the respective NDE data points for the particular part. The spatially correlated statistic may be determined for a group of proximate (i.e., proximately aligned on the simulated model) NDE data points, where the spatially correlated statistic may be based at least in part on a measurement value of each NDE data point. Output data may be generated based at least in part on the spatially correlated statistic.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIGS. 39A-C are diagrammatic illustrations of the example graphical user interface of FIG. 38 where the display representation of the simulated model includes a visual representation of aligned indications of potential problems on the simulated model, and FIG. 39B is an enlarged view of a portion of FIG. 39A.

Figure 1:
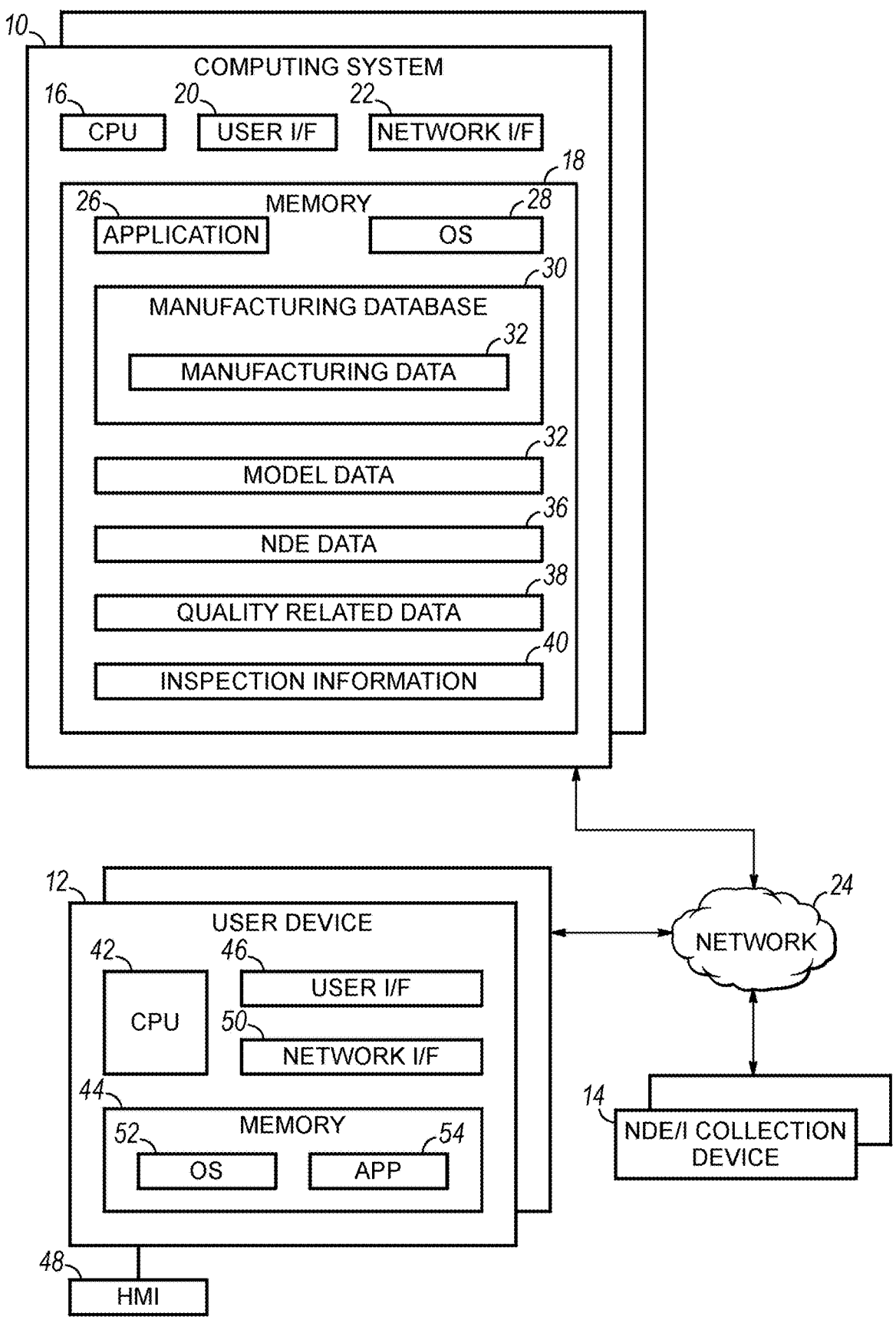
FIG. 1 is a diagrammatic illustration of a computing system, user device, and NDE/I collection devices configured to collect and analyze non-destructive evaluation ("NDE") data consistent with embodiments of the invention to analyze, model, and/or monitor a manufacturing process.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

Embodiments of the invention provide for a method, apparatus, and program product to model and/or monitor a manufacturing process using NDE data and/or quality related data collected from parts manufactured by the manufacturing process. Furthermore, embodiments of the invention organize and align such data by aligning the data to a simulated model of a type of part associated with the manufactured parts. In some embodiments, NDE data that corresponds to raw data collected by one or more NDE/I devices during non-destructive evaluation of one or more of the manufactured parts. In some embodiments, other types of quality related data may be utilized. For example, quality related data may comprise indication data collected during inspection by one or more personnel tasked with inspecting parts manufactured in the manufacturing process (e.g., quality control engineers/technicians). The indication data may comprise indications of potential problems at locations on parts of the type of part. For example, such quality related data may include visually detected defects indicated on non-compliance reports generated during inspection of one or more of the manufactured parts.

In general, some embodiments of the invention may be described with respect to NDE datasets; however, the invention is not so limited. Quality related data, not necessarily corresponding to raw data collected by NDE/I devices may be utilized consistent with some embodiments of the invention. For example, some embodiments of the invention may analyze and/or manage information derived from non-compliance reports corresponding to a manufacturing process. These non-compliance reports may comprise indication data that includes one or more indications of one or more visually detected defects on parts of a type of part manufactured by the manufacturing process. In general, such non-compliance reports may be generated by a quality inspector trained to inspect parts manufactured by the manufacturing process. Moreover, other types of relevant quality related data may be included in a non-compliance report in addition to or in place of indications of visually detected defects depending on the type of part and the manufacturing process. As another example, defects/indications may be detected via ultrasonic scanning/testing and may be included in a non-compliance report and/or input directly to a simulated model via user input, where an operator may manually enter such defects/indications.

In general, embodiments of the invention align one or more NDE datasets comprising NDE data points and/or one or more quality related datasets comprising quality related data points (i.e., indications of potential problems) to a simulated model associated with a type of manufactured part. For example, a portion of a type of part may be represented by the simulated model, and NDE data points collected during non-destructive evaluation of a manufactured part of the type of part may be aligned to corresponding simulated locations on the simulated model. Therefore, aligning the NDE dataset and/or quality related dataset to the simulated model comprises aligning at least one data point of the dataset to a corresponding location on the simulated model. In general, at least a subset of data points of the dataset may be aligned to a corresponding location on the simulated model.

According to embodiments of the invention, NDE data and/or quality related data may be aligned to a simulated model. Methods and apparatus for aligning NDE data and/or quality related data to a simulated model is described in further detail in U.S. Pat. No. 8,108,168 to Sharp et al., entitled "MANAGING NON-DESTRUCTIVE EVALUATION DATA," filed Mar. 12, 2009, which is incorporated by reference herein in its entirety.

In some embodiments, the NDE data and/or quality related data may be associated with inspection information. The inspection information may associate the NDE data and/or quality related data with particular information that may be useful to align the NDE data, indicate potential problems, and/or otherwise provide data about the type of part. In some embodiments, the inspection information may include data associated with a location of a particular part to which the associated data corresponds, an identification of the particular part, a history of the particular part, a time at which the NDE data was captured, a date at which the NDE data was captured, an identification of an NDE session associated with the NDE data, an annotation associated with the NDE data (e.g., such as an annotation that includes an indication of a potential problem), an identification of an inspector associated with the NDE data, an identification of a series of NDE data in which the NDE data was captured, an identification of the location of the NDE data in the series of NDE data, an orientation associated with the NDE data, a unique identification of the NDE data, an identification of the modality of NDE data collection device used to capture the NDE data, and/or combinations thereof. The inspection information may be determined automatically, and/or captured by a computer, during, or after the capture of the NDE data.

In some embodiments, inspection information may include at least one indication of a potential problem and a location thereof on the NDE data, such that the indication may be aligned to a corresponding simulated location on the simulated model. In some embodiments, the at least one indication aligned to the simulated model may be included in a display representation associated with the type of part and based on the simulated model. For example, the display representation may comprise a three dimensional representation of the type of part that may be output to a computer display or other such viewing device. In this example, an indication of the potential problem associated with the inspection information may be a visual indicator located at the corresponding location on the three-dimensional representation.

In some embodiments, a plurality of datasets of NDE data (e.g., a plurality of individual instances of NDE data), at least some of which may be associated with inspection information, may be aligned to the simulated model. As such, indications in turn associated with the inspection information of the plurality of datasets may be viewed for trends of indications, where such trends may correspond to manufacturing trends associated with the manufacture of the type of part by the manufacturing process.

Based on aligned NDE data some embodiments of the invention may monitor a manufacturing process. In these embodiments, a dataset of NDE data may be received for each of a plurality of manufactured parts of a type of part manufactured by the manufacturing process. Embodiments of the invention may align the received data for each manufactured part to the simulated model. A spatially correlated statistic may be determined for each part based on the aligned NDE data, and a manufacturing trend may be determined based on the spatially correlated statistics and monitored for the manufacturing process.

A spatially correlated statistic may generally correspond to a value associated with an area, region, volume, and/or other such spatially related feature of the type of part. In general, the spatially correlated statistic may define a value for such spatially related feature that is based at least in part on NDE data and/or quality related data collected for the spatially related feature. For example, each part of a type of part may include a particular portion for which NDE data collected for the part indicates a measured value of the porosity at a plurality of locations corresponding to the particular portion. Embodiments of the invention may determine an average porosity for the particular portion of each part based on the NDE data collected for each part at the plurality of locations. Other types of spatially correlated statistics may be determined depending on the type of NDE data collected and/or the type of part, including for example, average thickness, average distance between specified features, average amplitude, average quantity of indications of potential problems, density of indications of potential problems, a standard deviation of any of the previously mentioned values, and/or other such types of statistical data that may be determined based on the types of collected NDE data.

For example, based on the spatially correlated statistics, the manufacturing trend may indicate that while the manufacturing process is presently producing acceptable parts, the manufacturing trend indicates that the manufacturing process will begin producing unacceptable parts in the future. Hence, based on the spatially correlated statistics, embodiments of the invention may determine whether the manufacturing process is operating properly, and if the manufacturing trend indicates that a problem is likely to develop, actions may be taken prior to the manufacturing process possibly manufacturing unacceptable parts.

In some embodiments, a manufacturing process may be modeled based at least in part on NDE data collected for one or more parts of a type of part manufactured by the manufacturing process. In these embodiments, at least one NDE dataset may be received, where each NDE dataset comprises NDE data points of NDE data that corresponds to data collected during non-destructive evaluation of the a respective part of the type of part. The NDE data points may be aligned to corresponding simulated locations on a simulated model associated with the type of part. In these embodiments, the NDE data may include associated inspection information that indicates one or more potential problems detected on the particular part. In addition, manufacturing data may be associated with the simulated model, where the manufacturing data may indicate various information associated with the manufacturing process and one or more corresponding simulated locations on the simulated model. For example, the manufacturing data may indicate a manufacturing step of the manufacturing process associated with one or more corresponding simulated locations on the simulated model. In this example, if a manufacturing step of the manufacturing process involved applying an adhesive to a particular location on each manufactured part, the manufacturing data may indicate at a corresponding simulated location on the simulated model the adhesive application step. Hence, in this example, if a potential problem were indicated at a corresponding simulated location associated with the adhesive application step as indicated in the manufacturing data, the modeling of the manufacturing process may indicate that a problem is potentially occurring in the adhesive application step.

Therefore, as illustrated by this example, NDE data and/or inspection information may be organized spatially on the simulated model, and manufacturing data may also be organized spatially on the simulated model, and as a result, the manufacturing process may be modeled on the spatially simulated model such that NDE data or other such data may be correlated to aspects of the manufacturing process. The manufacturing data may include for example, data that indicates a manufacturing step of the manufacturing process, data that indicates a manufacturing apparatus utilized in the manufacturing process, data indicating a manufacturing tool utilized in the manufacturing process, data indicating a process parameter of the manufacturing process, data indicating evaluation equipment utilized in collecting raw data corresponding to the NDE data for parts manufactured by the manufacturing process, and/or other such types of information related to the manufacturing process.

Hardware and Software Environment

Turning to the drawings, wherein like numbers denote like parts throughout the several views, FIG. 1 illustrates a hardware and software environment for one or more computing systems 10, one or more user devices 12 and one or more NDE/I collection devices 14 consistent with some embodiments of the invention. In general, embodiments of the invention may be described in the context of a single computing system 10 and/or user device 12, but as shown in FIG. 1, the invention is not so limited. In particular, embodiments of the invention may be implemented in distributed processing systems, including for example, a plurality of interconnected computing systems 10 and/or user devices 12 that are configured to perform operations consistent with embodiments of the invention in a distributed manner (i.e., across a plurality of distributed processors using data stored to and read from a plurality of distributed memory locations on a plurality of memory devices).

In general, the NDE/I collection devices 14 may comprise devices configured to collect non-destructive evaluation/inspection data. Such NDE/I collection devices may comprise one or more cameras (e.g., to capture still images for visualization, videos for visualization, and/or for sherography, etc.), thermograpic cameras (e.g., to capture a thermographic image), borescopes, fiberscopes, x-ray machines (e.g., to capture still images, to use with computed radiography, to use with direct and/or digital radiography, etc.), ultrasound machines, CT scanners, MRI machines, eddy current detectors, liquid penetrant inspection systems, magnetic-particle inspection systems, coordinate measuring machines, and/or other such types of non-destructive evaluation/inspection devices. As such, the types of NDE data included in NDE datasets may vary, and embodiments of the invention may model and/or monitor manufacture of a type of part by processing various types of NDE data.

Computing system 10 and/or user device 12, for purposes of this invention, may represent any type of computer, computing system, server, disk array, or programmable device such as a multi-user computer, single-user computer, handheld device, networked device, mobile phone, gaming system, etc. Computing system 10 and/or user device 12 may be implemented using one or more networked computers, e.g., in a cluster or other distributed computing system. Hence, it should be appreciated that the computing system 10 and/or user device 12 may also include other suitable programmable electronic devices consistent with the invention With reference to FIG. 1, as shown, the computing system 10 may comprise at least one processing unit (CPU') 16 and memory 18. Each processor 16 may be one or more microprocessors, micro-controllers, field programmable gate arrays, or ASICs, while memory 18 may include random access memory (RAM), dynamic random access memory (DRAM), static random access memory (SRAM), flash memory, and/or another digital storage medium. As such, memory 14 may be considered to include memory storage physically located elsewhere in computer 10, e.g., any cache memory in the at least one CPU 16, as well as any storage capacity used as a virtual memory, e.g., as stored on a mass storage device, a computer, or another controller in communication with the computing system. In addition, the computing system 10 may comprise a user interface 20, where the user interface 20 generally comprises one or more input/output devices for interfacing with a user, such as a display, a keyboard, a mouse, speakers, a microphone, a video camera, a touch input based device (e.g., a touchscreen), and/or other such devices. Furthermore, the computing system 10 may comprise a network interface 22, where the network interface 22 is generally configured to communicate data over a communication network 24. Network 24 generally comprises one or more interconnected communication networks, including for example, a cellular communication network, a local area network, a wide area network, public networks (e.g., the Internet), an enterprise private network, high speed data communication interconnects, and/or other such communication networks.

The memory 18 stores at least one application 26 and/or an operating system 28, where the application 26 and/or operating system generally comprise program code in the form of instructions that may be executed by the processor 16 to cause the processor to perform one or more operations consistent with embodiments of the invention. For example, the application 26 and/or operating system 28 may include program code in the form of executable instructions that may cause the processor to monitor and/or model a manufacturing process based on data received at the computing system 10 and/or processor 16. It will be appreciated that various applications, components, programs, objects, modules, etc. may also execute on one or more processors in another networked device coupled to computing system 10 via the network 24, e.g., in a distributed or client-server computing environment In general, the memory 18 of the computing system 10 may store data utilized by embodiments of the invention. For example, the CPU 16 may read from and/or write data to the memory 18 when performing one or more operations consistent with some embodiments of the invention. As discussed above, the memory 18 may generally represent memory accessible by the computing system 10, such as accessible databases connected over the communication network 24 and/or other such data communication networks. Furthermore, the memory 18 includes a database management system in the form of a computer program that, when executing as instructions on the processor 16, is used to read from and/or write to accessible data structures (e.g., databases) of the memory. As shown in FIG. 1, the memory 18 may store a manufacturing database 30, that stores manufacturing data 32 associated with a manufacturing process that manufactures a type of part. In addition, the memory 18 may store model data 34 associated with the type of part manufactured in the manufacturing process, NDE data 36 associated with the type of part and/or manufacturing process, quality related data 38 associated with the type of part and/or manufacturing process, and/or inspection information 40 associated with the type of part and/or manufacturing process.

While in FIG. 1, the manufacturing database 30, model data 34, NDE data, quality related data 36, and inspection information 40 are illustrated as separate data structures, the invention is not so limited. The computing system 10 may comprise one or more data structures configured as database structures storing the data described herein. Such one or more databases may be configured in any database organization and/or structure, including for example, relational databases, hierarchical databases, network databases, and/or combinations thereof.

As shown in FIG. 1, each user device 12 generally comprises a processor (CPU') 42 and a memory 44. In general, the user device 12 may be a personal computer, laptop computer, hand-held computing device, tablet computer, and/or other such types of computing devices. As shown, the user device 12 may comprise a user interface 46 configured to receive input data from a user and output data to a user via one or more input/output devices. Such input/output devices, include, for example a keyboard, mouse, display, touch screen, speakers, microphone, etc. Such input/output devices are generically represented by a human machine interface (HMI') 48 in FIG. 1. Furthermore, the user device 12 may include a network interface 50, where, as described above with respect to the computing system 10, the network interface is configured to transmit data to and receive data from the communication network 24. For example, the computing system 10 and the user device 12 may communicate data therebetween over the communication network 24 via the network interfaces 22, 50. Furthermore, the user device 12 may be under the control of an operating system ('OS') 52 stored in the memory 44. As described previously, the operating system 52 and/or an application 54 stored in the memory 44 may comprise program code in the form of executable instructions, that, when executed by the processor 42 may cause the processor to perform or cause to be performed one or more operations consistent with embodiments of the invention.

Figure 2:
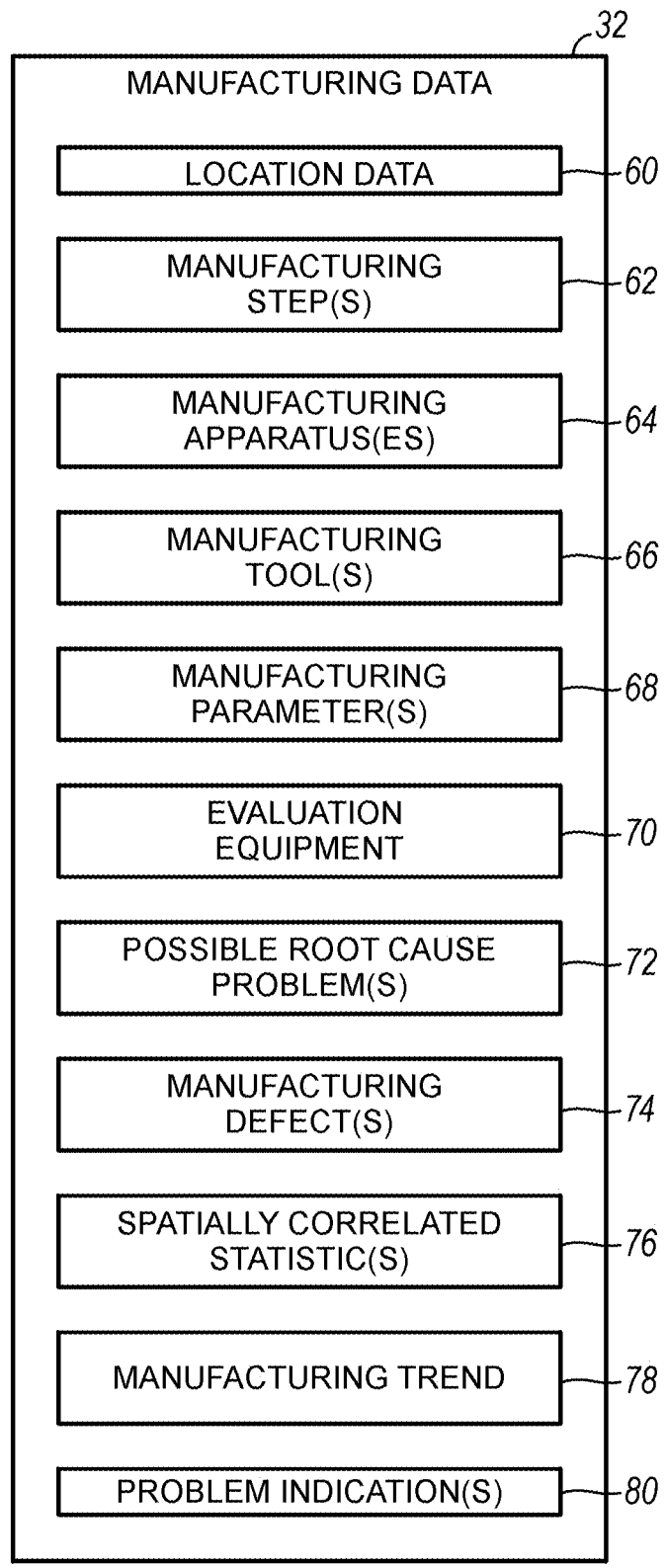
FIG. 2 is a block diagram of that illustrates data components of manufacturing data that may be generated and/or processed by the computing system and/or user device of FIG. 1 to analyze, model, and/or monitor a manufacturing process.

FIG. 2 is a diagrammatic illustration of one embodiment of a plurality of components of manufacturing data 32 consistent with embodiments of the invention. As will be described in further detail, herein the manufacturing data may generally comprise data associated with one or more aspects of a manufacturing process and/or a type of part. As mentioned previously, the manufacturing data 32 may be stored in a manufacturing database 30. As such, in some embodiments of the invention, the data illustrated as a component of the manufacturing data 32 may be stored relationally, such that the relationship(s) between the different types of data of the manufacturing data 32 may be stored. As shown, the manufacturing data 32 may store location data 60, where location data 60 may identify one or more simulated locations on a simulated model of the type of part. In general, location data 60 may be related to one or more other types of data to thereby correlate/associate such data to one or more simulated locations on the simulated model of the type of part.

In some embodiments, the manufacturing data 32 may store manufacturing step data 62 that identifies one or more manufacturing steps associated with the manufacturing process and/or type of part. Similarly, the manufacturing data 32 may comprise manufacturing apparatus data 64 that identifies one or more manufacturing apparatuses associated with the manufacturing process and/or type of part. In general, a manufacturing apparatus may be equipment utilized in the manufacturing process (e.g., cutting tools, molds, drilling tools, resin pumps, vacuum pumps, autoclaves, adhesive dispensers, carbon fiber tape rollup machines, carbon fiber placement machines, industrial ovens for curing, etc.) The manufacturing data 32 may comprise manufacturing tool data 66 that identifies one or more manufacturing tools associated with the manufacturing process and/or the type of part. In general, a manufacturing tool may be a portion of equipment that is replaceable/consumable and/or experience wear (e.g., drill bits, cutting blades, mold seams, thermocouples, seals/gaskets, vacuum ports, resin flow paths, resin injection ports, mold planes, caul planes, mandrel sections, bladders, injection nozzles, etc.) The manufacturing data 32 may comprise manufacturing parameter data 68 that identifies one or more manufacturing parameters associated with the manufacturing process and/or the type of part. In general a manufacturing parameter and/or manufacturing step parameter may be considered a parameter that may affect the manufacturing process (e.g., temperature in a curing oven, pressure in a mold, ratio for an adhesive mixture, pressure of a water cutting apparatus, age of material, temperature of material, viscosity of a resin, anomalies in material structure, etc.). Moreover, an additional consideration with respect to the manufacturing parameters may be the intended manufacturing parameter as compared to an actual manufacturing parameter, where embodiments of the invention may analyze, model, and/or monitor a manufacturing process based on combinations thereof. Furthermore, a manufacturing parameter may comprise anomalies reported by the manufacturing equipment (e.g., a manufacturing apparatus, an NDE/I collection device, etc.), including for example, data stored in machine logs for manufacturing equipment used in the manufacturing process. These logs may indicate events (i.e., anomalies) that may affect the manufacture of parts by the manufacturing process. For example, if a manufacturing apparatus of a manufacturing process was a fiber placement system, a machine log for such fiber placement system may include data related to loss of tension, fiber slippage, compaction pressure, deviations in velocity of fiber layup, and/or other such events/anomalies that may affect the manufacture of a part in the manufacturing process. The manufacturing parameter data may store data related to such anomalies for the various manufacturing equipment utilized in the manufacturing process. The manufacturing data 32 may comprise evaluation equipment data 70 that identifies one or more evaluation equipment (i.e., NDE/I devices) 44 associated with the manufacturing process and/or the type of part. The manufacturing data 32 may comprise possible root cause problem data 72 that identifies one or more root cause problems associated with the manufacturing process and/or the type of part. The manufacturing data 32 may comprise manufacturing defect data 74 that identifies one or more manufacturing defects associated with the manufacturing process and/or type of part. In general, the one or more identified manufacturing defects may be based on previous analysis of the manufacturing process (i.e., historical data for previously manufactured parts). The manufacturing data 32 may comprise spatially correlated statistic data 76 that indicates one or more spatially correlated statistics associated with the manufacturing process and/or type of part. The manufacturing data 32 may comprise manufacturing trend data 78 that indicates one or more manufacturing trends associated with the manufacturing process and/or type of part. Furthermore, the manufacturing data 32 may comprise problem indication data 80 that indicates one or more potential problems that may be associated with the type of part.

As discussed, the manufacturing data 32 may be organized relationally such that relationships between the types of data may be indicated. For example, location data 60 may be associated with manufacturing step data 62 to thereby indicate an association between a particular manufacturing step identified in the manufacturing step data 62 and one or more simulated locations on the type of part indicated by the associated location data 60. Building on the example, manufacturing apparatus data 64 may be relationally associated with the manufacturing step data 62 and the location data 60 to thereby indicate an association between the particular manufacturing step, the one or more simulated locations, and a particular manufacturing apparatus identified in the manufacturing apparatus data 64. Similarly, possible root cause problem data 72 may be relationally associated manufacturing step data 62 to thereby identify one or more possible root cause problems that are associated with a particular manufacturing step identified in the relationally associated manufacturing step data 62. As illustrated by these examples, in general, the manufacturing data 32 may indicate relationships between the various types of data, and furthermore, the manufacturing data 32 may be associated with a simulated model of the type of part to thereby spatially organize/represent the data on the simulated model of the type of part. In some embodiments, a display representation of the simulated model and manufacturing data may be generated, and the display representation may be output on a display for a user.

In general, the routines executed to implement the embodiments of the invention, whether implemented as part of an operating system or a specific application, component, algorithm, program, object, module or sequence of instructions, or even a subset thereof, will be referred to herein as "computer program code" or simply "program code." Program code typically comprises one or more instructions or sequence of operations that are resident at various times in memory and storage devices in a computer, and that, when read and executed by at least one processor in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies regardless of the particular type of computer readable media used to actually carry out the invention. Examples of computer readable media include, but are not limited to, non-transitory, recordable type media such as volatile and non-volatile memory devices, floppy and other removable disks, hard disk drives, tape drives, optical disks (e.g., CD-ROM's, DVD's, HD-DVD's, Blu-Ray Discs), among others.

In addition, various program code described hereinafter may be identified based upon the application or software component within which it is implemented in specific embodiments of the invention. However, it should be appreciated that any particular program nomenclature that follows is merely for convenience, and thus embodiments of the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, Application Programming Interfaces [APIs], applications, applets, etc.), it should be appreciated that embodiments of the invention are not limited to the specific organization and allocation of program functionality described herein.

Those skilled in the art will recognize that the environments illustrated in FIGS. 1-2 are not intended to limit the embodiments of the invention. Indeed, those skilled in the art will recognize that other alternative hardware and/or software environments may be used without departing from the scope of the invention.

Software Description and Flows

FIGS. 3-36 provide flowcharts that illustrate sequences of operations that may be performed by the computing system 10 and/or user device 12 of FIG. 1. In general, the flowcharts of FIGS. 3-36 illustrate operation of possible implementations of systems, methods, and computer program products according to various embodiments of the invention. In this regard, each block in a flowchart may represent a module, segment, or portion of program code, which comprises one or more executable instructions for implementing the specified logical function(s). Furthermore, any blocks of the below mentioned flowcharts may be deleted, augmented, made to be simultaneous with another, combined, re-ordered, or be otherwise altered in accordance with the principles of the invention.

Figure 3:
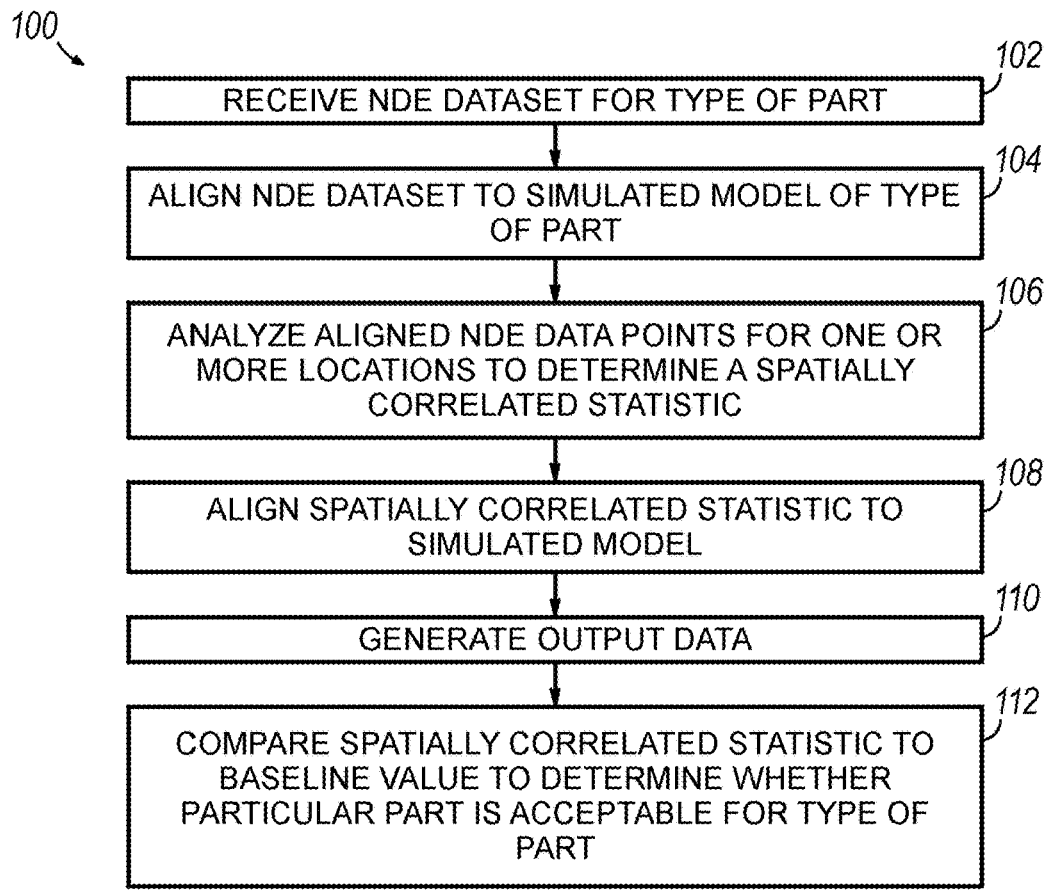
FIG. 3 is a flowchart that illustrates a sequence of operations that may be performed by the computing system and/or user device of FIG. 1 to monitor the manufacturing process.

FIGS. 3-12 provide flowcharts that illustrate a sequence of operations that may be performed by the computing system 10 consistent with embodiments of the invention to monitor a manufacturing process that manufactures a type of part. Turning now to FIG. 3, which provides flowchart 100, the computing system 10 receives an NDE dataset associated with a particular part of the type of part (block 102). The NDE dataset includes a plurality of NDE data points and the NDE dataset corresponds to data collected during non-destructive evaluation of the particular part. In general, raw data may be collected by a NDE/I collection device, and the NDE dataset is based thereon. The NDE dataset is aligned to a simulated model associated with the type of part (block 104). In some embodiments, the simulated model may be a simulated model of the entire type of part; in other embodiments, the simulated model may be a portion of the type of part. In general, the computing system 10 includes model data 34 upon which the simulated model may be based, and the computing system 10 may align one or more NDE data points of the NDE dataset to the simulated model.

The computing system 10 may analyze one or more aligned NDE data points for one or more locations corresponding to a spatially related feature on the simulated model to determine a spatially correlated statistic that corresponds to the spatially related feature for the particular part (block 106). The spatially correlated statistic may be aligned to the simulated model (block 108). As discussed, the spatially correlated statistic corresponds to the spatially related feature, and therefore, aligning the spatially correlated statistic to the simulated model may include aligning the spatially correlated statistic to the simulated spatially related feature on the simulated model. For example, if the spatially related feature is a defined area on the type of part, the spatially correlated statistic may be aligned to the simulated representation of the defined area on the simulated model of the type of part. The computing system 10 may generate output data based at least in part on the spatially correlated statistic (block 110). In general, the output data may be stored in a memory location associated with the computing system 10 and/or communicated by the computing system 10.

In some embodiments of the invention, the model data 34 may store one or more baseline values associated with the simulated model, where the baseline values may be indicate a baseline value associated with the simulated model. In general, the baseline value defines a value associated with the type of part that is a target value for the type of part by the manufacturing process. In some embodiments the baseline value may be spatially correlated such that the baseline value indicates a target value. For example, the baseline value may indicate a target average thickness for a particular portion of the type of part. Hence, in some embodiments, the computing system 10 may compare the spatially correlated statistic for the particular part to a related baseline value for the type of part to determine whether the particular part is acceptable for the type of part (block 112). Continuing the example provided above, the computing system 10 may compare a determined average thickness for the particular portion of the particular part to the baseline value, and if the determined average thickness for the particular part is within a predefined range (e.g., +/−1%) of the baseline value, the particular part may be determined to be acceptable.

Figure 4:
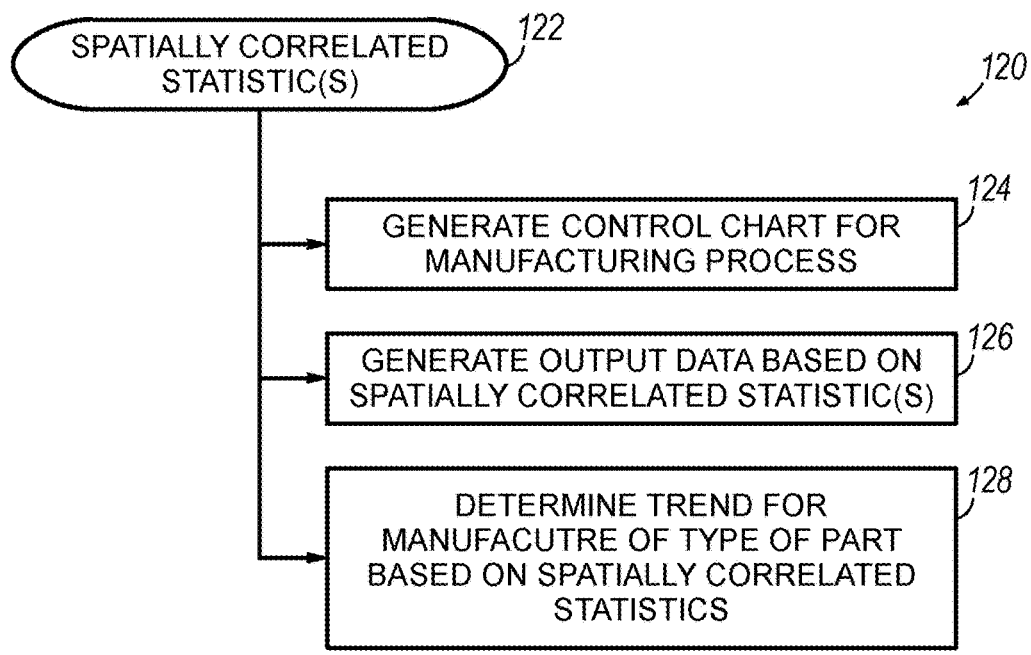
FIG. 4 is a flowchart that illustrates a sequence of operations that may be performed by the computing system and/or user device of FIG. 1 during the monitoring of the manufacturing process illustrated in FIG. 3.

FIG. 4 provides flowchart 120, which illustrates further operations that may be performed by the computing system 10 to monitor the manufacturing process. Particularly, the computing system 10 may process a plurality of spatially correlated statistics (block 122), where each spatially correlated statistic corresponds to a manufactured part of the type of part manufactured by the manufacturing process. The computing system 10 may generate a control chart for the manufacturing process based on the spatially correlated statistics (block 124). In these embodiments, the control chart may indicate the spatially correlated statistic for each part manufactured in the manufacturing process. In some embodiments, the computing system may generate output data based at least in part on the spatially correlated statistics (block 126), where the output data may be stored in a memory accessible by the computing system 10 and/or communicated by the computing system 10. In some embodiments, the computing system may analyze the spatially correlated statistics from the parts to determine a manufacturing trend for the manufacturing process based at least in part on the spatially correlated statistics (block 128). In these embodiments, the manufacturing trend may indicate a trend of the manufacturing process related to the spatially correlated statistics. As each spatially correlated statistic is related to a spatially related feature, the manufacturing trend may thereby indicate a trend associated with the spatially related feature for the manufacturing process. For example, if each spatially correlated statistic may correspond to an average thickness for a particular portion of the corresponding part, the manufacturing trend may correspond to the variability in the average thickness for the portion of each part.

Figure 5:
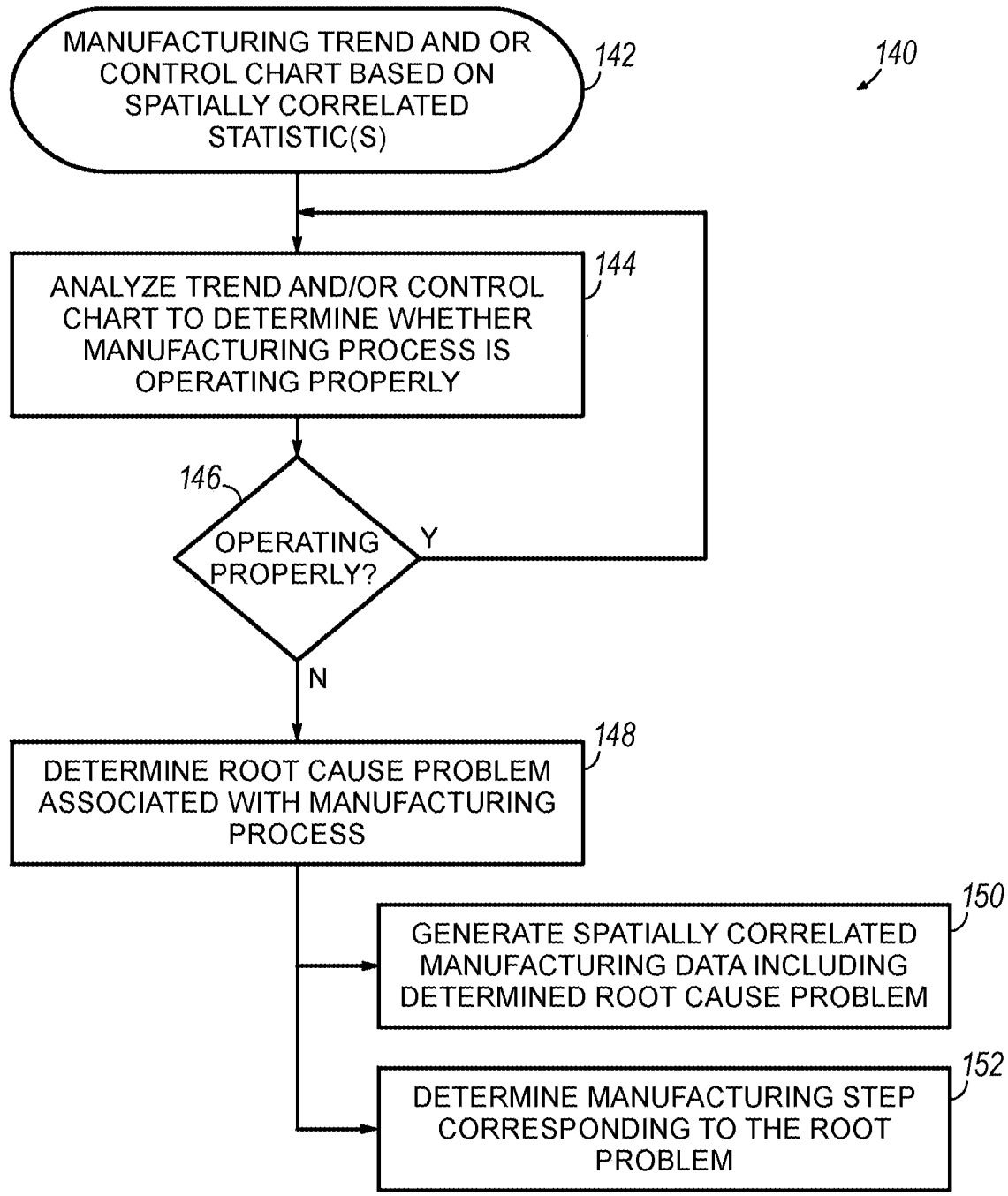
FIG. 5 is a flowchart that illustrates a sequence of operations that may be performed by the computing system and/or user device of FIG. 1 during the monitoring of the manufacturing process illustrated in FIG. 3.

FIG. 5 provides flowchart 140, which illustrates further operations that may be performed by the computing system 10 to monitor the manufacturing process. In some embodiments, a manufacturing trend and/or control chart based on spatially correlated statistics for a plurality of parts manufactured by the manufacturing process may be processed (block 142). The computing system 10 may analyze the manufacturing trend and/or the control chart to determine whether the manufacturing process is operating properly (block 144). As discussed previously, the manufacturing trend may correspond to a spatially related feature for the type of part manufactured by the manufacturing process. Hence, based on the manufacturing trend, the computing system may determine whether the spatially related feature of the manufactured parts indicate that the manufacturing process is operating properly with respect to the spatially related feature.

For example, continuing the average thickness example from above, if an acceptable range of average thickness for the particular portion is defined for the type of part, the computing system 10 may analyze the manufacturing trend to determine if, based on the manufacturing trend, the manufacturing process is likely to begin producing parts having an average thickness for the particular portion not in the acceptable range. In this example, the average thickness for each manufactured part may be within the acceptable range, but the manufacturing trend may indicate that out-of-range parts are likely to be produced. If the average thickness of the particular portion of each part is increasing for each later manufactured part, even if the particular portion of each manufactured part is within the acceptable range, the computing system may determine that the manufacturing process is not operating properly because subsequently produced parts will exceed the maximum acceptable limit of the acceptable range based on the manufacturing trend.

Returning to FIG. 5, in response to determining that the manufacturing process is operating properly ('Y' branch of block 146), the computing system 10 continues analyzing the manufacturing trend. While the description and flowcharts may describe receiving NDE datasets receiving NDE datasets, determining spatially correlated statistics, determining a manufacturing trend, analyzing the manufacturing trend to determine whether the manufacturing process is operating properly, etc. as a single occurrence, the invention is not so limited. In some embodiments, the receipt of NDE datasets, processing of the NDE datasets, are continuous, such that as parts may be manufactured by the manufacturing process, the computing system 10 continues to process received NDE data and/or quality related data. As such, as shown in FIG. 5, when the computing system 10 determines that the manufacturing process is operating properly, the computing system 10 continues analyzing the manufacturing trend, as data is received and processed for parts manufactured by the manufacturing process. By continuously receiving and processing data associated with the manufactured parts, embodiments of the invention continuously monitor the manufacturing process such that any potential problems that may arise in the manufacturing process may be detected in a timely manner.

In response to determining that the manufacturing process is not operating properly ('N' branch of block 146), the computing system may determine a root cause problem associated with the manufacturing process (block 148). In general, the root cause problem may be determined from a plurality of possible root cause problems associated with the manufacturing process, the spatially correlated statistics, the NDE datasets, and/or the type of part. In some embodiments, the computing system 10 may receive user input data that identifies the root cause problem associated with the manufacturing process to thereby determine the root cause problem. The root cause problem may correspond to one or more aspects of the manufacturing process, where such aspects generally depend on the type of part and the manufacturing process. For example, if a manufacturing process manufactures molded parts, and a spatially correlated statistic determined for each of a plurality of manufactured parts is the average porosity of a portion of each part, if the average porosity of manufactured parts is increasing over time, a root cause problem associated with the manufacturing process may be the wearing of a gasket for a mold used in the manufacturing process.

Based on the determined root cause problem, the manufacturing trend, the spatially correlated statistics, and/or the NDE datasets, the computing system 10 may generate spatially correlated manufacturing data that identifies the determined root cause problem (block 150). In some embodiments, the computing system may determine a manufacturing step that corresponds to the root cause problem (block 152). For example, if the manufacturing process comprises a plurality of manufacturing steps, such as molding, curing, and cutting a type of part, the computing system may determine a particular manufacturing step that corresponds to the root cause problem.

Figure 6:
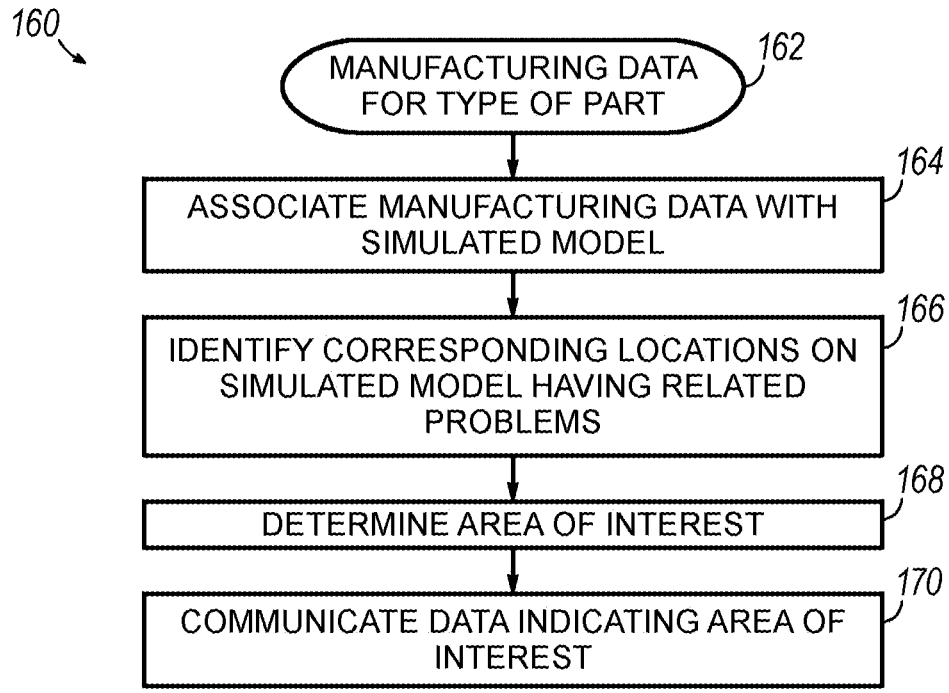
FIG. 6 is a flowchart that illustrates a sequence of operations that may be performed by the computing system and/or user device of FIG. 1 during the monitoring of the manufacturing process illustrated in FIG. 3.

FIG. 6 provides flowchart 160 that illustrates further operations that may be performed by the computing system 10 to monitor the manufacturing process. As shown, manufacturing data for a type of part may be processed (block 162), where the manufacturing data may indicate at least one problem that is associated with at least one corresponding simulated location on the simulated model. The manufacturing data may be associated with the simulated model (block 164), and simulated locations that have related indicated problems may be identified by the computing system 10 (block 166). Based on the identified simulated locations, the computing system 10 may determine an area of interest associated with the type of part (block 168). The computing system 10 may communicate data that identifies the area of interest for the type of part.

An area of interest for a type of part may define a part, a particular portion of the type of part, an area, a region, a volume, and/or other such spatially related feature of the type of part. In general, an area of interest may be utilized by embodiments of the invention to define a portion or other such spatially related feature that particular interest should be paid when inspecting each part of the type of part, or for which NDE data and/or other quality related data should be collected. Such spatially related features may include, for example, a seam on a composite part that corresponds to a seam in a mold for the composite part, a portion of a part proximate a cut, weld, securing element, bonded portion, and/or other such types of spatially related features. In addition, an area of interest may be defined on the simulated model and used to filter data on the simulated model, such that data not corresponding to the area of interest may be filtered from the simulated model.

Figure 7:
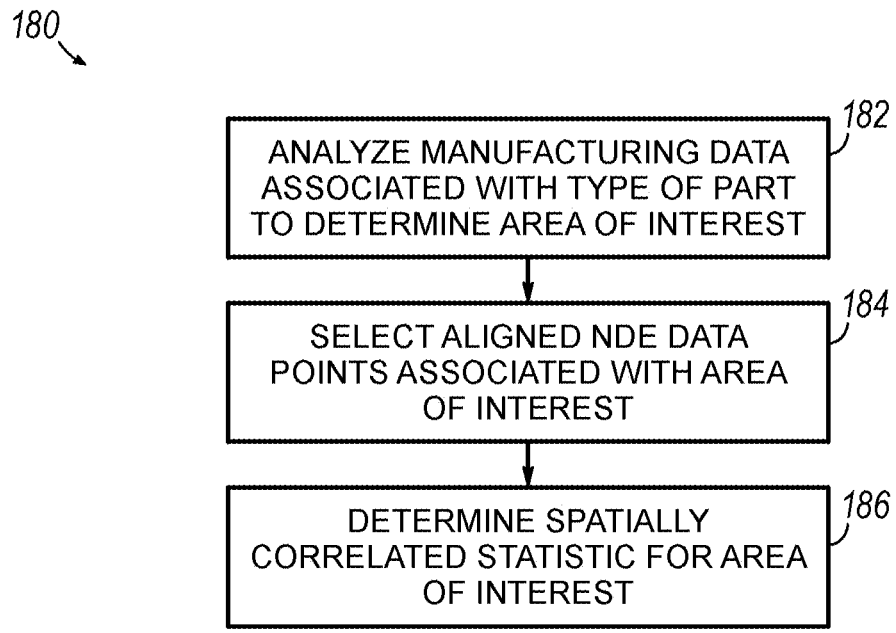
FIG. 7 is a flowchart that illustrates a sequence of operations that may be performed by the computing system and/or user device of FIG. 1 during the monitoring of the manufacturing process illustrated in FIG. 3.

Turning now to FIG. 7, which provides flowchart 180, as shown, the computing system 10 may analyze manufacturing data associated with the type of part to determine an area of interest for the type of part (block 182). As discussed previously, manufacturing data may indicate one or more potential problems associated with the type of part, where such potential problems may have been derived from NDE data and/or quality related data for manufactured parts of the type of part. In these embodiments, the computing system 10 may analyze the manufacturing data to determine an area of interest for the type of part, where such area of interest may correspond to a plurality of indications of potential problems. The computing system 10 may select NDE data that is aligned to simulated locations on the simulated model that are associated with the determined area of interest (block 184), and the computing system 10 may determine a spatially correlated statistic for the area of interest based on the selected NDE data (block 186).

Figure 8:
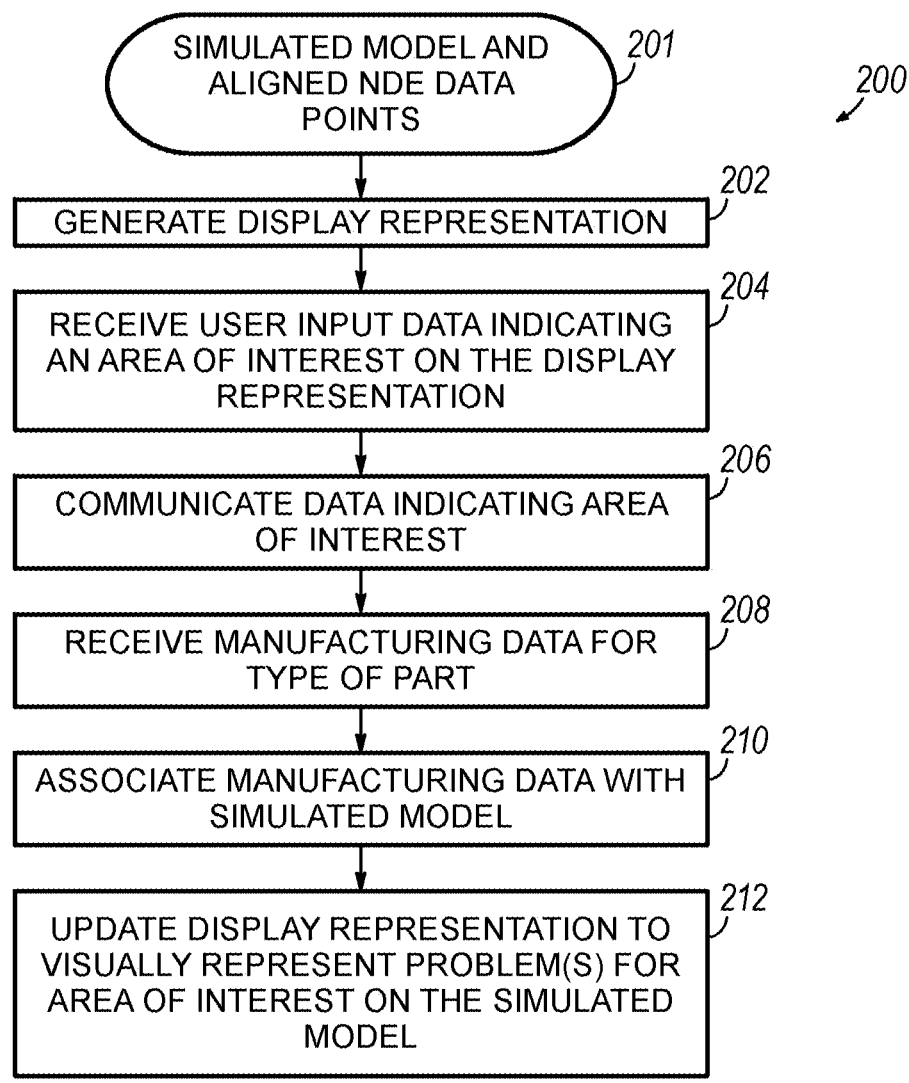
FIG. 8 is a flowchart that illustrates a sequence of operations that may be performed by the computing system and/or user device of FIG. 1 during the monitoring of the manufacturing process illustrated in FIG. 3.

FIG. 8 provides flowchart 200 that illustrates a sequence of operations that may be performed by the computing system 10 consistent with embodiments of the invention when processing the simulated model including and aligned NDE data points (block 201). The computing system may generate a display representation of the simulated model (block 202). The display representation may be displayed for a user via the computing system 10 and/or the user device 12, and the computing system 10 may receive user input data that indicates and area of interest on the display representation (block 204). In general, the user may interface with the computing system 10 and/or user device 12 executing an application that allows the user to provide input data related to the display representation via one or more input devices. The computing system 10 and/or user device 12 may communicate data that identifies the area of interest for the display representation (block 206), and the computing system 10 may receive manufacturing data associated with the type of part (block 208). The computing system may associate manufacturing data with the simulated model (block 210), where the manufacturing data indicates at least one problem associated with one or more simulated locations of the simulated model. The computing system 10 may update the display representation such that visual representations of problems associated with the area of interest may be included in the display representation of the simulated model (block 212).

Figure 9:
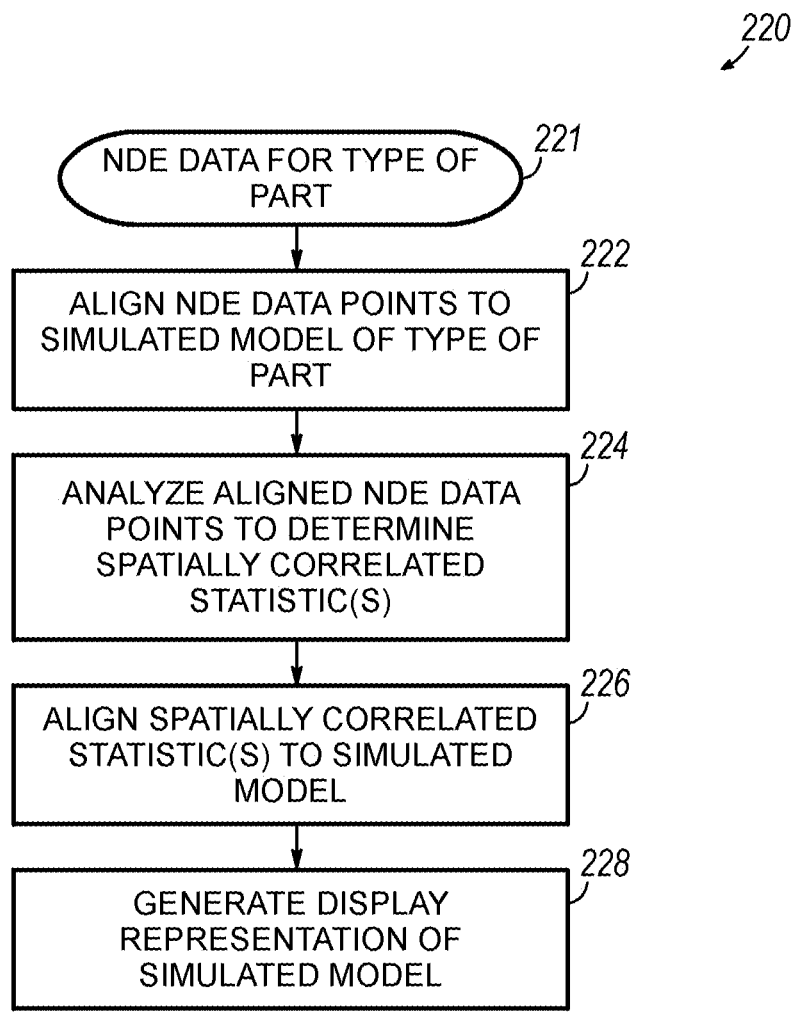
FIG. 9 is a flowchart that illustrates a sequence of operations that may be performed by the computing system and/or user device of FIG. 1 during the monitoring of the manufacturing process illustrated in FIG. 3.

FIG. 9 provides flowchart 220 that illustrates operations that may be performed by the computing system 10 when processing NDE data for the type of part (block 221). The computing system 10 aligns NDE data points of the NDE data to a simulated model of the type of part (block 222), and the computing system 10 analyzes the aligned NDE data points to determine one or more spatially correlated statistics (block 224). The computing system 10 aligns the one or more spatially correlated statistics to the simulated model (block 226), and the computing system 10 may generate a display representation of the simulated model that visually represents the one or more spatially correlated statistics on the simulated model of the type of part (block 228).

Figure 10:
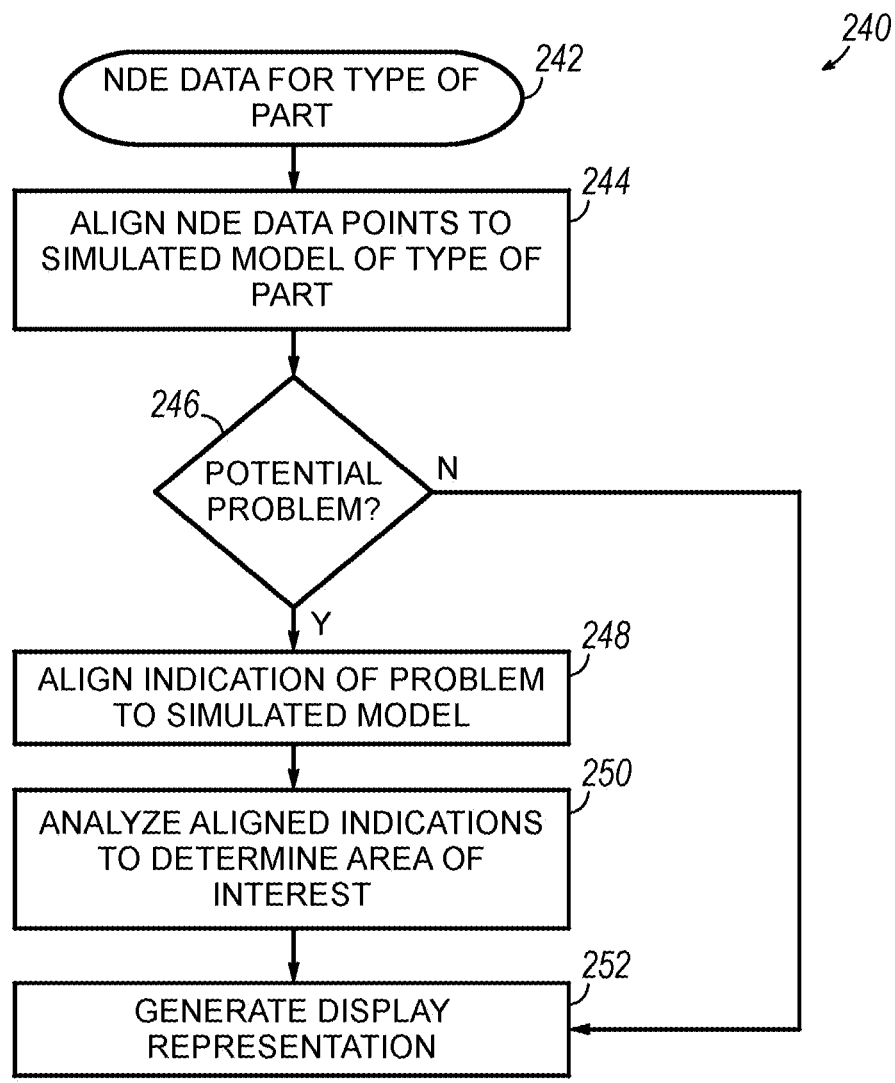
FIG. 10 is a flowchart that illustrates a sequence of operations that may be performed by the computing system and/or user device of FIG. 1 during the monitoring of the manufacturing process illustrated in FIG. 3.

FIG. 10 provides flowchart 240 that illustrates operations that may be performed by the computing system 10 when processing NDE data for a type of part (block 242). The computing system 10 may align NDE data points of the NDE data to a simulated model of the type of part (block 244). The computing system 10 may analyze the aligned NDE data points to determine whether the aligned NDE data points indicate a potential problem at a corresponding location on a particular part associated with the NDE data point (block 246). In response to determining that an aligned NDE data point indicates a potential problem at a corresponding location on the particular part associated with the NDE data point ('Y' branch of block 246), the computing system 10 aligns an indication of the potential problem to the simulated model (block 248). The computing system 10 analyzes aligned indications of potential problems on the simulated model to determine an area of interest for the type of part (block 250). The computing system 10 may generate a display representation of the simulated model that visually represents indications of problems aligned to the simulated model (block 252). If the computing system 10 does not determine that any aligned NDE data points indicate a potential problem ('N' branch of block 246), the computing system 10 may generate the display representation without any indications (block 252).

Figure 11:
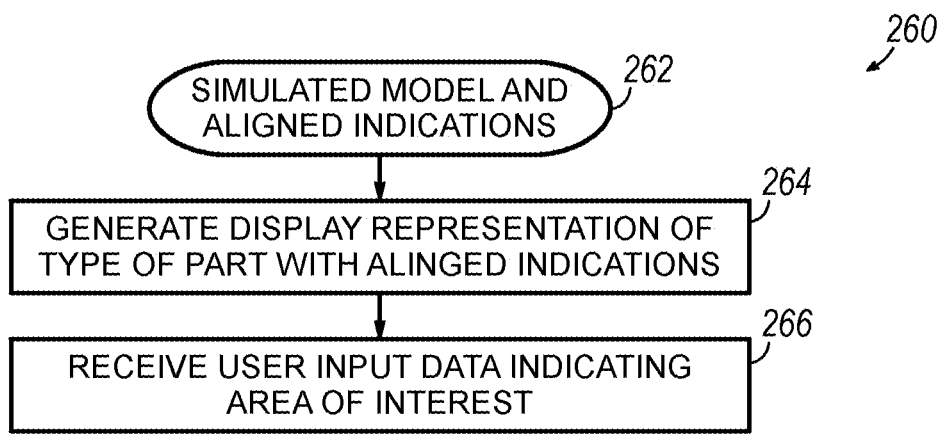
FIG. 11 is a flowchart that illustrates a sequence of operations that may be performed by the computing system and/or user device of FIG. 1 during the monitoring of the manufacturing process illustrated in FIG. 3.

FIG. 11 provides flowchart 260 that illustrates a sequence of operations that may be performed by the computing system 10 when processing the simulated model of the type of part that includes aligned indications of potential problems (block 262). In some embodiments, the computing system may generate a display representation of the simulated model that visually represents the aligned indications of potential problems (block 264), and the computing system 10 may receive user input data that indicates an area of interest for the type of part based on the display representation (block 266).

Figure 12:
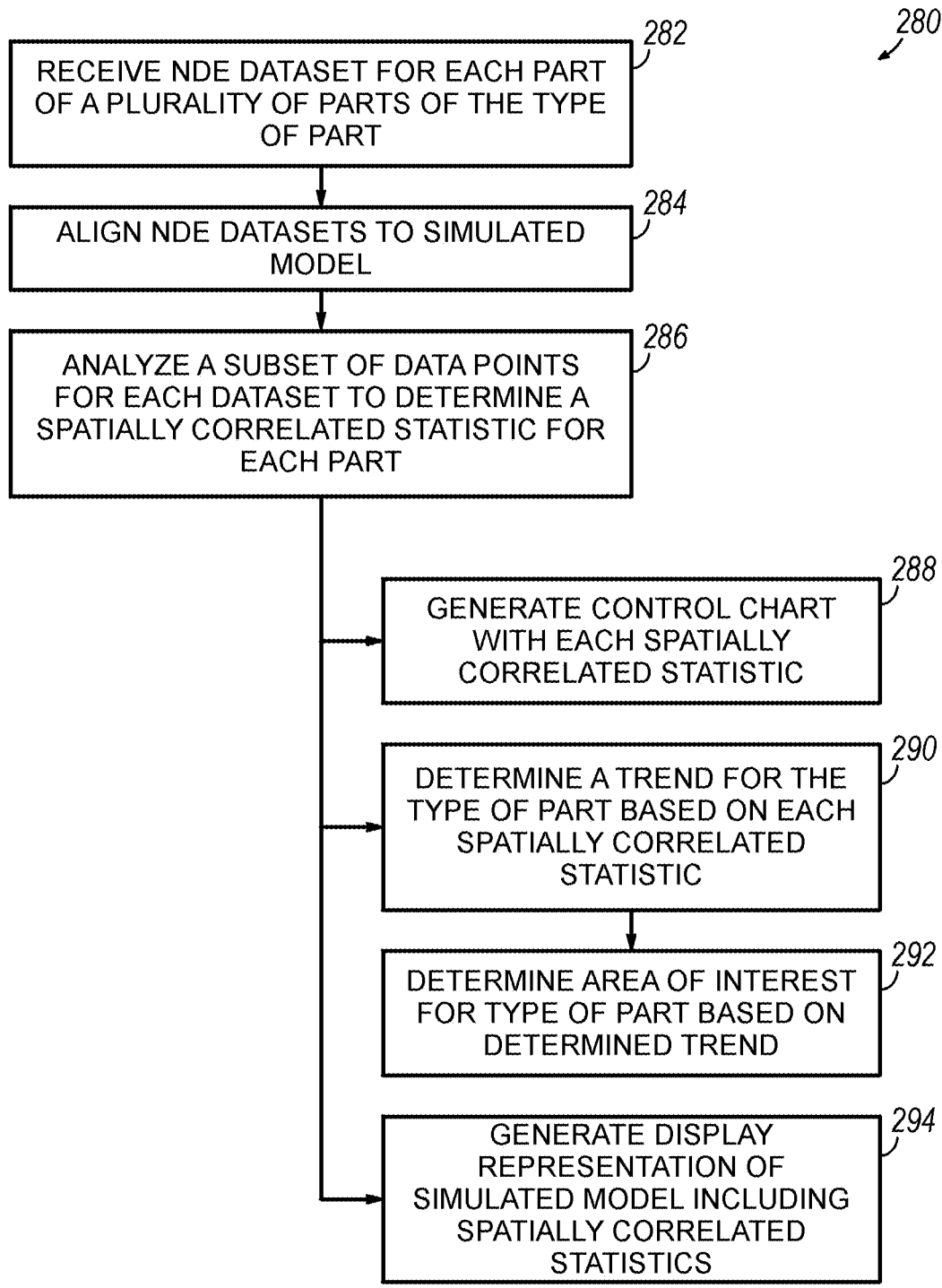
FIG. 12 is a flowchart that illustrates a sequence of operations that may be performed by the computing system and/or user device of FIG. 1 during the monitoring of the manufacturing process illustrated in FIG. 3.
Figure 13:
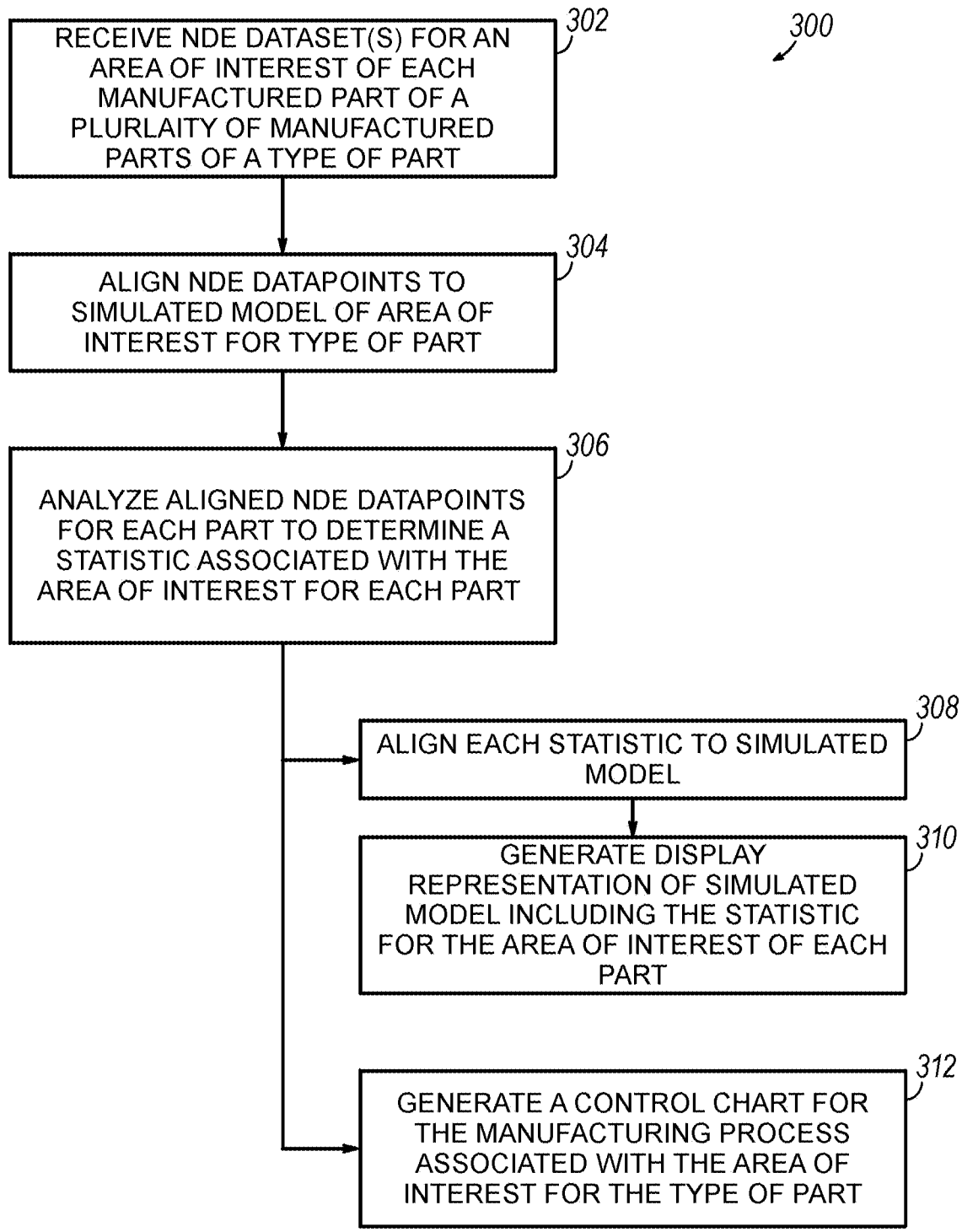
FIG. 13 is a flowchart that illustrates a sequence of operations that may be performed by the computing system and/or user device of FIG. 1 to monitor the manufacture of a type of part by a manufacturing process.

FIG. 12 provides flowchart 280 that illustrates operations that may be performed by the computing system 10 consistent with embodiments of the invention to monitor the manufacturing process. The computing system may receive an NDE dataset for each of a plurality of parts of a type of part (block 282). The computing system 10 may align the NDE datasets to a simulated model of the type of part (block 284), and the computing system 10 may analyze at least a subset of the data points for each NDE dataset to determine a spatially correlates statistic for each part (block 286). Based on the spatially correlated statistics, the computing system 10 may generate a control chart that includes each spatially correlated statistic (block 288). In some embodiments, the computing system 10 may determine a manufacturing trend for the type of part based on each spatially correlated statistic (block 290), and the computing system may determine an area of interest for the type of part based on the manufacturing trend (block 292). In some embodiments, the computing system 10 may generate a display representation of the simulated model that visually represents the spatially correlated statistics on the simulated model (block 294).

FIGS. 13-16 provide flowcharts that illustrate sequences of operations that may be performed by the computing system 10 and/or user device 12 consistent with embodiments of the invention to monitor manufacture of a type of part by a manufacturing process that includes one or more manufacturing steps. Specifically, referring to FIG. 13, which provides flowchart 300, the computing system 10 may receive an NDE dataset for each of a plurality of parts of the type of part, where each NDE dataset is associated with an area of interest for the type of part (block 302). The computing system 10 aligns the NDE data points of each NDE dataset to a simulated model of the area of interest for the type of part (block 304), and the computing system 10 analyzes the aligned NDE data points for each part to determine a statistic associated with the area of interest for each part (i.e., a spatially correlated statistic) (block 306). The computing system 10 may align each statistic to the simulated model (block 308), and generate a display representation of the simulated model that visually represents each aligned statistic on the simulated model (block 310). In some embodiments, the computing system 10 may generate a control chart for the manufacturing process associated with the area of interest for the type of part (block 312).

Figure 14:
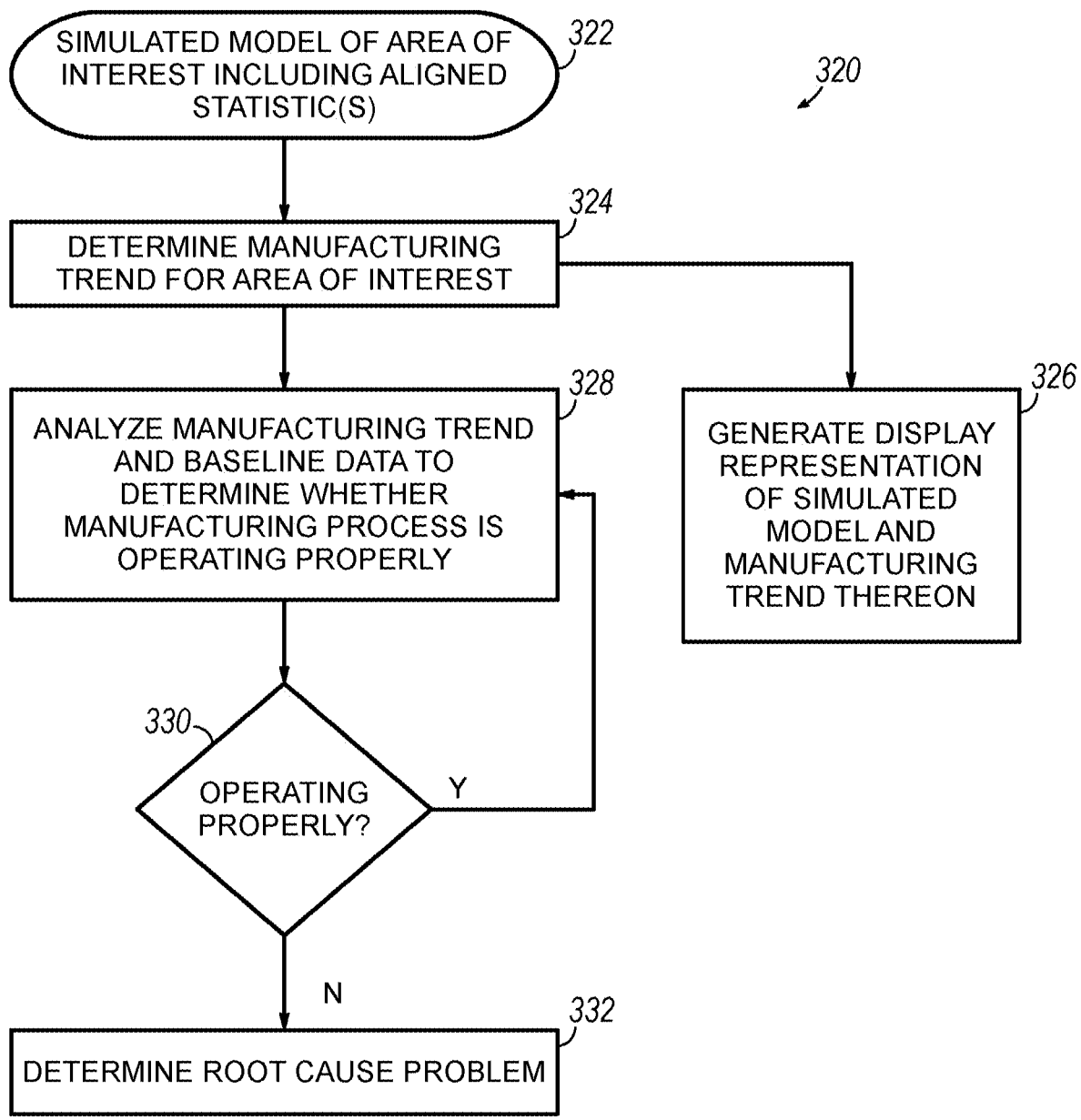
FIG. 14 is a flowchart that illustrates a sequence of operations that may be performed by the computing system and/or user device of FIG. 1 during the monitoring of the manufacturing process illustrated in FIG. 13.

Turning now to FIG. 14, this figure provides flowchart 320, which illustrates operations that the computing system 10 may perform when processing the simulated model of the area of interest that includes aligned statistics for the area of interest (block 322). The computing system 10 may determine a manufacturing trend for the manufacturing process associated with the area of interest (block 324). In some embodiments the computing system may generate a display representation of the simulated model of the area of interest that visually represents the manufacturing trend on the simulated model (block 326).

In some embodiments of the computing system may analyze the manufacturing trend and base line data associated with the simulated model of the type of part to determine whether the manufacturing process is operating properly (block 328). In response to determining that the manufacturing process is operating properly ('Y' branch of block 330), the computing system 10 may continue analyzing the manufacturing trend as the manufacturing trend updates based on received NDE data. In response to determining that the manufacturing process is not operating properly ('N' branch of block 330), the computing system 10 may determine a root cause problem for the manufacturing process associated with the area of interest (block 332).

Figure 15:
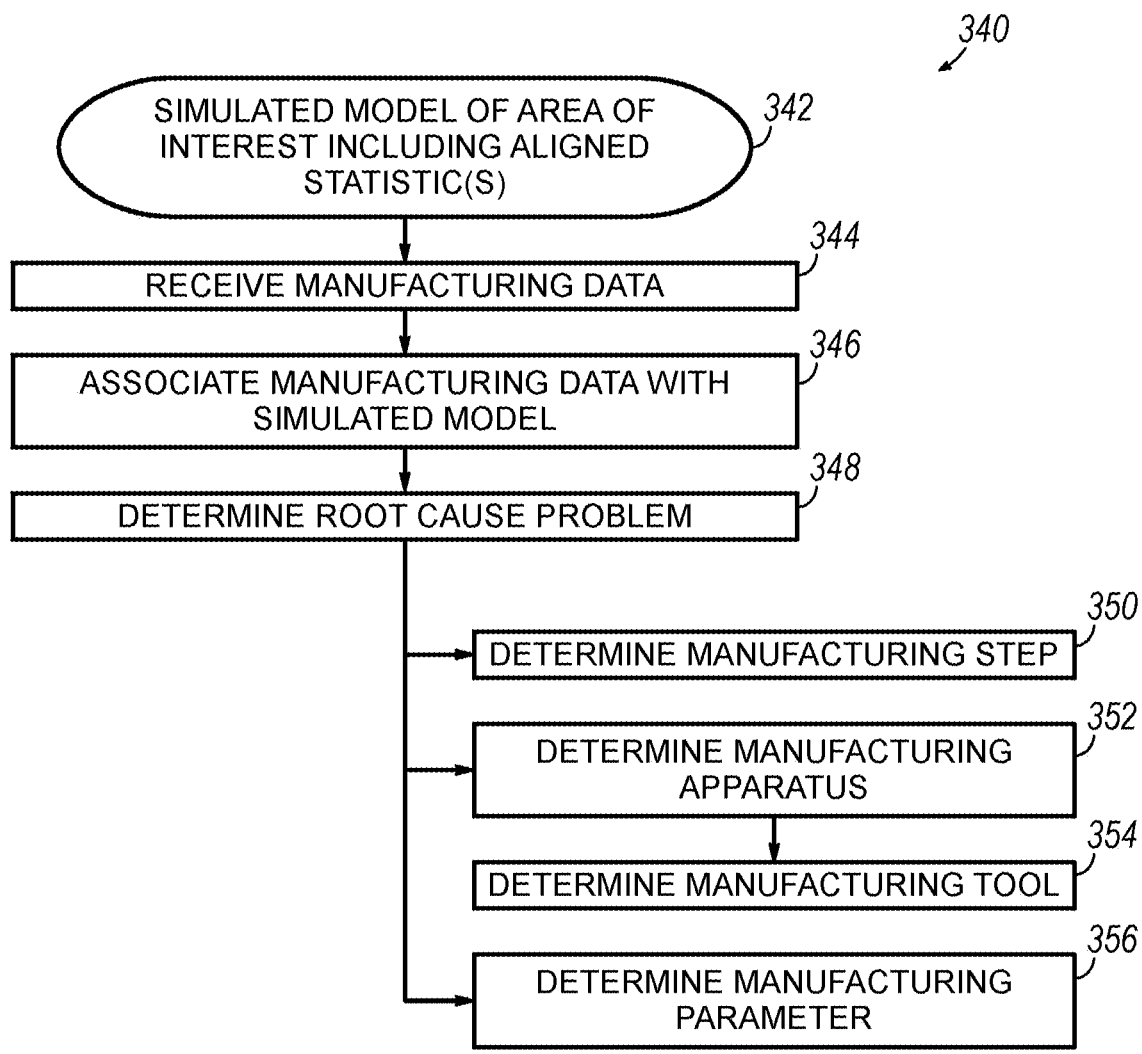
FIG. 15 is a flowchart that illustrates a sequence of operations that may be performed by the computing system and/or user device of FIG. 1 during the monitoring of the manufacturing process illustrated in FIG. 13.

FIG. 15 provides a flowchart 340 that illustrates operations that the computing system 10 may perform when processing the simulated model of the area of interest including aligned statistics associated with the area of interest (block 342). The computing system 10 may receive manufacturing data (block 344), where the manufacturing data indicates one or more possible root cause problems associated with the area of interest. In some embodiments, the manufacturing data may correspond to the type of NDE data from which the aligned statistics were determined. For example, if the NDE data corresponded to measured porosity values and the statistic associated with the area of interest for each part was an average porosity, the manufacturing data may indicate possible root cause problems associated with porosity values. The computing system may analyze the manufacturing data and the aligned statistics to determine a root cause problem associated with the area of interest (block 348).

In some embodiments of the invention, the manufacturing data may further indicate one or more manufacturing steps, one or more manufacturing apparatuses, one or more manufacturing tools, and/or one or more manufacturing parameters associated with the area of interest, the root cause problem, and/or the other types of indicated data. Therefore, consistent with these embodiments of the invention, the computing system 10 may determine a manufacturing step associated with the root cause problem and/or area of interest (block 350). Similarly, the computing system 10 may determine a manufacturing apparatus associated with the root cause problem, the area of interest, and/or the determined manufacturing step (block 352). In addition, the computing device 10 may determine a manufacturing tool associated with the root cause problem, the area of interest, the determined manufacturing step, and/or the determined manufacturing apparatus (block 354). Furthermore, the computing device 10 may determine a manufacturing parameter associated with the root cause problem, the area of interest, the manufacturing step, and/or the manufacturing apparatus (block 356).

Figure 16:
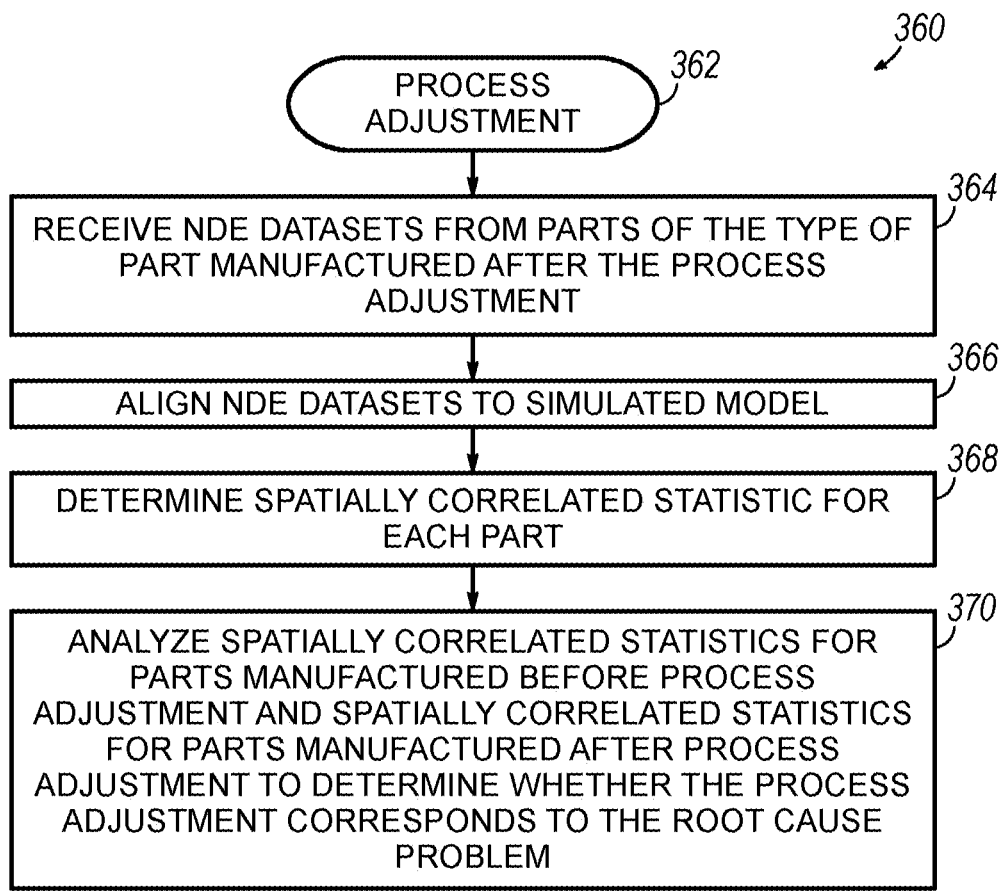
FIG. 16 is a flowchart that illustrates a sequence of operations that may be performed by the computing system and/or user device of FIG. 1 during the monitoring of the manufacturing process illustrated in FIG. 13.

FIG. 16 provides flowchart 360 that illustrates operations that may be performed by the computing system 10 after a process adjustment is implemented for the manufacturing process (block 362). The computing system 10 receives one or more NDE datasets collected from one or more parts manufactured after implementation of the process adjustment (block 364). The computing system 10 aligns the one or more NDE datasets to the simulated model (block 366), and the computing system analyzes the aligned NDE datasets to determine a statistic for the area of interest (i.e., a spatially correlated statistic) for each part manufactured after the process adjustment implementation (block 368). The computing system 10 may evaluate the process adjustment to determine whether the process adjustment corresponds to the root cause problem by analyzing the statistics for the area of interest for each part manufactured after the process adjustment and the statistics for the area of interest for each part manufactured before the process adjustment (block 370). In some embodiments, the computing system 10 may further determine the extent to which the process adjustment affected the root cause problem, where the extent may be defined based at least in part on the difference in the statistics for the area of interest for the parts manufactured after the process adjustment and the statistics for the area of interest for the parts manufactured before the process adjustment.

Figure 17:
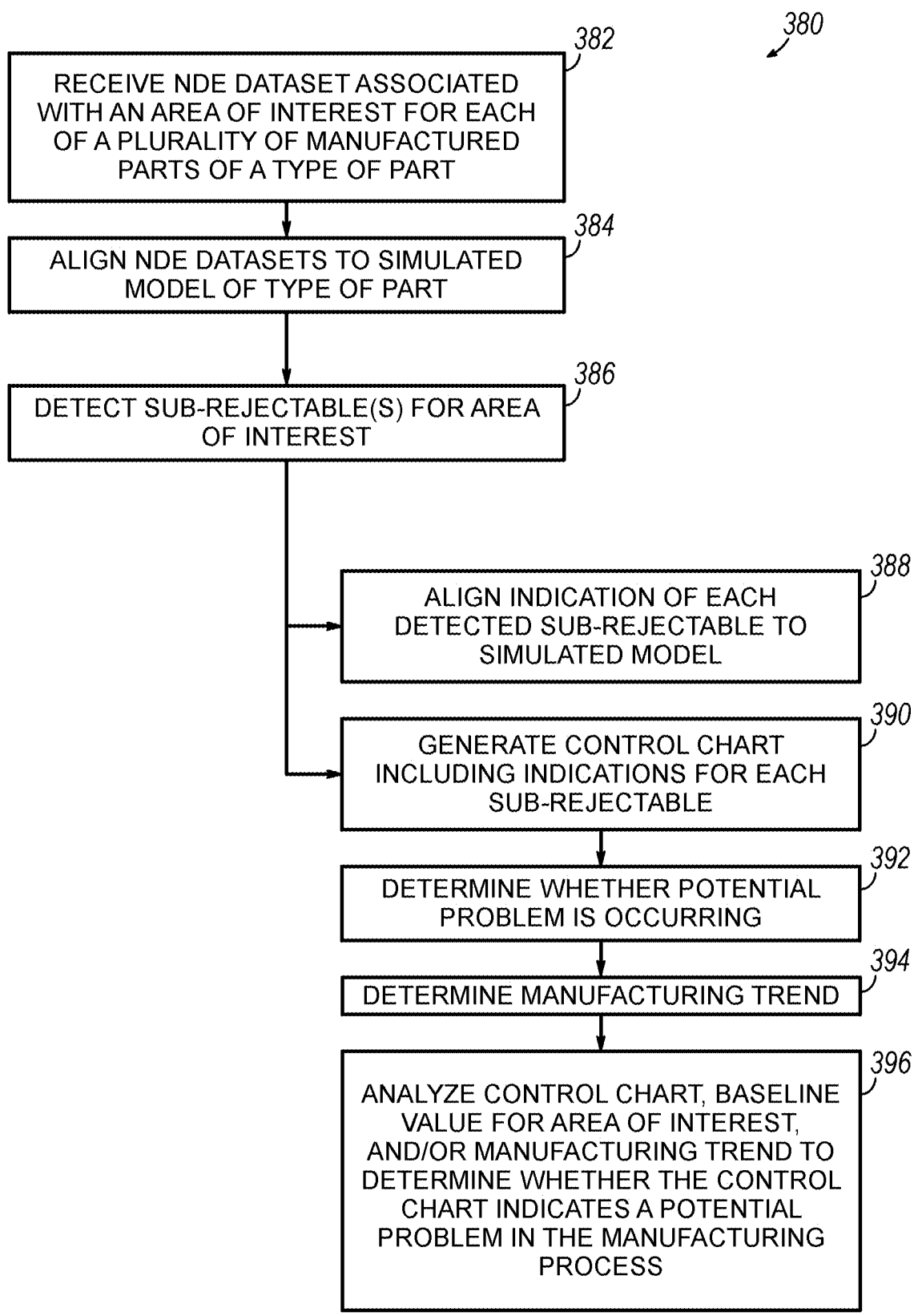
FIG. 17 is a flowchart that illustrates a sequence of operations that may be performed by the computing system and/or user device of FIG. 1 to monitor the manufacture of a type of part by a manufacturing process.

FIG. 17 provides a flowchart 380 that illustrates a sequence of operations that may be performed by the computing system 10 consistent with embodiments of the invention to monitor the manufacture of a type of part by a manufacturing process that includes a plurality of manufacturing steps. The computing system 10 receives an NDE dataset for each of a plurality of parts of the type of part manufactured by the manufacturing process, where the NDE dataset for each part is associated with an area of interest for the type of part (block 382). The computing system 10 aligns the NDE datasets to a simulated model of the area of interest for the type of part (block 384), and the computing system analyzes the aligned NDE datasets detect any sub-rejectable physical characteristic(s) associated with the area of interest for each part. In general, a sub-rejectable physical characteristic refers to a physical characteristic that is within an acceptable range for the type of part, but that is outside an expected range (i.e., the sub-rejectable physical characteristic is acceptable but outside the range associated with noise in the manufacturing process). In some embodiments predefined values associated with the simulated model may define sub-rejectable ranges, where such the sub-rejectable range may be proximate a minimum or maximum limit of the acceptable range and/or not be within a typical/expected range. In general, an NDE data point may indicate a measured value for a location on a part from which the NDE data point was collected, and if the measured value is proximate a limit associated with an acceptable range for the value, embodiments of the invention may identify the location on as a sub-rejectable physical characteristic. Moreover, the model data of the simulated model may define values that correspond to sub-rejectable physical characteristics.

In some embodiments of the invention, the computing system may align an indication of each detected sub-rejectable physical characteristic to a corresponding simulated location on the simulated model (block 388). In addition, the computing system 10 may generate a control chart that includes indications for each detected sub-rejectable for the type of part (block 390). The computing system 10 may analyze the control chart and/or aligned indications to determine whether a potential problem is occurring for the manufacturing process (block 392). The computing system 10 may determine a manufacturing trend for the manufacturing process based at least in part on the aligned indications and/or the control chart (block 394). In some embodiments, the computing system 10 may analyze the control chart, one or more baseline values associated with the area of interest, and/or the manufacturing trend to determine whether the control chart indicates a potential problem in the manufacturing process (block 396). As discussed previously, a potential problem may be indicated by data that indicates that the manufacturing process is manufacturing parts that are trending towards a limit of an acceptable range for one or more physical characteristics. Hence, while the manufacturing process may be manufacturing acceptable parts, based on the NDE data and/or quality related data for each manufactured part, the computing system 10 may determine that a potential problem is occurring in the manufacturing process.

Figure 18:
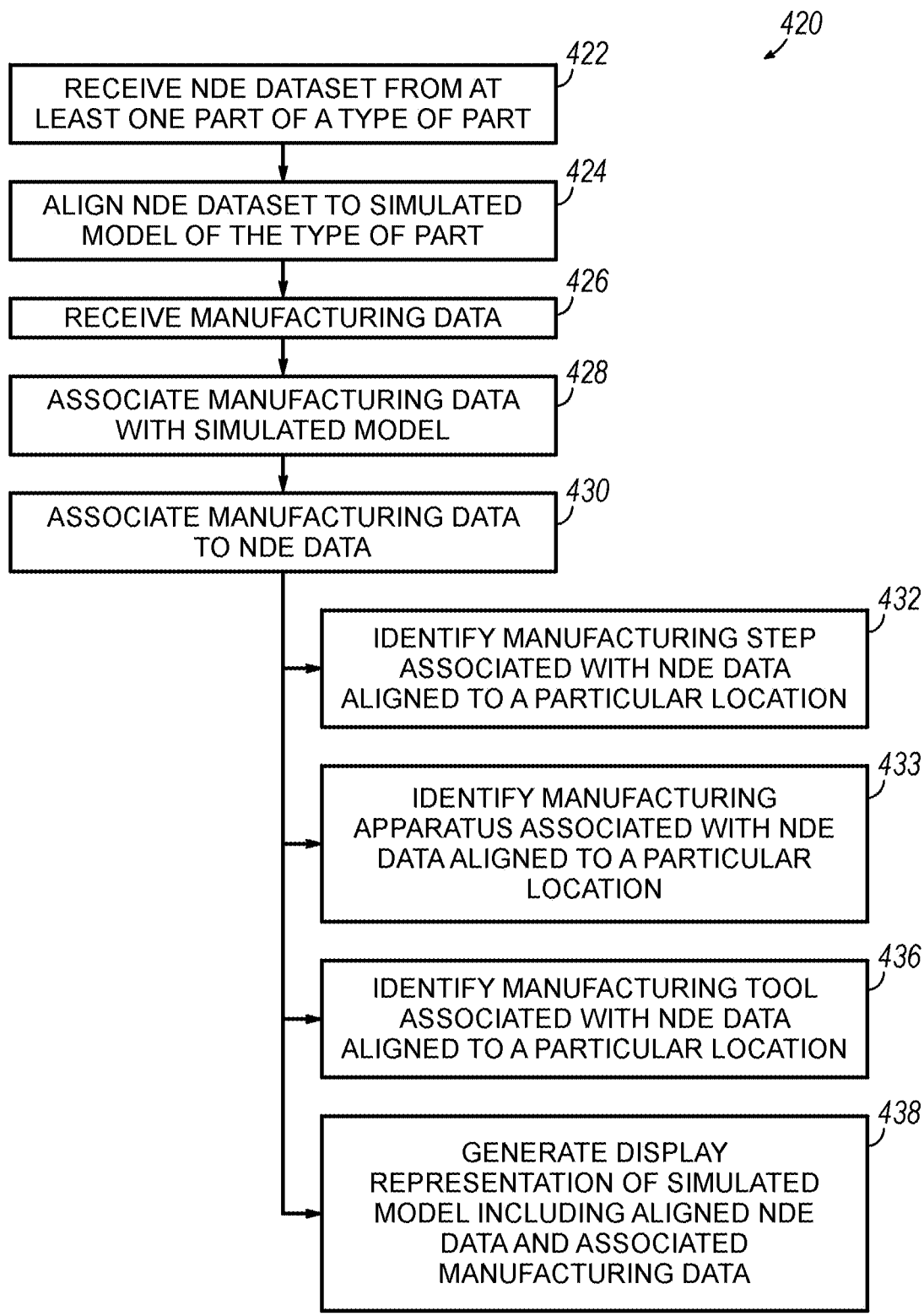
FIG. 18 is a flowchart that illustrates a sequence of operations that may be performed by the computing system and/or user device of FIG. 1 to model the manufacture of a type of part by a manufacturing process.

FIG. 18 provides a flowchart 420 that illustrates a sequence of operations that may be performed by the computing system 10 to model the manufacture of a type of part by a manufacturing process that includes at least one manufacturing step. The computing system may receive at least one NDE dataset for at least one part of the type of part (block 422), and the computing system 10 may align the NDE dataset to a simulated model of the type of part (block 424). The computing system may receive manufacturing data associated with the manufacturing process (block 426) and associate the manufacturing data with the simulated model (block 428). Based on the simulated location of aligned NDE data, manufacturing data may be associated with particular NDE data (block 430), such that the computing system may: identify a manufacturing step associated with particular NDE data aligned to one or more particular simulated locations (block 432); identify a manufacturing apparatus associated with particular NDE data aligned to one or more particular simulated locations (block 434); identify a manufacturing tool associated with particular NDE data aligned to one or more particular simulated locations (block 436); and/or generate a display representation of the simulated model that visually represents at least some aligned NDE data and manufacturing data associated therewith (block 438). Hence, in these embodiments, data associated with aspects of the manufacturing process may be spatially organized on a simulated model of the type of part, such that the data associated with the manufacturing process may be spatially correlated with NDE data and/or quality related data collected from one or more parts manufactured by the manufacturing process. Therefore, consistent with these embodiments of the invention, the manufacturing process may be modeled on the simulated model of the type of part.

Figure 19:
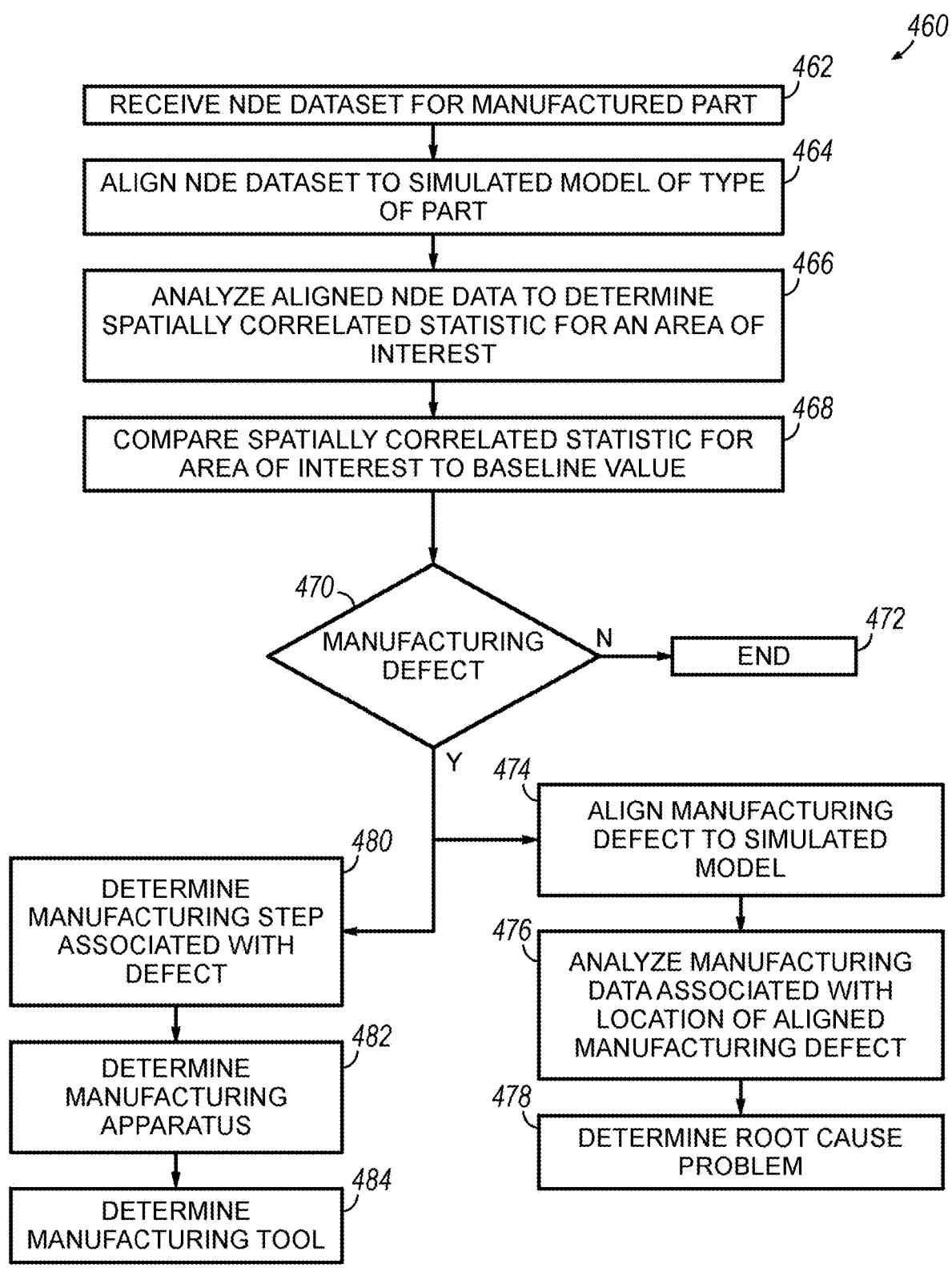
FIG. 19 is a flowchart that illustrates a sequence of operations that may be performed by the computing system and/or user device of FIG. 1 to analyze a part manufactured by a manufacturing process.

Turning now to FIG. 19, this figure provides a flowchart 460 that illustrates a sequence of operations that may be performed by the computing system 10 to analyze a manufactured part of a type of part manufactured by a manufacturing process. The computing system receives an NDE dataset associated with the manufactured part (block 462) and aligns the NDE dataset to a simulated model associated with the type of part (block 464), where such aligning includes aligning NDE data of the NDE dataset associated with an area of interest on the manufactured part to at least one corresponding simulated location on the simulated model. The computing system 10 may analyze the NDE data aligned to the area of interest to determine a spatially correlated statistic for the area of interest for the manufactured part (block 466). The computing system 10 may compare the spatially correlated statistic to a baseline value associated with the area of interest (block 468). Based at least in part on the NDE data aligned to the area of interest and/or the comparison of the spatially correlated statistic to the baseline value, the computing system 10 may determine whether the manufactured part includes a manufacturing defect associated with the area of interest (block 470). In general, a manufacturing defect corresponds to a physical characteristic that is not within an acceptable range, where the acceptable range is predefined. If a manufacturing defect is not detected for the manufactured part ('N' branch of block 470), then the analysis process ends (block 472).

In response to detecting a defect for the manufactured part ('Y' branch of block 470), the computing system 10 may align the detected defect to the simulated model (block 474). The computing system 10 may analyze manufacturing data associated with the simulated location of the aligned defect to determine a root cause problem associated with the simulated location and/or detected defect (block 478).

In addition, in response to detecting a defect for the manufactured part ('Y' branch of block 470), the computing system 10 may determine a manufacturing step associated with the defect based at least in part on the simulated location of the aligned defect (block 480). Similarly, the computing system 10 may determine a manufacturing apparatus associated with the defect based at least in part on the simulated location of the aligned defect and/or the determined manufacturing step (block 482). Furthermore, the computing system 10 may determine a manufacturing tool associated with the defect based at least in part on the simulated location of the aligned defect, the determined manufacturing step, and/or the determined manufacturing apparatus.

Figure 20:
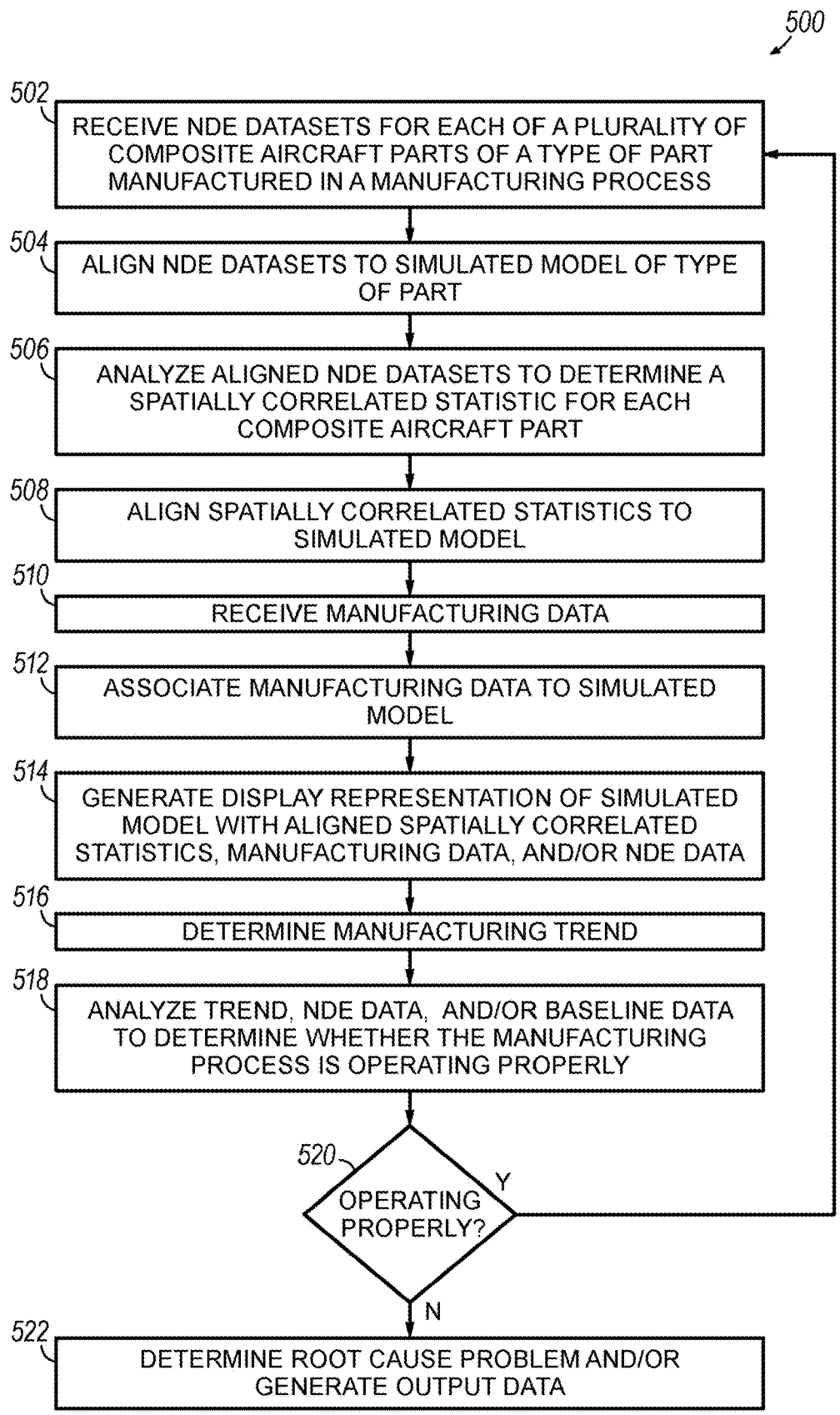
FIG. 20 is a flowchart that illustrates a sequence of operations that may be performed by the computing system and/or user device of FIG. 1 to monitor the manufacture of a type of composite aircraft of part by a manufacturing process.

Referring to FIG. 20, this figure provides flowchart 500 that illustrates a sequence of operations that may be performed by the computing system 10 to monitor the manufacture of composite aircraft parts of a type of part by a manufacturing process. In general, the production of composite aircraft parts may be a complicated and expensive process, where producing even one defective part may result in significant time and cost losses. Therefore, in this embodiment of the invention, the manufacturing process is monitored continuously as NDE data and/or quality related data is collected from one or more of the aircraft parts during and immediately following manufacture of each part. In this manner, embodiments of the invention may monitor whether the manufacturing process is operating properly to reduce the probability of time and cost losses due to the development of a problem in the manufacturing process. As discussed, the NDE datasets are received continuously, and processing and analysis based thereon is performed in a continuous manner. Hence, flowchart 500 may be considered a snapshot of the continuously performed operations consistent with some embodiments of the invention.

The computing system 10 receives NDE datasets for each of a plurality of composite aircraft parts manufactured in the manufacturing process (block 502). The computing system 10 aligns the received NDE datasets to a simulated model of the type of part (block 504), and the computing system 10 analyzes the aligned NDE datasets to determine a spatially correlated statistic for each composite aircraft part of the type (block 506). The computing system 10 aligns the spatially correlated statistics to the simulated model (block 508). In some embodiments, the computing system 10 receives manufacturing data associated with the type of part (block 510), and the computing system 10 associates the manufacturing data with the simulated model (block 512). The manufacturing data may include data that indicates: at least one manufacturing step of the manufacturing process associated with one or more physical locations on the type of part, data that indicates a manufacturing apparatus utilized in the manufacturing process associated with at least one physical location on the type of part; a manufacturing parameter of the manufacturing process associated with at least one physical location on the type of part; a manufacturing tool utilized in the manufacturing process associated with at least one physical location on the type of part; at least one possible root cause problem associated with the manufacturing process and at least one physical location on the type of part.

The computing system may generate a display representation of the simulated model that visually represents the spatially correlated statistics, manufacturing data, and/or NDE data of the NDE datasets aligned on the simulated model (block 514). In some embodiments, the computing system 10 determines a manufacturing trend for the manufacturing process based at least in part on the spatially correlated statistics (block 516), and the computing system may analyze the manufacturing trend, NDE data, and/or baseline data associated with the simulated model to determine whether the manufacturing process is operating properly (blocks 518-520). In response to determining that the manufacturing process is operating properly ('Y' branch of block 520), the computing system 10 continues monitoring the manufacturing process. In response to determining that the manufacturing process is not operating properly ('N' branch of block 522), the computing system 10 may generate output data that indicates that the manufacturing process is not operating properly and/or the computing system 10 may determine a root cause problem associated with the manufacturing process based at least in part on the spatially correlated statistics, manufacturing trend, and/or manufacturing data (block 522). In general, the output data may be communicated such that an alarm or other such notification is generated for an operator/technician/supervisor associated with the manufacturing process.

Figure 21:
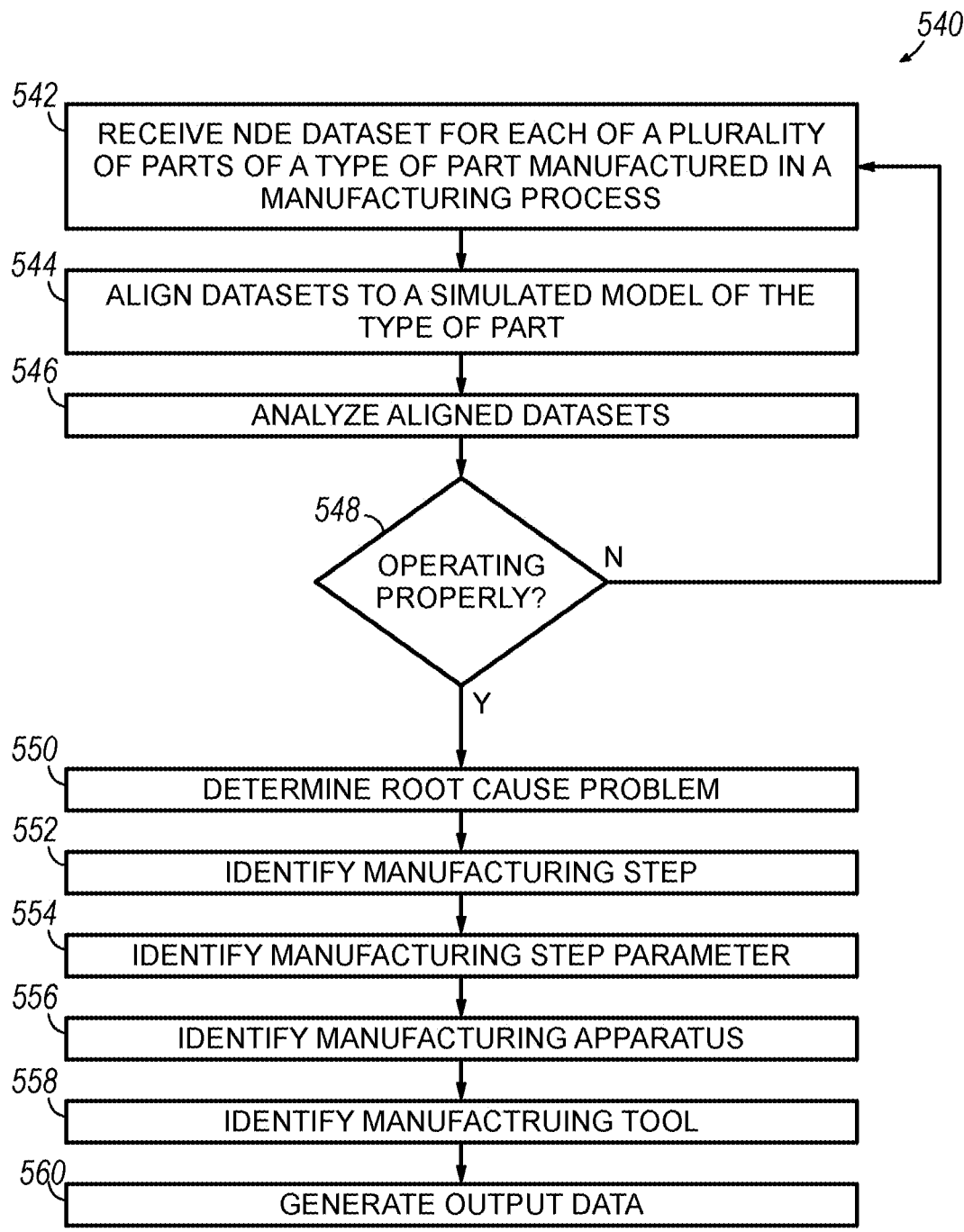
FIG. 21 is a flowchart that illustrates a sequence of operations that may be performed by the computing system and/or user device of FIG. 1 to analyze manufacture of a type of part by a manufacturing process.

FIG. 21 provides a flowchart 540 that illustrates a sequence of operations that may be performed by the computing system 10 to analyze manufacture of a type of part by a manufacturing process. The computing system may receive an NDE dataset for each part of a plurality of parts of the type of part (block 542). The computing device 10 aligns the NDE datasets to a simulated model associated with the type of part (block 544) and analyzes the aligned NDE datasets (block 546) to determine whether the manufacturing process is operating properly (block 548). In response to determining that the manufacturing process is operating properly ('Y' branch of block 548), the computing system 10 may continue analyzing the manufacturing process as NDE datasets are received.

In response to determining that the manufacturing process is not operating properly ('N' branch of block 548), the computing system 10 may determine a root cause problem associated with the manufacturing process based at least in part on the aligned NDE data (block 550). Furthermore, the computing system 10 may identify one or more other aspects of the manufacturing process based on the aligned NDE data, including at least one manufacturing step (block 552), at least one manufacturing parameter associated with the manufacturing step (block 554), at least one manufacturing apparatus (block 556), and/or at least one manufacturing tool (558). In some embodiments, the computing system may determine the root cause problem based at least in part on the one or more identified aspects of the manufacturing process. In some embodiments, the computing system 10 may generate output data responsive to determining that the manufacturing process is not operating properly (block 560). The output data may be communicated to provide a notification that the manufacturing process is not operating properly, and the output data may include the determined root cause problem and/or one or more identified manufacturing aspects.

Figure 22:
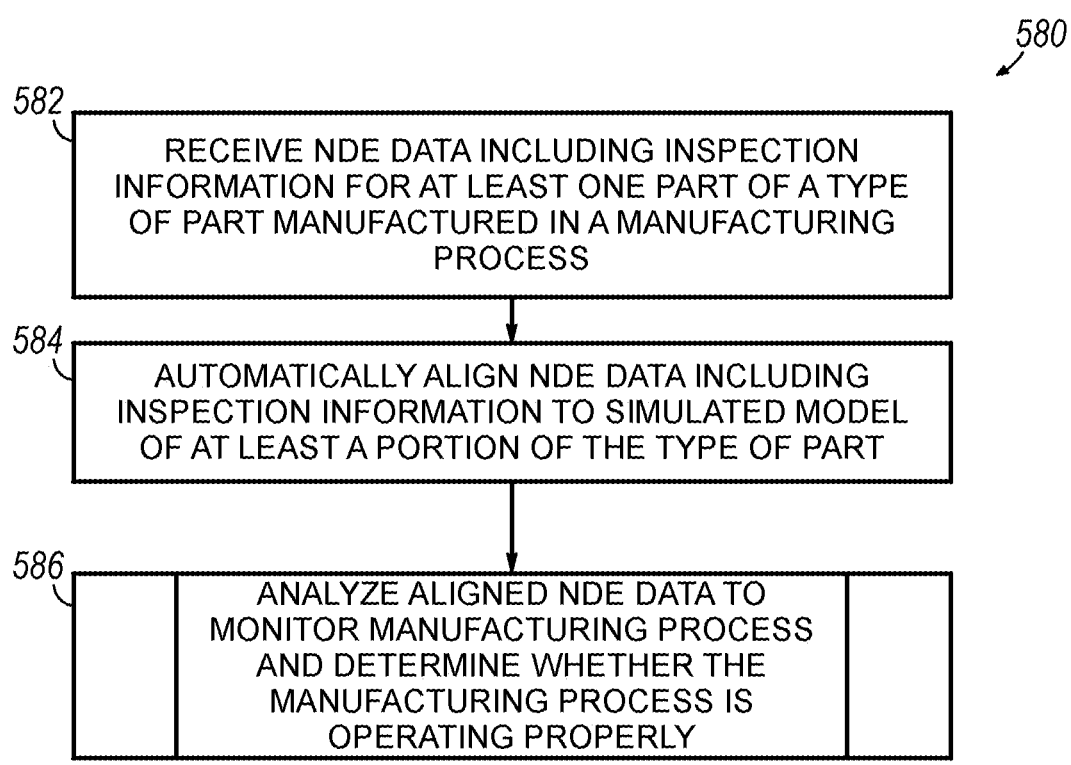
FIG. 22 is a flowchart that illustrates a sequence of operations that may be performed by the computing system and/or user device of FIG. 1 to analyze manufacture of a type of part by a manufacturing process.

FIG. 22 provides a flowchart 580 that illustrates a sequence of operations that may be performed by the computing system 10 to analyze the manufacture of a type of part by a manufacturing process. The computing system may receive NDE data associated with the type of part, where the NDE data includes associated inspection information (block 582). The computing system may automatically align the NDE data including the inspection information to corresponding simulated locations on a simulated model associated with the type of part (block 584), and the computing system may analyze the aligned NDE data to monitor the manufacturing process and determine whether the manufacturing process is operating properly (block 586).

Figure 23:
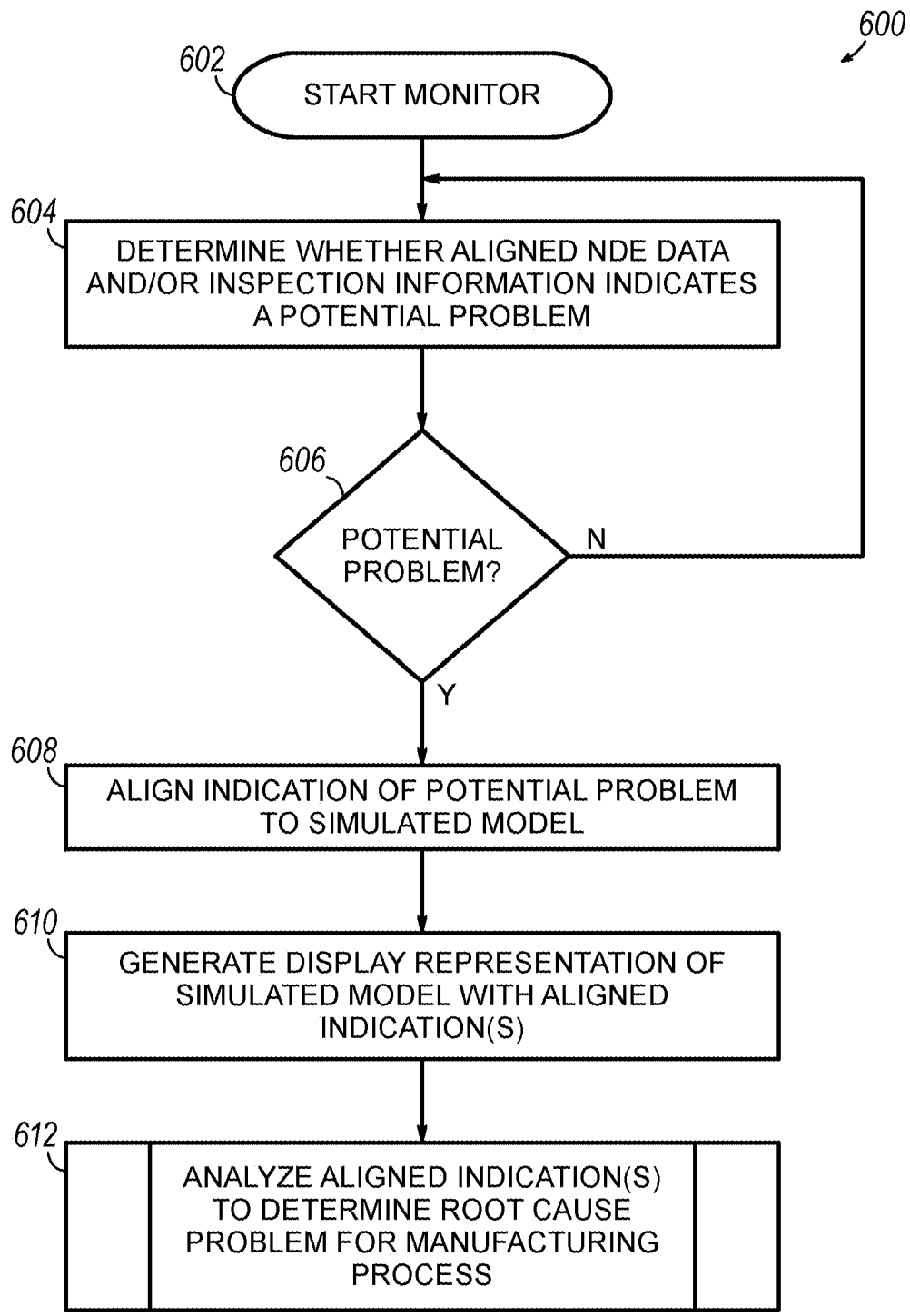
FIG. 23 is a flowchart that illustrates a sequence of operations that may be performed by the computing system and/or user device of FIG. 1 during the analysis of the manufacturing process illustrated in FIG. 22.

FIG. 23 provides a flowchart 600 that illustrates a sequence of operations that the computing system may perform to monitor the manufacturing process. When the monitor is initialized (block 602), the computing system 10 determines whether the aligned NDE data and/or inspection information indicates a potential problem associated with the manufacturing process (blocks 604-606). In response to determining that the aligned NDE data and/or the inspection information does not indicate a potential problem ('N' branch of block 606), the computing system 10 continues analyzing the NDE data and/or inspection information as it is received and aligned.

In response to determining that the aligned NDE data and/or inspection information indicates a potential problem ('Y' branch of block 606), the computing system 10 may align an indication of the potential problem to the simulated model (block 608). The computing system 10 may generate a display representation of the simulated model that visually represents the aligned indication on the simulated model (block 610). In some embodiments the computing system 10 may analyze the one or more aligned indications to determine a root cause problem associated with the manufacturing process and the aligned indication (block 612).

Figure 24:
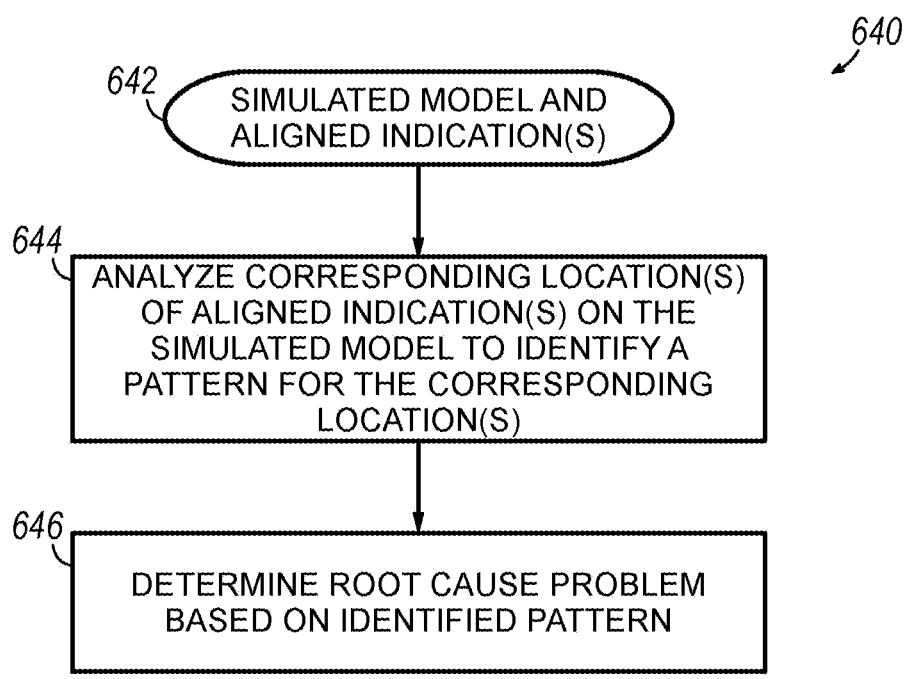
FIG. 24 is a flowchart that illustrates a sequence of operations that may be performed by the computing system and/or user device of FIG. 1 during the analysis of the manufacturing process illustrated in FIG. 22.

FIG. 24 provides flowchart 640 that illustrates a sequence of operations that the computing system may perform to determine a root cause problem based on a plurality of indications of potential problems aligned to the simulated model (block 642). The computing system 10 may analyze the corresponding simulated locations of the simulated model to which the indications are aligned to identify a pattern for the corresponding location (block 644). The computing system 10 may determine a root cause problem for the manufacturing process based at least in part on the identified pattern (block 646).

Figure 25:
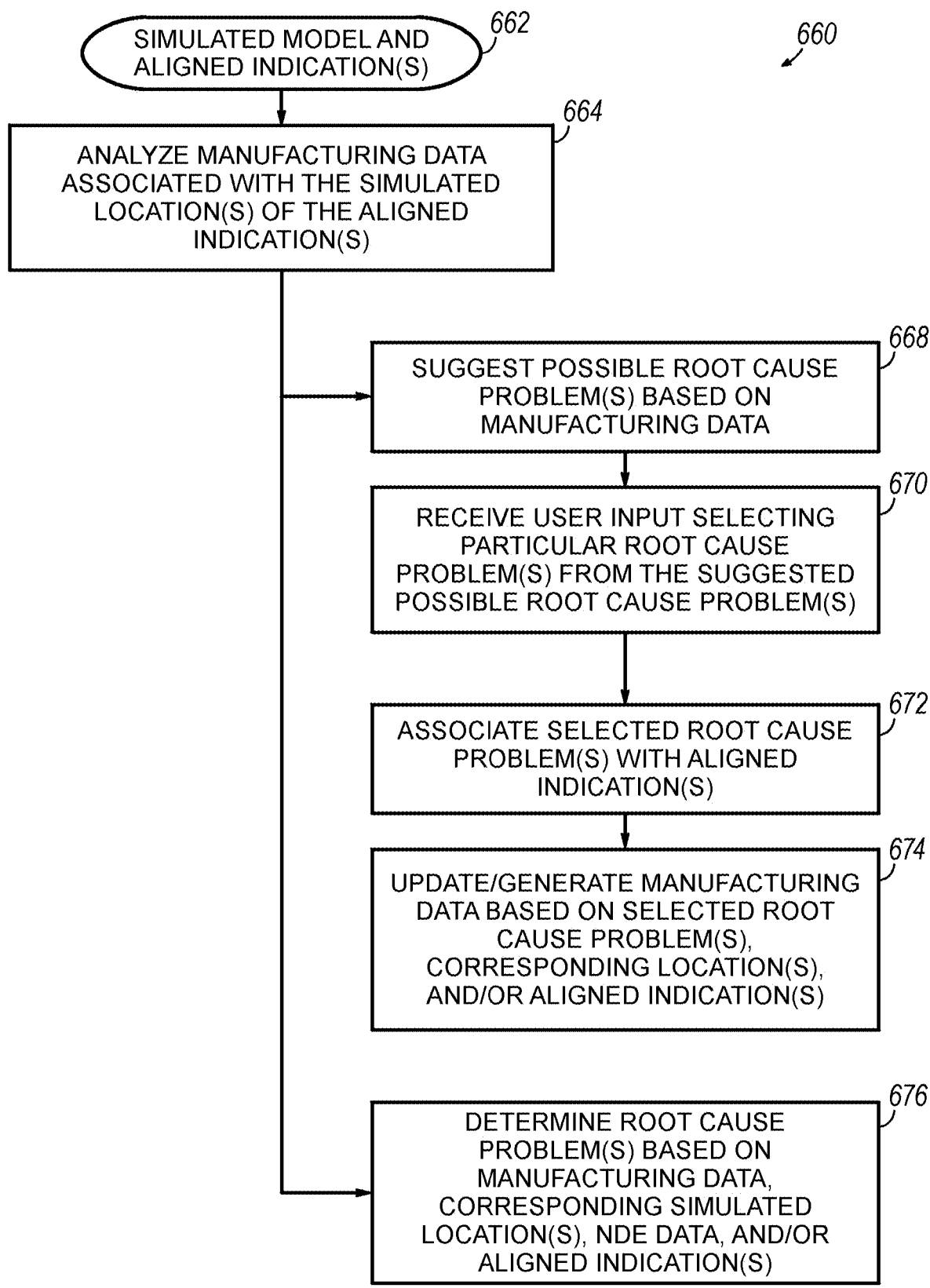
FIG. 25 is a flowchart that illustrates a sequence of operations that may be performed by the computing system and/or user device of FIG. 1 during the analysis of the manufacturing process illustrated in FIG. 22.

FIG. 25 provides flowchart 660 that illustrates a sequence of operations that may be performed by the computing system 10 consistent with embodiments of the invention when processing the simulated model with aligned indications of potential problems (block 662). The computing system 10 may analyze manufacturing data associated with the one or more simulated locations of the one or more aligned indications (block 664). In some embodiments, the computing system 10 may suggest one or more possible root cause problems based at least in part on the manufacturing data (block 668). In these embodiments, the computing system 10 may output data via a user interface to a user, where the output data includes the one or more suggested possible root cause problems. The computing system receives user input data that selects one or more root cause problems from the suggested possible root cause problems (block 670), and the computing system 10 may associate the one or more selected root cause problems with one or more aligned indications (block 672). In some embodiments, the computing system 10 may generate and/or update manufacturing data associated with the type of part based at least in part on the one or more selected root cause problems, the associated aligned indications, and/or the simulated locations (block 674). Consistent with some embodiments, the computing system 10 may determine a root cause problem associated with the manufacturing process based on manufacturing data associated with the simulated model, one or more aligned indications, simulated locations of the aligned indications, and/or aligned NDE data (block 676).

Figure 26:
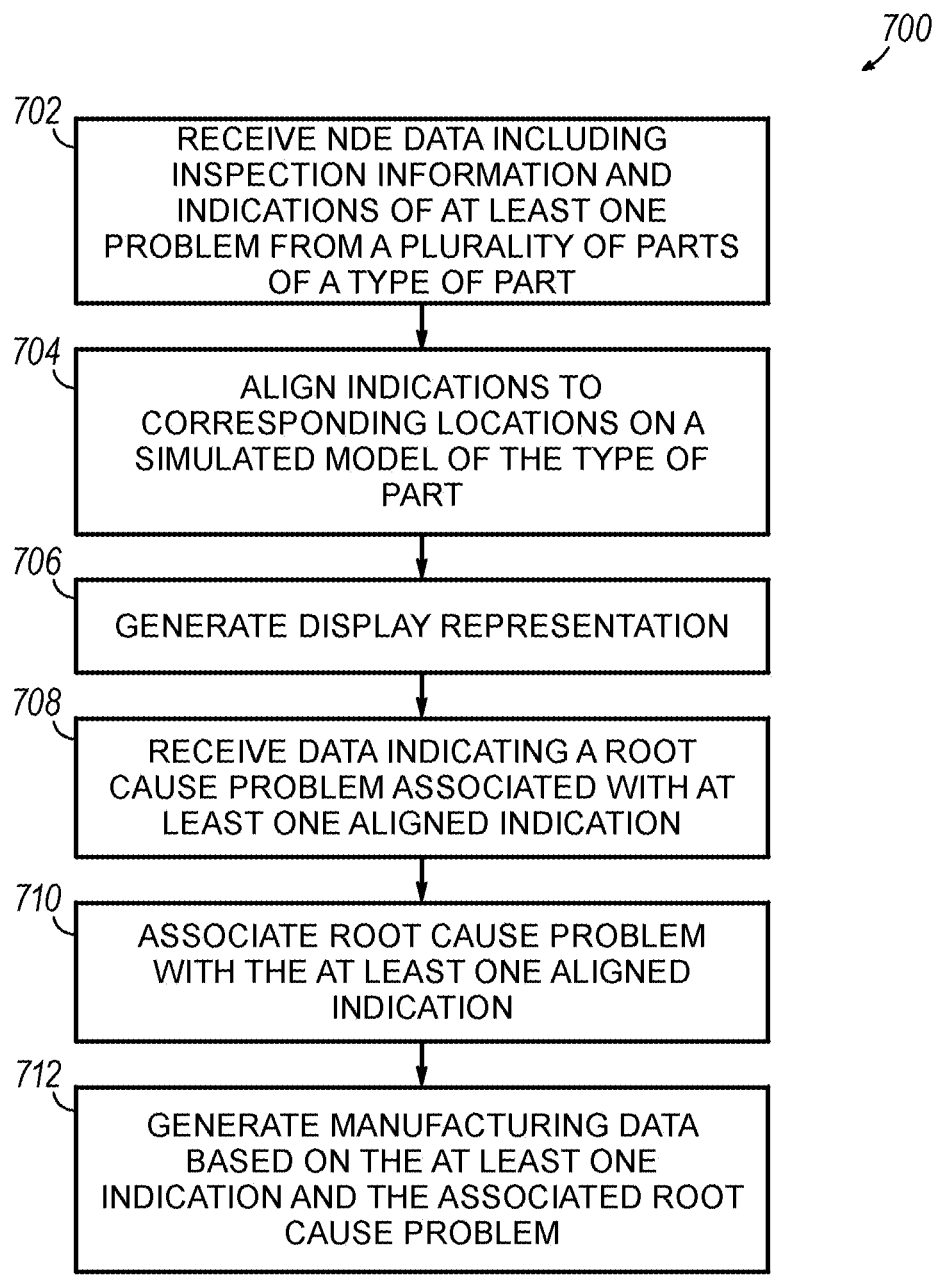
FIG. 26 is a flowchart that illustrates a sequence of operations that may be performed by the computing system and/or user device of FIG. 1 to analyze manufacture of a type of part by a manufacturing process.

Turning now to FIG. 26, this figure provides a flowchart 700 which illustrates a sequence of operations that may be performed by the computing system 10 to analyze manufacture of a type of part by a manufacturing process. The computing system receives NDE data that includes inspection information and a plurality of indications of one or more potential problems (block 702) for a part of the type of part, and the computing system 10 may align the NDE data to a simulated model associated with the type of part (block 704). The computing system generates a display representation of the simulated model that visually represents the aligned indications on the simulated model (block 706), and the computing system 10 may receive data that indicates a root cause problem associated with at least one particular indication (block 708). The computing system associates the root cause problem with the at least one particular indication (block 710), and the computing system may generate manufacturing data based on the at least one particular indication and the root cause problem (block 712).

Figure 27:
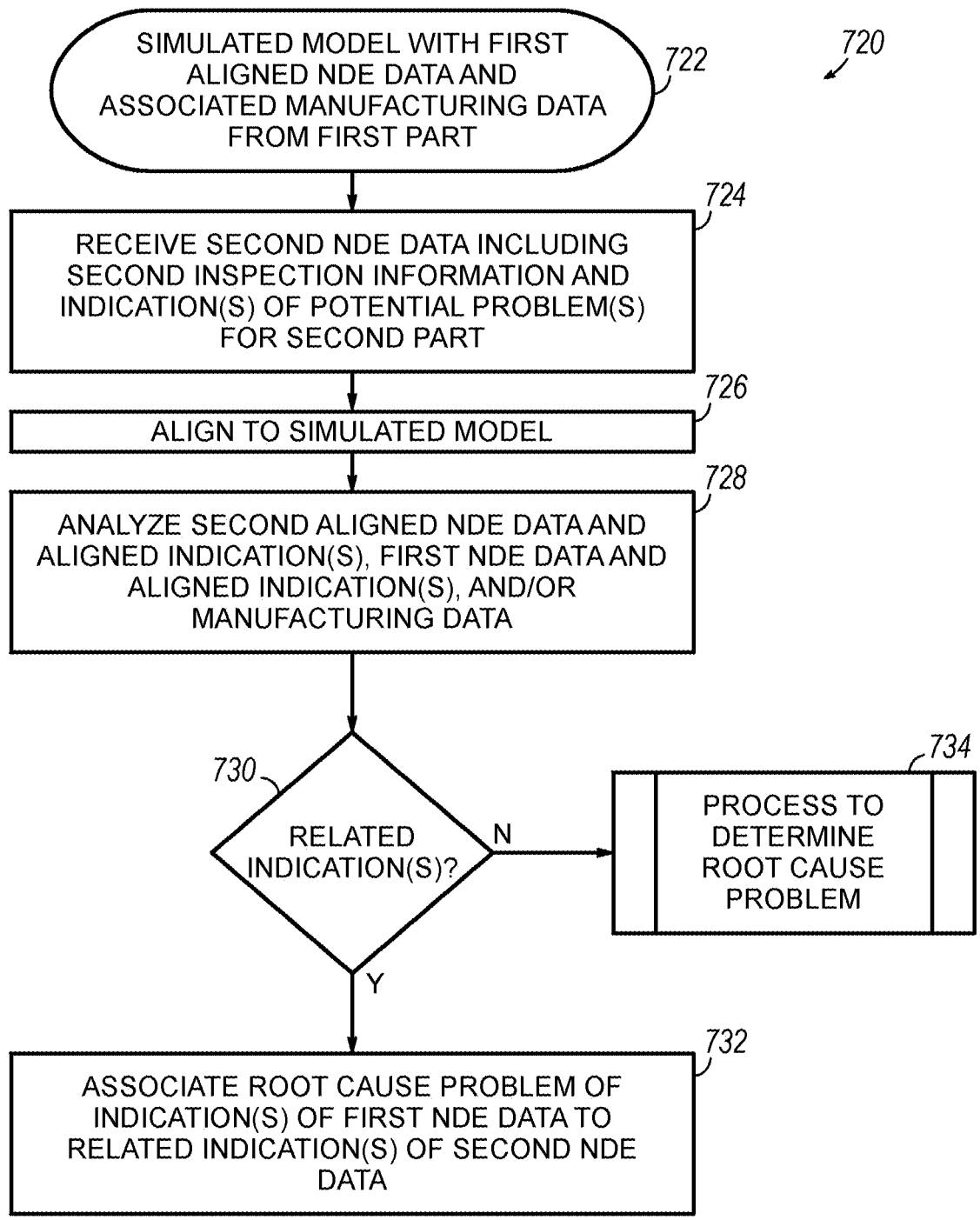
FIG. 27 is a flowchart that illustrates a sequence of operations that may be performed by the computing system and/or user device of FIG. 1 during the analysis of the manufacturing process illustrated in FIG. 26.

FIG. 27 provides a flowchart 720 that illustrates operations that may be performed by the computing system 10 to analyze the manufacturing process based at least in part on the simulated model, aligned NDE data, and manufacturing data of FIG. 26 (block 722) (i.e., first NDE data from a first part). The computing system 10 may receive second NDE data that includes inspection information and at least one indication of at least one potential problem for a second part of the type of part (block 724), and the computing system aligns the NDE data to the simulated model (block 726). The aligned second NDE data and aligned indication may be analyzed by the computing system 10 to determine whether the aligned at least one indication of the second NDE data is related to any indications of the first NDE data based at least in part on the manufacturing data (blocks 728-730). In response to determining that one or more indications of the second NDE data are related to one or more indications of the first NDE data ('Y' branch of block 730), the computing system may associate the root cause problem associated with the one or more related indications of the first NDE data to the one or more related indications of the second NDE data (block 732). If the one or more indications of the second NDE data are not determined to be related to any indications of the first NDE data, the computing system 10 may process the indications of the second NDE as described above with respect to FIG. 26 to determine an associated root cause problem (block 734).

Figure 28:
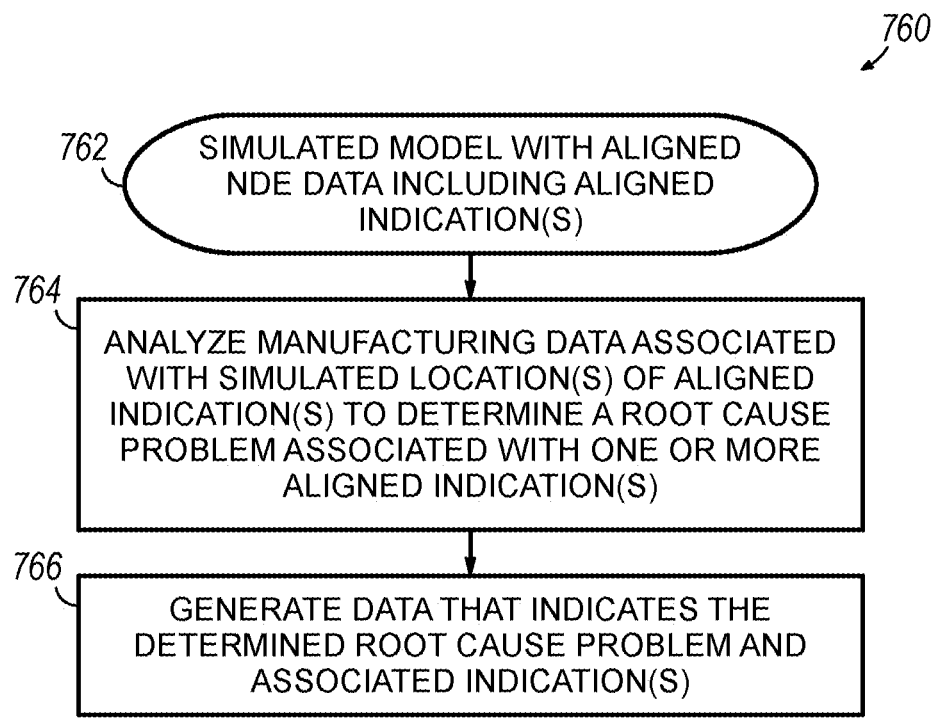
FIG. 28 is a flowchart that illustrates a sequence of operations that may be performed by the computing system and/or user device of FIG. 1 during the analysis of the manufacturing process illustrated in FIG. 26.

FIG. 28 provides flowchart 760 that illustrates operations that may be performed by the computing system 10 to determine a root cause problem associated with NDE data and/or one or more indications of one or more potential problems aligned to the simulated model of FIG. 26 (block 762). The computing system 10 may analyze the aligned NDE data and/or indications and manufacturing data associated with the simulated locations to which the NDE data and/or indications are aligned to determine a root cause problem associated with each of the one or more aligned indications (block 764). The computing system 10 may generate data that indicates the determined root cause problem and the associated one or more indications (block 766).

Figure 29:
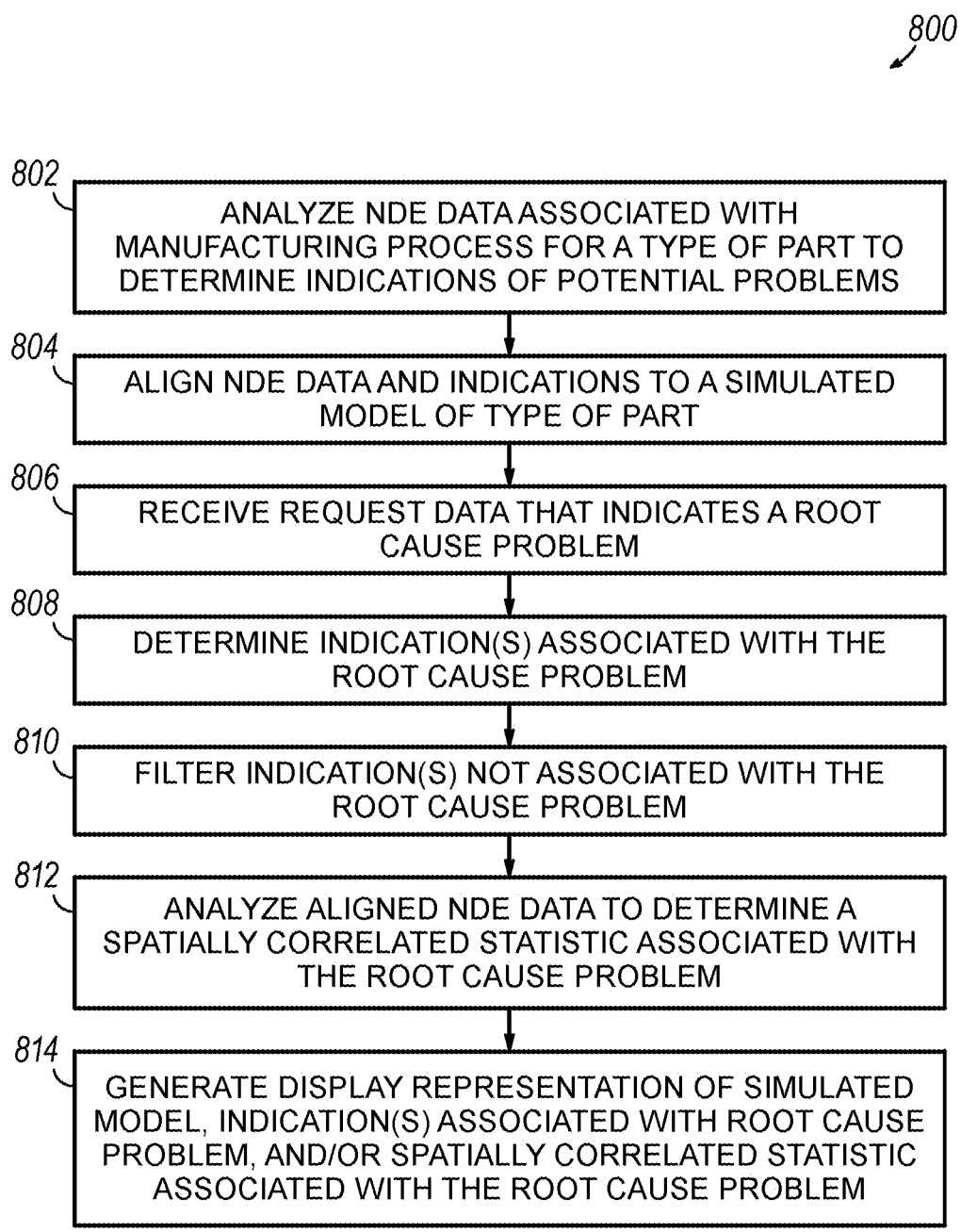
FIG. 29 is a flowchart that illustrates a sequence of operations that may be performed by the computing system and/or user device of FIG. 1 to model the manufacture of a type of part by a manufacturing process.

Turning now to FIG. 29, this figure provides flowchart 800 that illustrates a sequence of operations that may be performed by the computing system 10 to model the manufacture of a type of part by a manufacturing process. The computing system 10 may analyze NDE data associated with the manufacturing process to determine indications of potential problems associated with the manufacturing process (block 802), and the computing system 10 aligns the NDE data and indications to a simulated model associated with the type of part (block 804). The computing system 10 may receive request data that indicates a root cause problem associated with the manufacturing process (block 806). The computing system 10 identifies aligned indications associated with the root cause problem (block 808), and the computing system 10 filters any indications not associated with the root cause problem out of the simulated model (block 810). In some embodiments, the computing system 10 may analyze the aligned NDE data to determine a spatially correlated statistic associated with the root cause problem (block 812). Furthermore, the computing system may generate a display representation of the simulated model that visually represents the aligned indications and/or spatially correlated statistic associated with the root cause problem on the simulated model (block 814).

Figure 30:
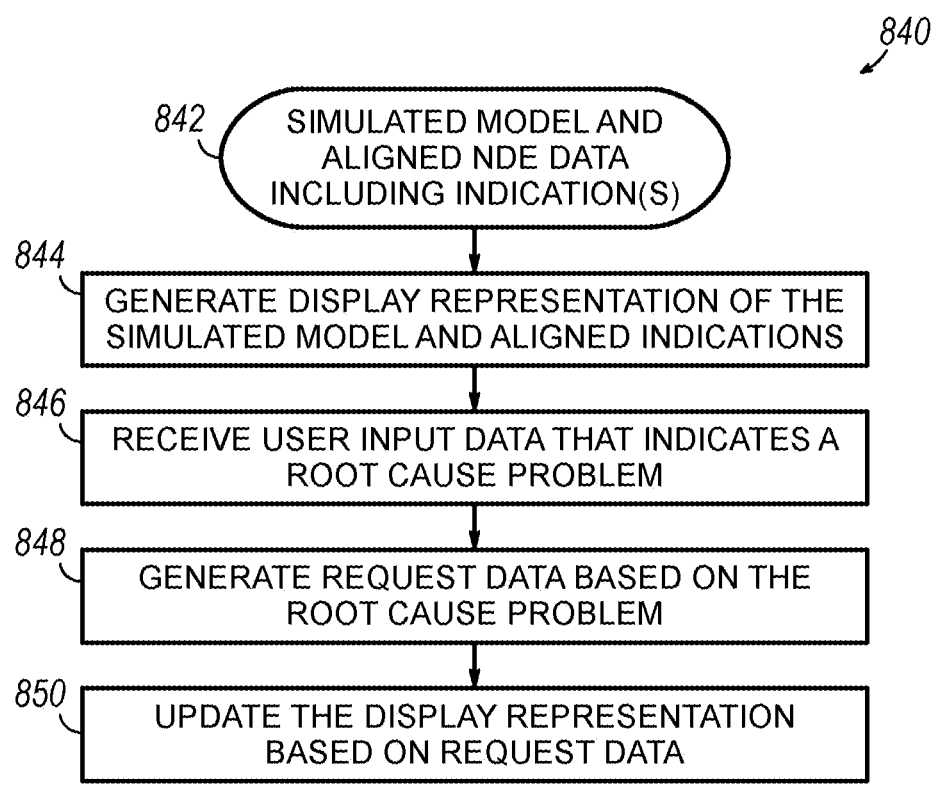
FIG. 30 is a flowchart that illustrates a sequence of operations that may be performed by the computing system and/or user device of FIG. 1 during the modeling of the manufacturing process illustrated in FIG. 29.

FIG. 30 provides a flowchart 840 that illustrates operations that may be performed by the computing system 10 when processing the simulated model and the aligned NDE data of FIG. 29 (block 842). The computing system 10 may generate a display representation of the simulated model that visually represents the aligned indications on the simulated model (block 844). The computing system 10 may receive user input data that indicates a root cause problem for the manufacturing process (block 846), and the computing system 10 may generate request data that indicates the root cause problem based on the user input data (block 848). The computing system may update the display representation based on the request data such that the display representation visually represents only indications associated with the root cause problem (block 850).

Figure 31:
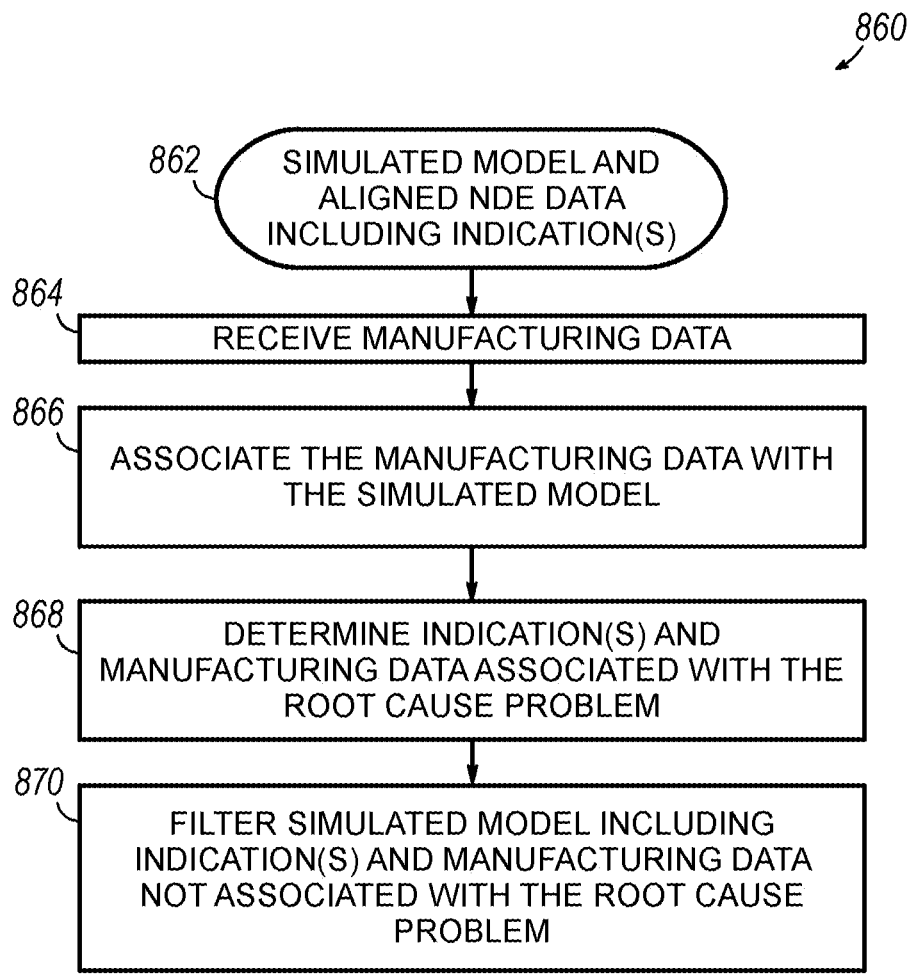
FIG. 31 is a flowchart that illustrates a sequence of operations that may be performed by the computing system and/or user device of FIG. 1 during the modeling of the manufacturing process illustrated in FIG. 29.

Turning to FIG. 31, this figure provides a flowchart 860 that illustrates operations that may be performed by the computing system 10 when processing the simulated model and the aligned NDE data of FIG. 29 (block 862). The computing system 10 may receive manufacturing data associated with the manufacturing process (block 864) and associate the manufacturing data with one or more simulated locations on the simulated model (block 866). The computing system may determine one or more indications and manufacturing data associated with the root cause problem of the received request of FIG. 29 (block 868), and the computing system 10 may filter the simulated model, aligned indications, and the manufacturing data to remove the aligned indications and manufacturing data not associated with the root cause problem (block 870).

Figure 32:
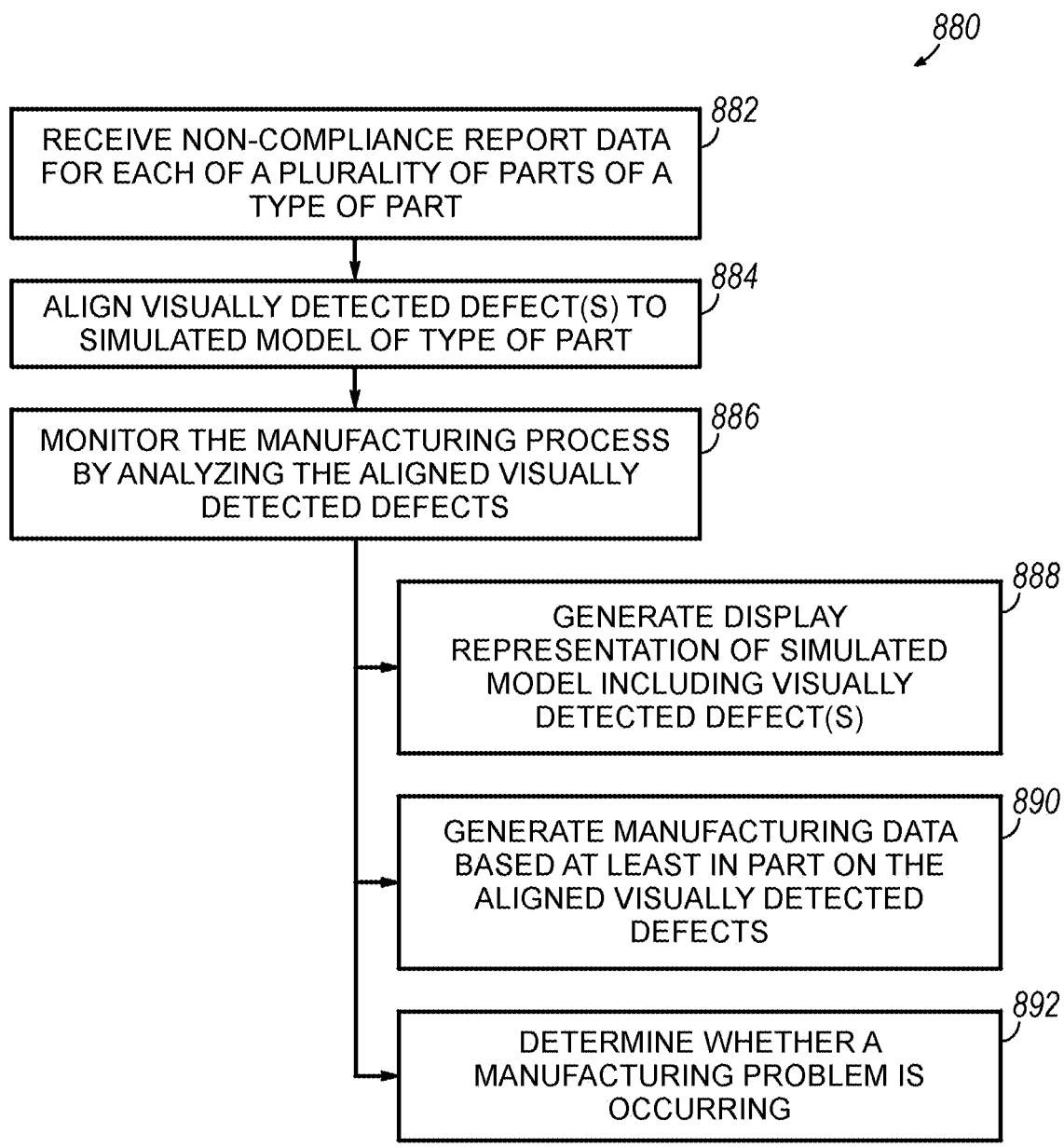
FIG. 32 is a flowchart that illustrates a sequence of operations that may be performed by the computing system and/or user device of FIG. 1 to monitor the manufacture of a type of part by a manufacturing process.

Referring to FIG. 32, this figure provides a flowchart 880 that illustrates a sequence of operations that may be performed by the computing system 10 to monitor a manufacturing process that manufactures a type of part. The computing system 10 may receive non-compliance report data for each of a plurality of parts manufactured by the manufacturing process (block 882), where each non-compliance report indicates at least one visually detected defect corresponding to a location on the respective part that is associated with the non-compliance report. In general, a non-compliance report and visually detected defect thereof may not be as location specific as NDE data; hence, in many embodiments the particular location of the visually detected defect may correspond to an area, volume, region, and/or other such spatially related feature. The computing system 10 aligns each visually detected defect to a simulated model of the type of part (block 884), where each visually detected defect is aligned to one or more simulated locations on the simulated model that correspond to the particular location of the visually detected defect on the respective part. The computing system 10 may monitor the manufacturing process by analyzing the aligned visually detected defects (block 886).

In some embodiments, the computing system 10 may generate a display representation of the simulated model that includes the one or more aligned visually detected defects (block 888). In addition, the computing system 10 may generate manufacturing data based at least in part on the aligned visually detected defects (block 890). Furthermore, the computing system may determine whether a manufacturing problem is occurring (block 892). In general, if the computing system 10 detects a plurality of visually detected defects aligned to common and/or related simulated locations, the computing system 10 may determine that a manufacturing problem is occurring.

Figure 33:
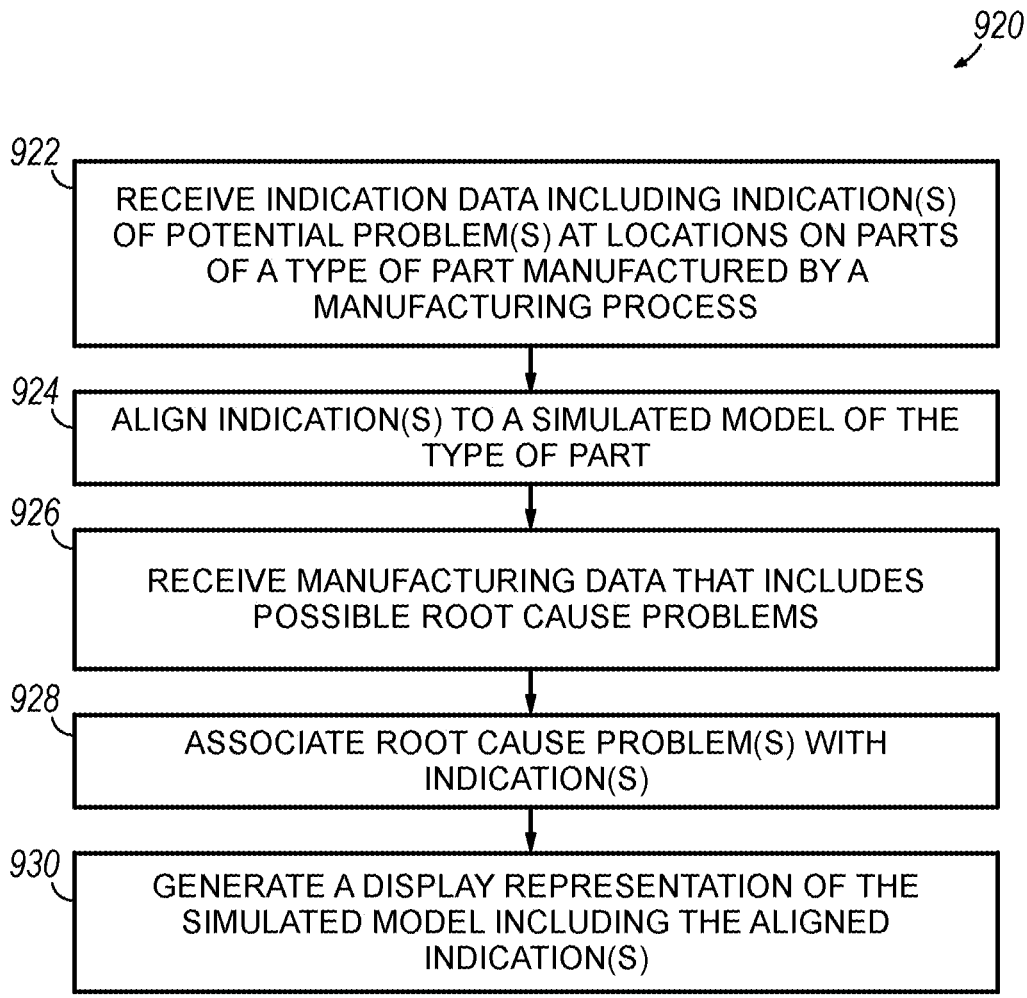
FIG. 33 is a flowchart that illustrates a sequence of operations that may be performed by the computing system and/or user device of FIG. 1 to monitor the manufacture of a type of part by a manufacturing process.

With reference to FIG. 33, this figure provides a flowchart 920 that illustrates a sequence of operations that may be performed by the computing system 10 to monitor a manufacturing process that manufactures a type of part. The computing system 10 may receive indication data that includes indications of potential problems at locations on parts of the type of part manufactured by the manufacturing process (block 922), and the computing system aligns the indications to a simulated model of the type of part (block 924), where each indication is aligned to one or more simulated locations on the simulated model that correspond to the location on the part at which the potential problem was detected. The computing system 10 may receive manufacturing data associated with the manufacturing process that includes one or more possible root cause problems associated with the manufacturing process (block 926). The computing system may analyze the aligned indications and the received manufacturing data and associate the manufacturing data with the aligned indications (block 928). In some embodiments, the computing system 10 may generate a display representation of the simulated model that visually represents the aligned indications and/or the manufacturing data with the simulated model (block 930).

Figure 34:
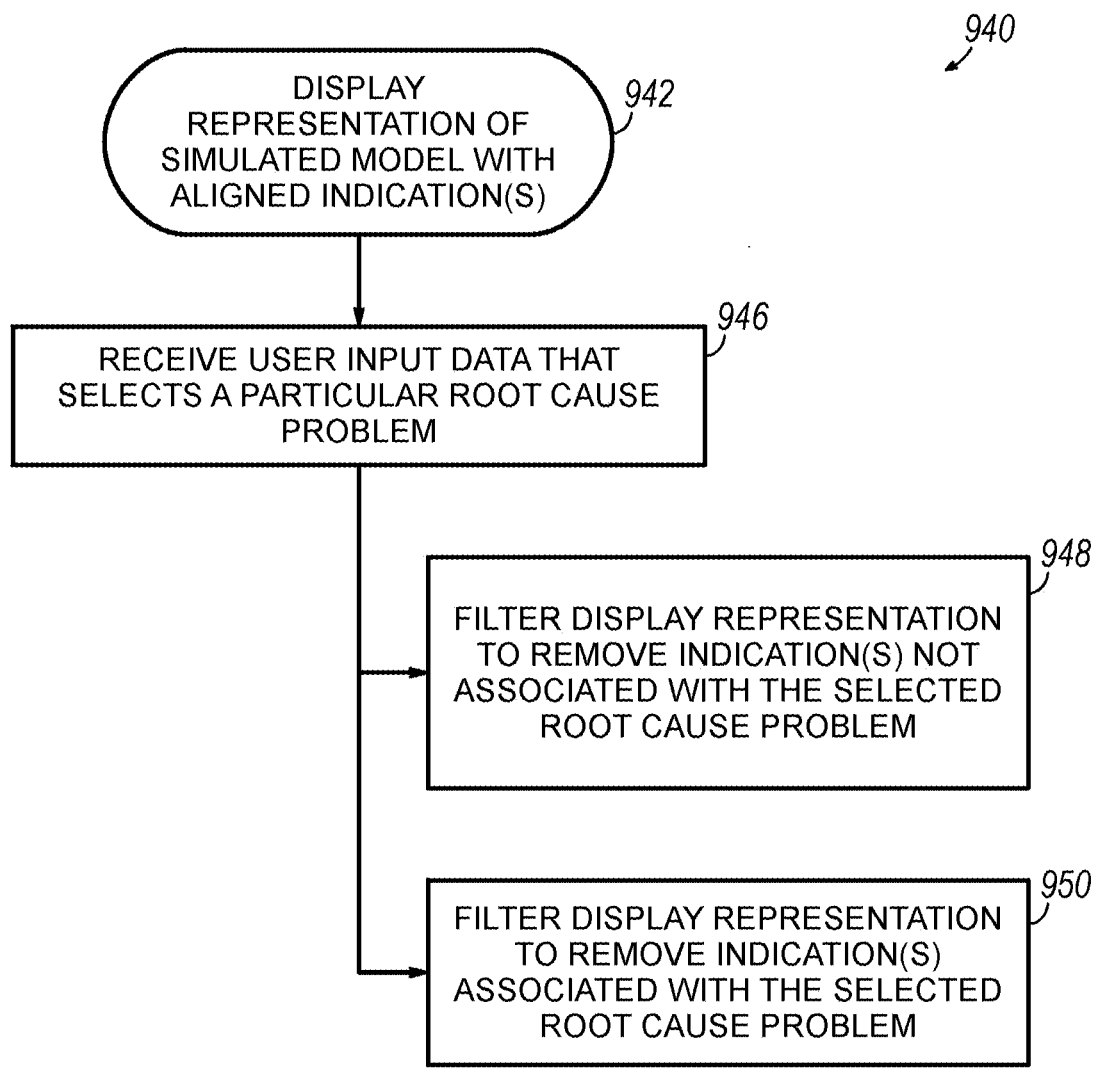
FIG. 34 is a flowchart that illustrates a sequence of operations that may be performed by the computing system and/or user device of FIG. 1 during the monitoring of the manufacturing process illustrated in FIG. 33.

FIG. 34 provides a flowchart 940 that illustrates operations the computing system 10 may perform when processing the display representation of the simulated model including the aligned indications of FIG. 33 (block 942). The computing system 10 may receive user input data that selects a particular root cause problem (block 946), and the computing system 10 may filter the display representation to remove indications not associated with the selected root cause problem (block 948). In other embodiments, the computing system 10 may filter the display representation to remove indications associated with the selected root cause problem (block 950).

Figure 35:
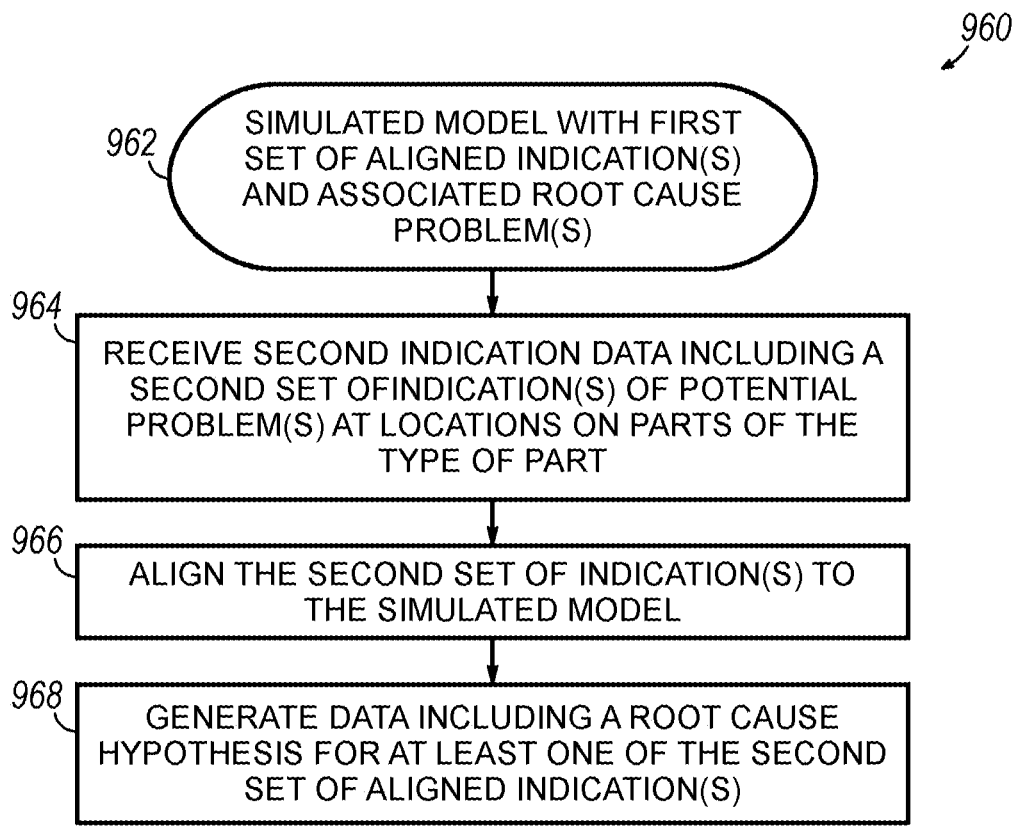
FIG. 35 is a flowchart that illustrates a sequence of operations that may be performed by the computing system and/or user device of FIG. 1 during the monitoring of the manufacturing process illustrated in FIG. 33.

FIG. 35 provides a flowchart 940 that illustrates operations the computing system 10 may perform related to the operations of FIG. 33, where the aligned indications of FIG. 33 are a first set of aligned indications, when processing the display representation of the simulated model including the aligned indications of FIG. 33 (block 962). The computing system 10 may receive second indication data including a second set of indications of potential problems at locations on parts of the type of part (block 964), and the computing system 10 may align the second set of indications (block 966). Based on the root cause problem associated with the first set of aligned indications and the simulated locations thereof, the computing system 10 may generate data that suggests a possible root cause problem (i.e., a root cause hypothesis) for at least one indication of the second set of aligned indications (block 968). Hence, the computing system may rely on previously identified root cause problems to determine possible root cause problems for received indications of potential problems.

Figure 36:
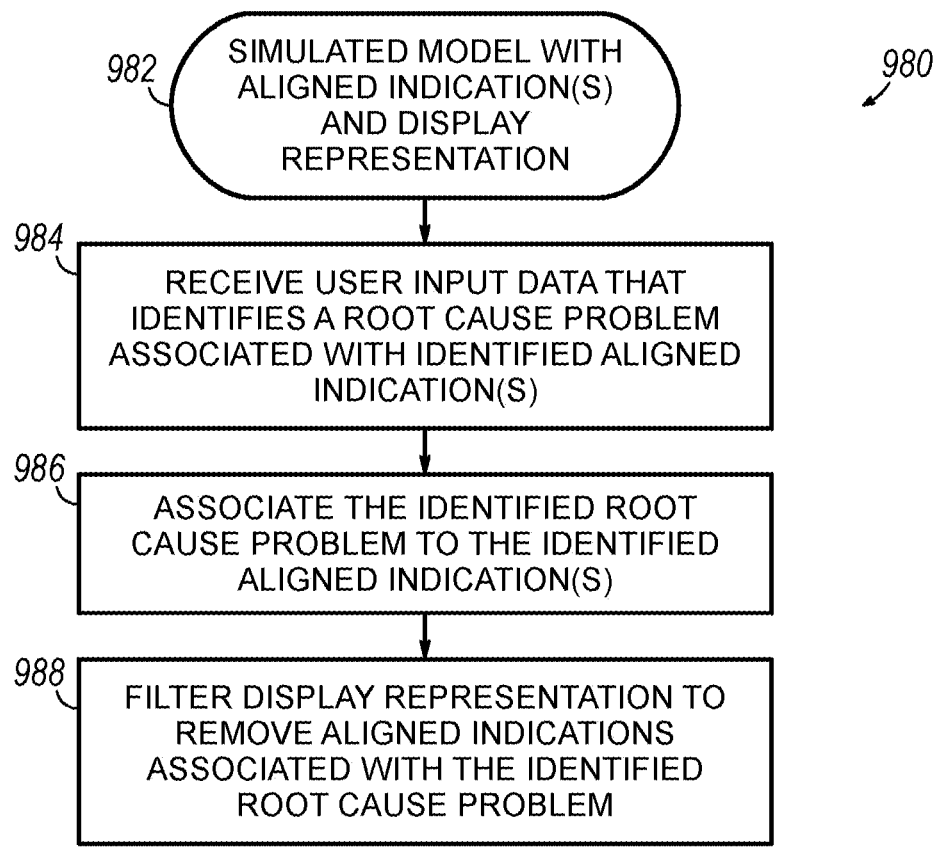
FIG. 36 is a flowchart that illustrates a sequence of operations that may be performed by the computing system and/or user device of FIG. 1 during the monitoring of the manufacturing process illustrated in FIG. 33.

FIG. 36 provides a flowchart 980 that illustrates operations the computing system 10 may perform when processing the display representation of the simulated model including the aligned indications of FIG. 33 (block 982). The computing system 10 may receive user input data that identifies a root cause problem associated with one or more identified aligned indications (block 984), and the computing system 10 may associate the identified root cause problem to the identified one or more aligned indications (block 986). In some embodiments, the computing system 10 may filter the display representation to remove aligned indications associated with the identified root cause problem from the display representation (block 988).

Figure 37:
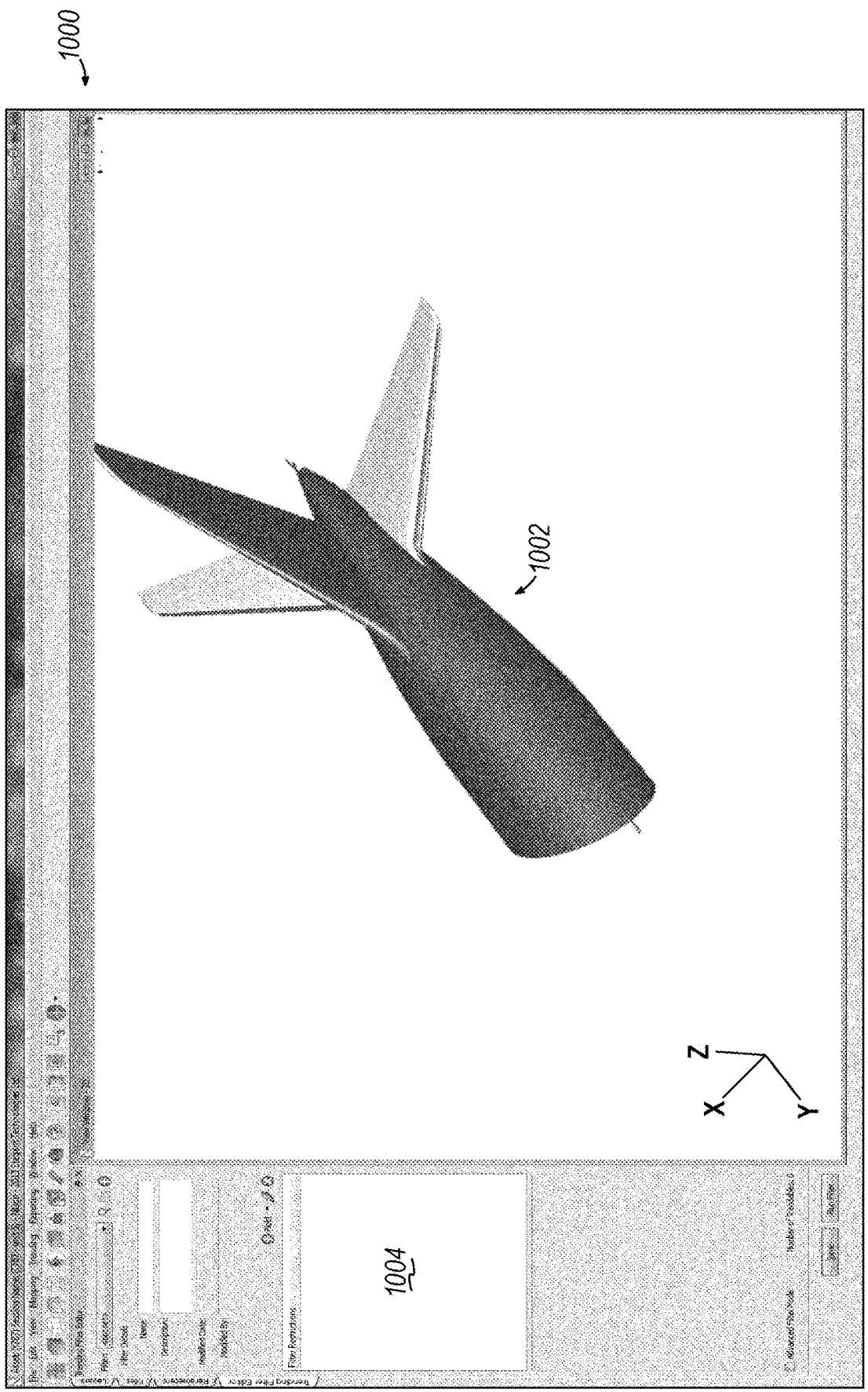
FIG. 37 is a diagrammatic illustration of an example graphical user interface that includes a display representation of a simulated model of a type of part that may be output on a display associated with the user device and/or computing system of FIG. 1.
Figure 38:
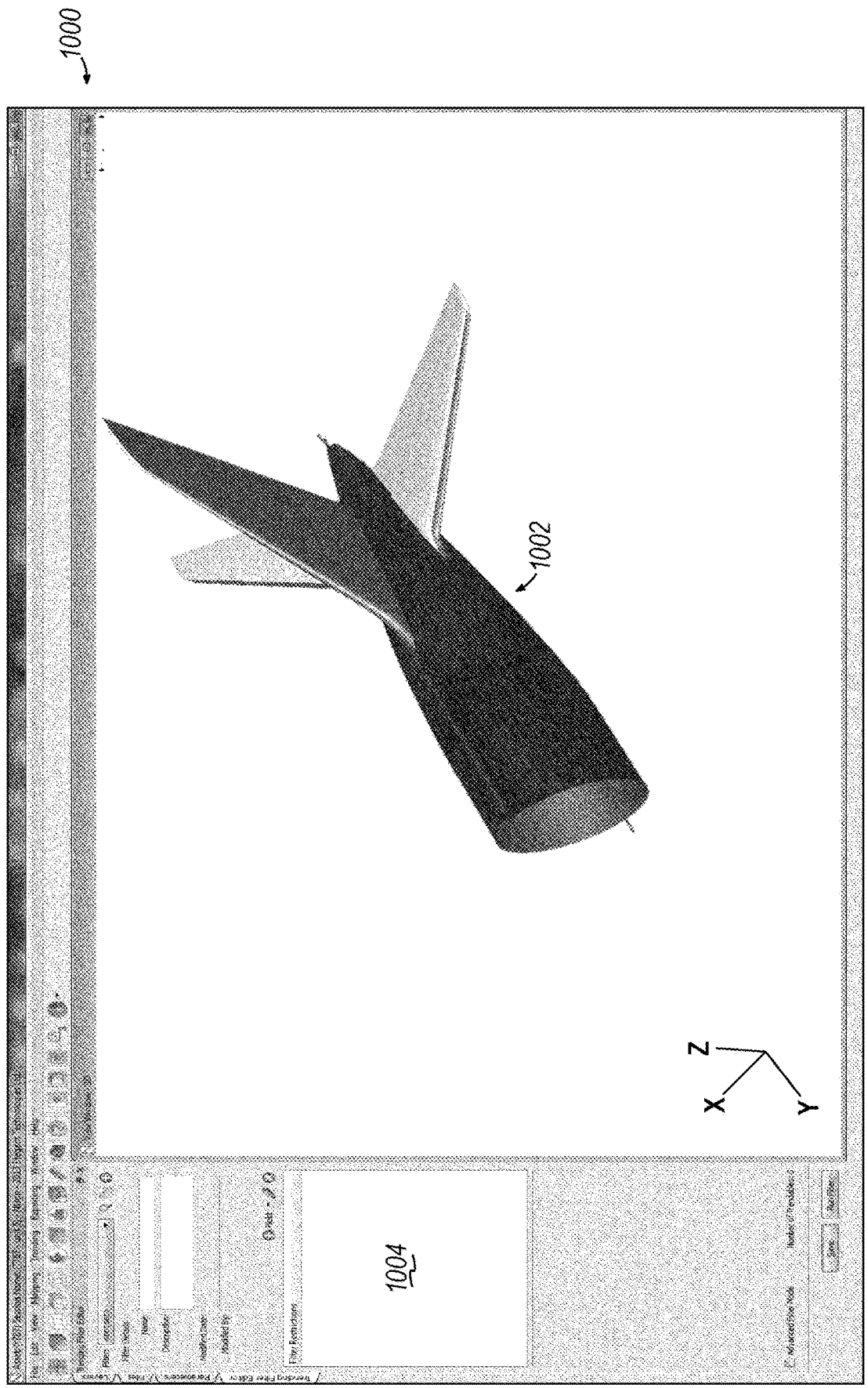
FIG. 38 is a diagrammatic illustration of the example graphical user interface of FIG. 37 where the display representation of the simulated model includes a visual representation of aligned NDE data on the simulated model.
Figure 39A:
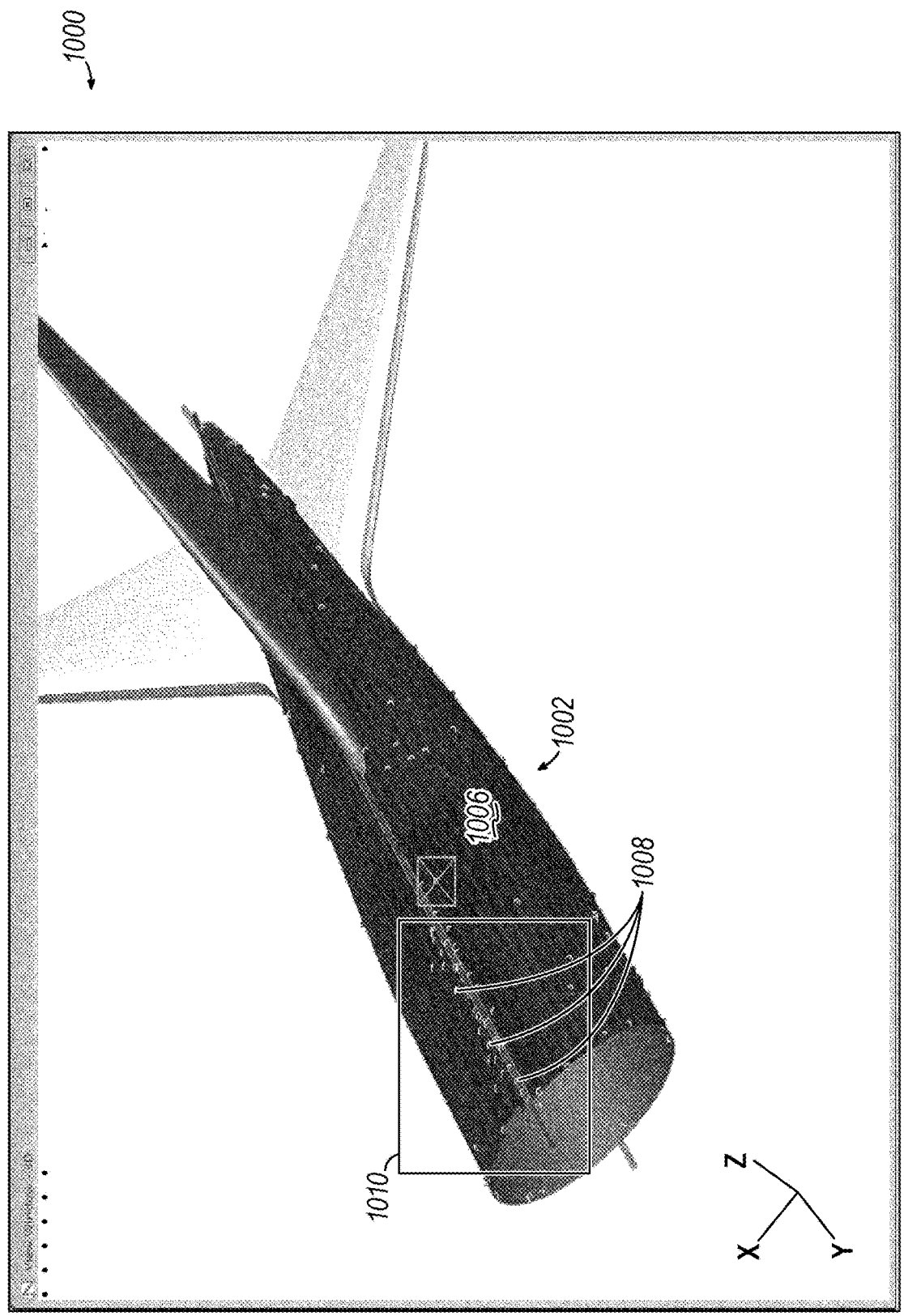
Figure 39B:
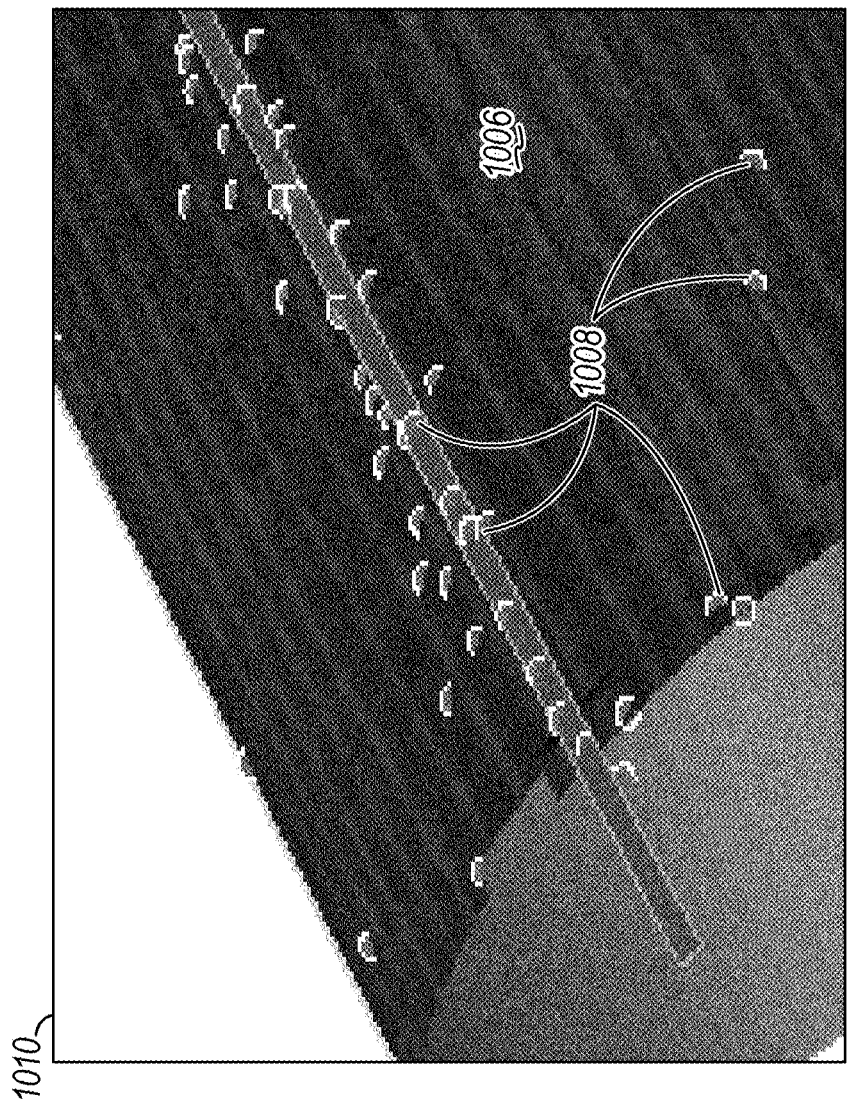
Figure 39C:
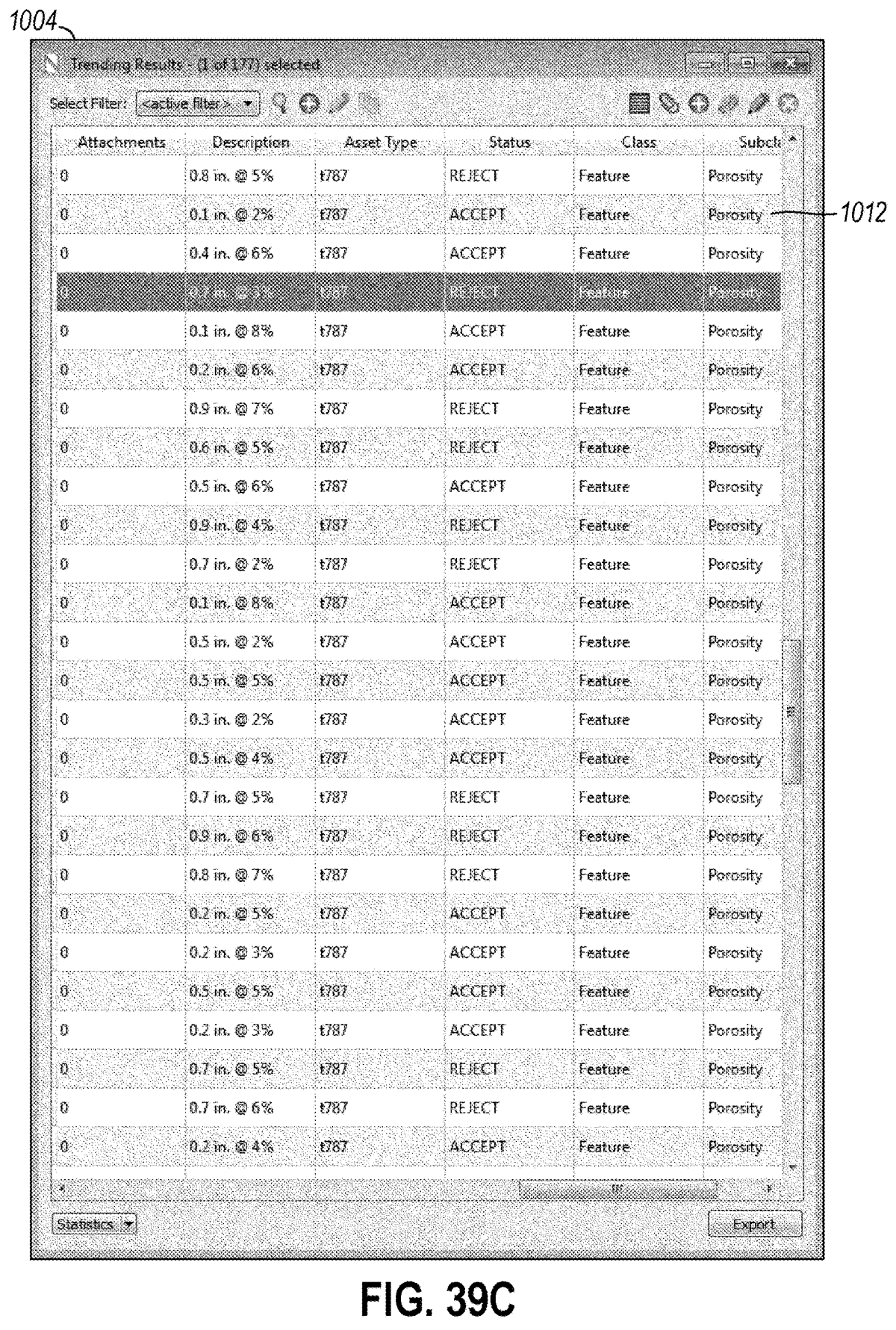
Figure 40:
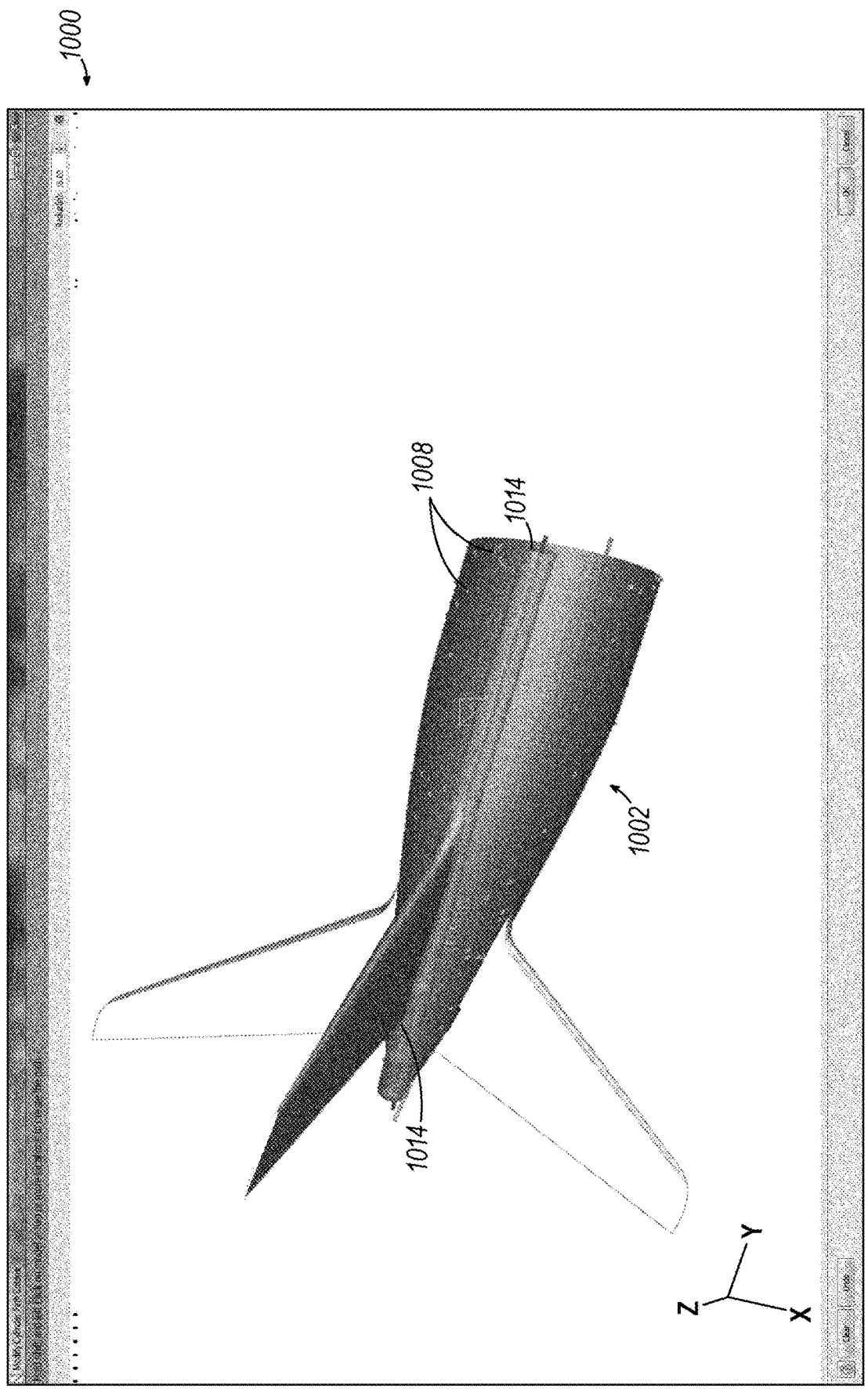
FIG. 40 is a diagrammatic illustration of the example graphical user interface of FIG. 37 where the display representation of the simulated model includes a visual representation of aligned indications of potential problems and a highlighted area selected by user input that indicates an area of interest.

Turning now to FIG. 37, this figure provides an example illustration of a graphical user interface (GUI') 1000 that may be output to a display by a processor executing an application on the user device 12 and/or computing system 10. In this example, the GUI 1000 includes a three dimensional generated display representation of a simulated model of a type of composite aircraft part 1002. In this example, the GUI 1000 may include the display representation 1002 as well as facilitate user interface with the display representation to input data (such as selecting an area of interest on the display representation) via one or more included interface features 1004 (i.e., selection buttons, text input boxes, etc.). FIG. 38 provides an example illustration of the GUI 1000 of FIG. 37, where the generated display representation 1002 of FIG. 38 includes aligned NDE data 1006, which in the example, corresponds to aligned ultrasonic scan data that may be utilized to determine a porosity value and/or other such physical characteristic at a location of a part. FIGS. 39A-C provide an example illustration of the GUI 1000 of FIG. 38, where the generated display representation 1002 of FIGS. 39A, B includes aligned indications of potential problems 1008. FIG. 39B provides a close up view of the selected area 1010 of FIG. 39A to better illustrate the aligned indications 1008. FIG. 39C provides the interface features 1004 portion of the GUI 1000, where the interface features 1004 portion of the GUI 1000 includes information related to the aligned indications 1012. FIG. 40 provides an example illustration of the GUI 1000 of FIGS. 37-39A-C, where the user is interfacing with the GUI to select an area of interest 1014 on the display representation 1002.

Figure 41A:
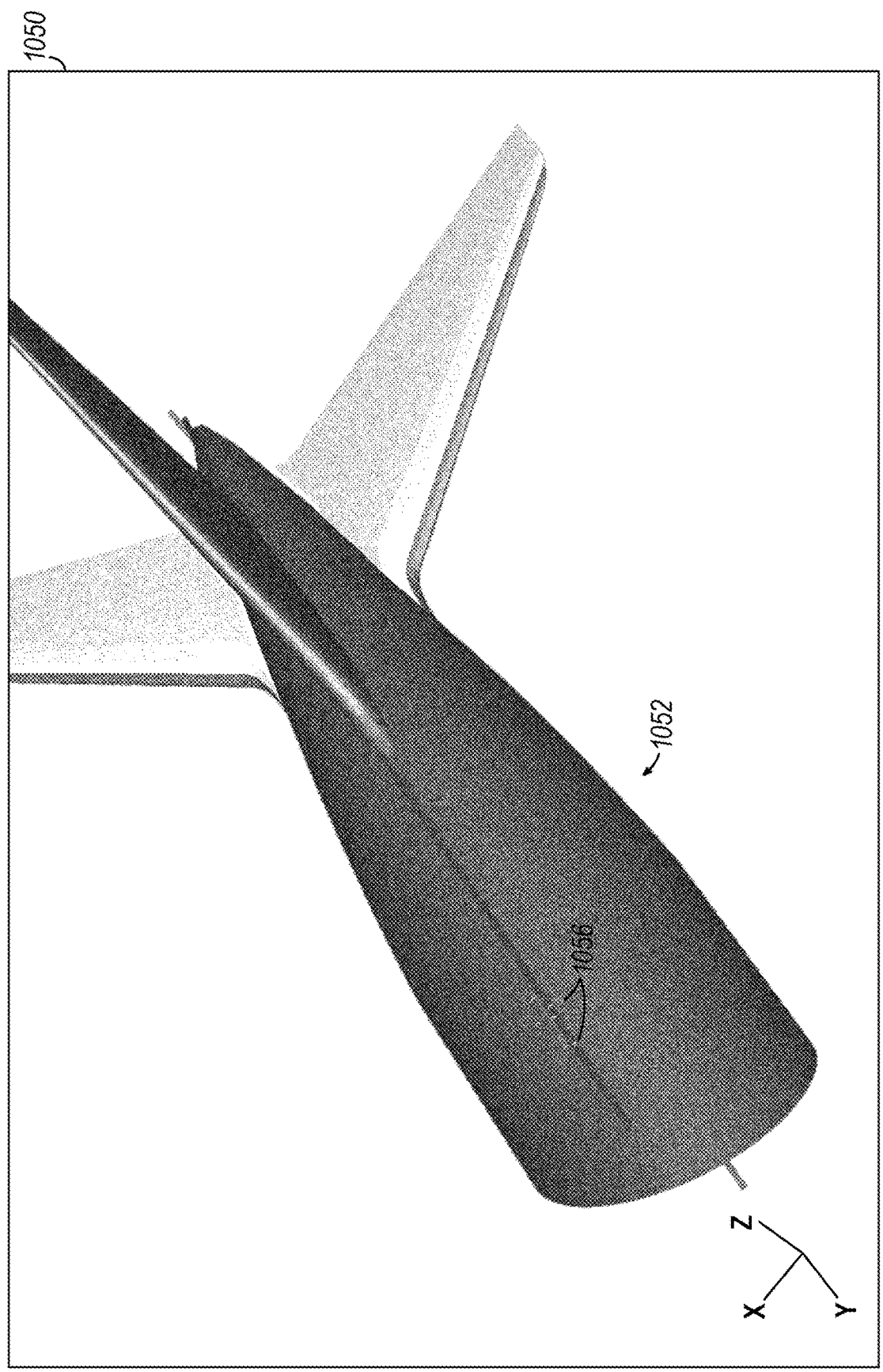
FIGS. 41A-B are diagrammatic illustrations of an example graphical interface that includes a display representation of a simulated model of a type of part including a visual representation of indications of potential problems associated with a first part of the type of part that may be output on a display associated with the user device and/or computing system of FIG. 1.
Figure 41B:
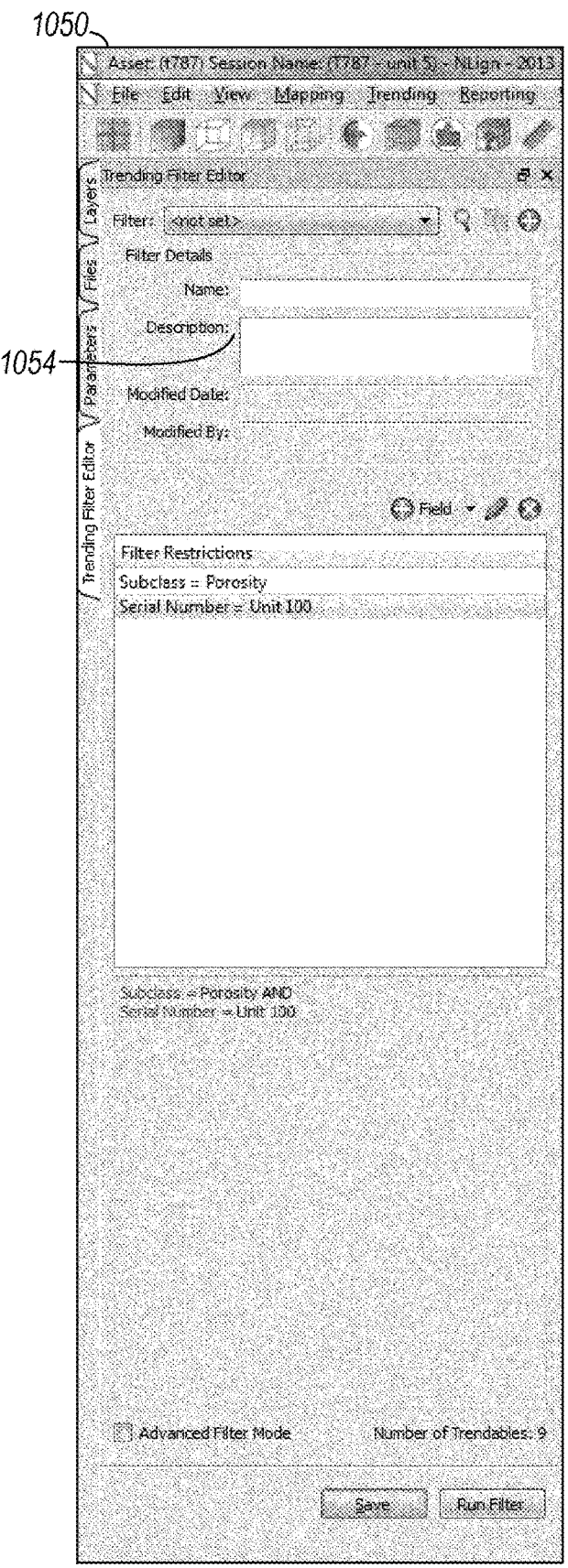
Figure 42A:
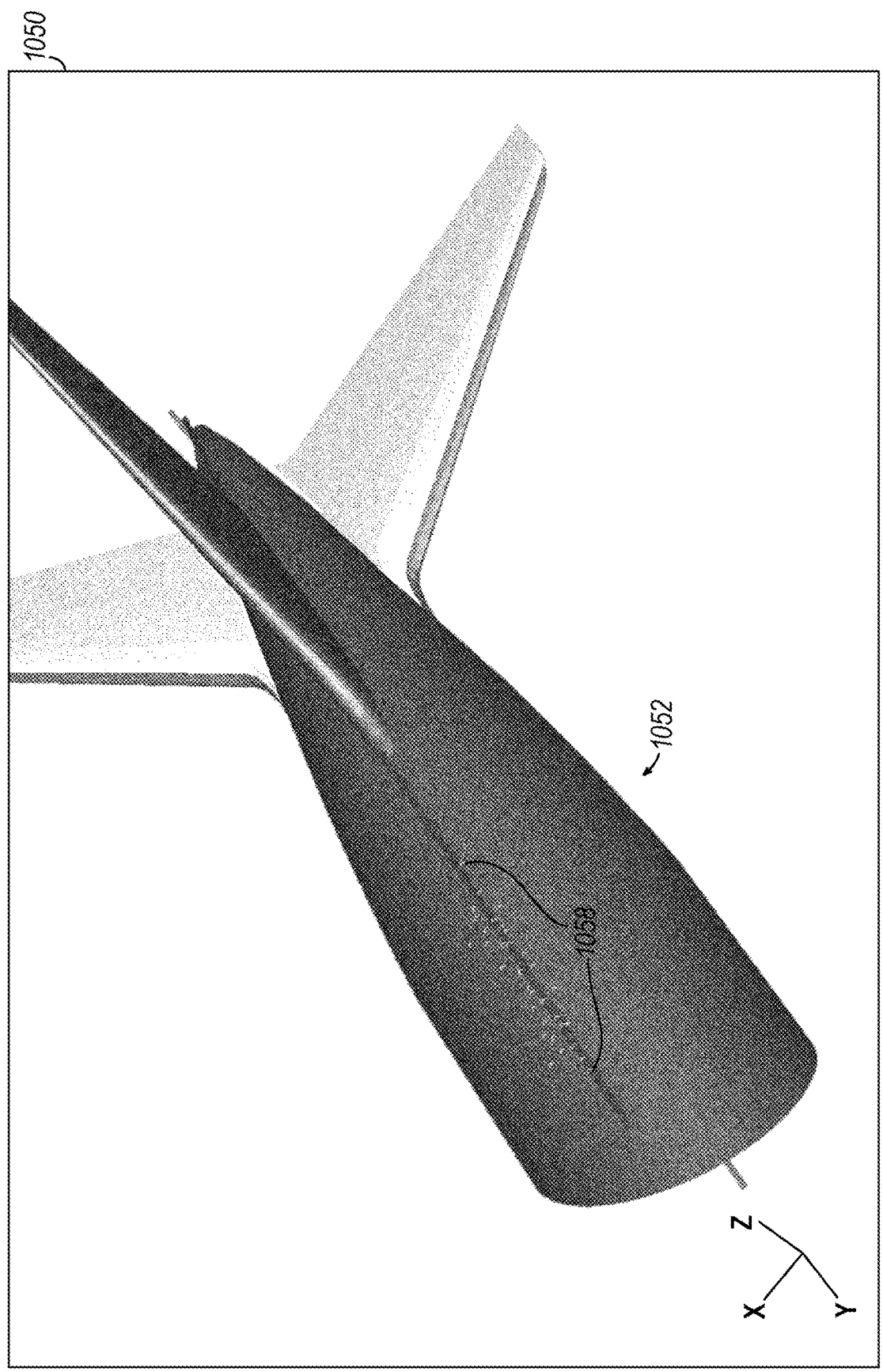
FIGS. 42A-B are diagrammatic illustrations of the example graphical interface of FIGS. 41A-B, where the display representation of the simulated model includes a visual representation of indications of potential problems associated with a second part of the type of part.
Figure 42B:
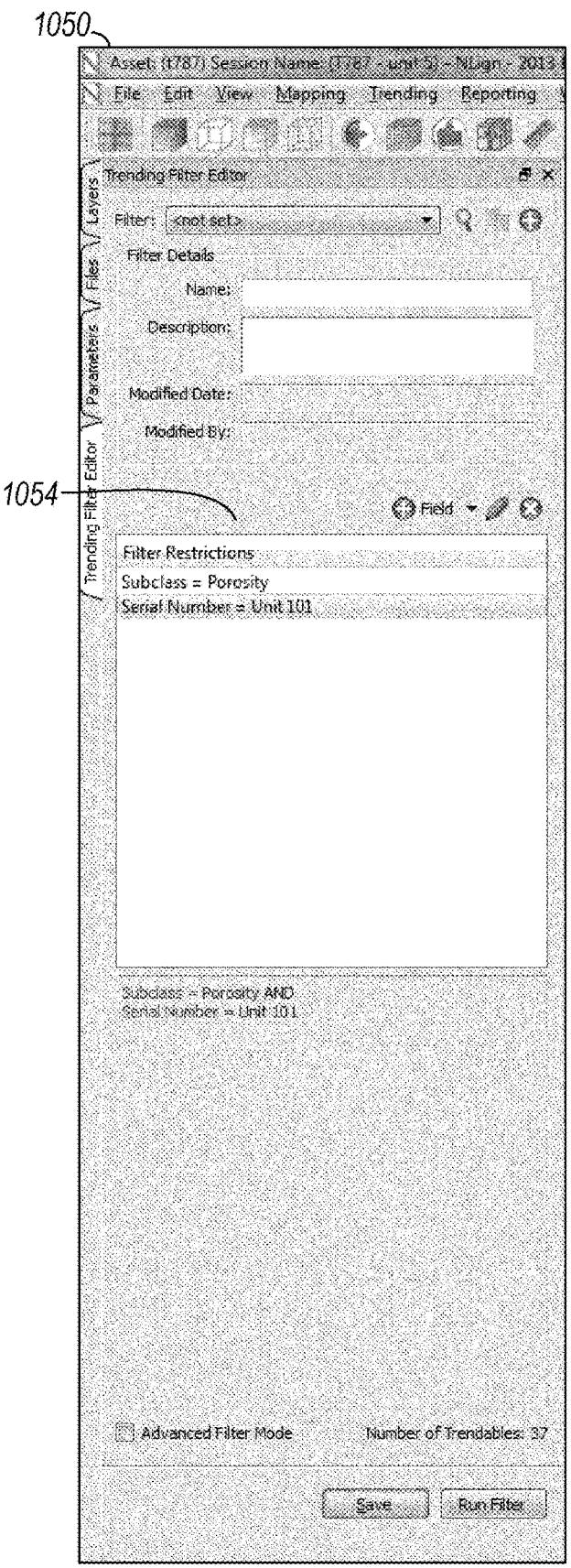

FIGS. 41A-B provide an example illustration of a GUI 1050 that may be output to a display by a processor executing an application on the user device 12 and/or computing system 10. In this example, the GUI 1050 includes a generated display representation of a simulated model of a type of composite aircraft part 1052 manufactured by a manufacturing process. In this example, the GUI 1050 may include the display representation 1052 as well as facilitate user interface with the display representation to input data (such as selecting an area of interest on the display representation) via one or more included interface features 1054. In this example, a plurality of indications 1056 associated with a first part of the type of part are aligned to the display representation of the simulated model 1052. As shown in the interface features 1054 of FIG. 41B, the indications 1056 correspond to 'Porosity' indications of a part numbered 'Serial Number=Unit 100'. FIGS. 42A-B provide an example illustration of the GUI 1050 of FIGS. 41A-B, where the display representation of the simulated model of the type of aircraft part 1052 includes a plurality of aligned indications 1058 associated with a second part of the type of part. As shown in the interface features 1054 of FIG. 42B, the indications 1056 correspond to 'Porosity' indications of a part numbered 'Serial Number=Unit 101'. In this example, the number of indications increases between the first part and the second part, which may be used to determine a manufacturing trend for the type of part, and/or determine that the manufacturing process for the type of part is not operating properly. In this particular example, the increase in the number of indications between Unit 100 and Unit 101 indicates that a seam in a mold used in the manufacturing process is likely wearing over time. For example, one or more seals and/or gaskets may be leaking air into the mold. If similar indications had been previously experienced on parts made in the manufacturing process and manufacturing data associated with a root cause problem was stored, embodiments of the invention may suggest the same root cause problem on the GUI by analyzing the aligned indications, manufacturing trend, and/or manufacturing data.

Figure 43:
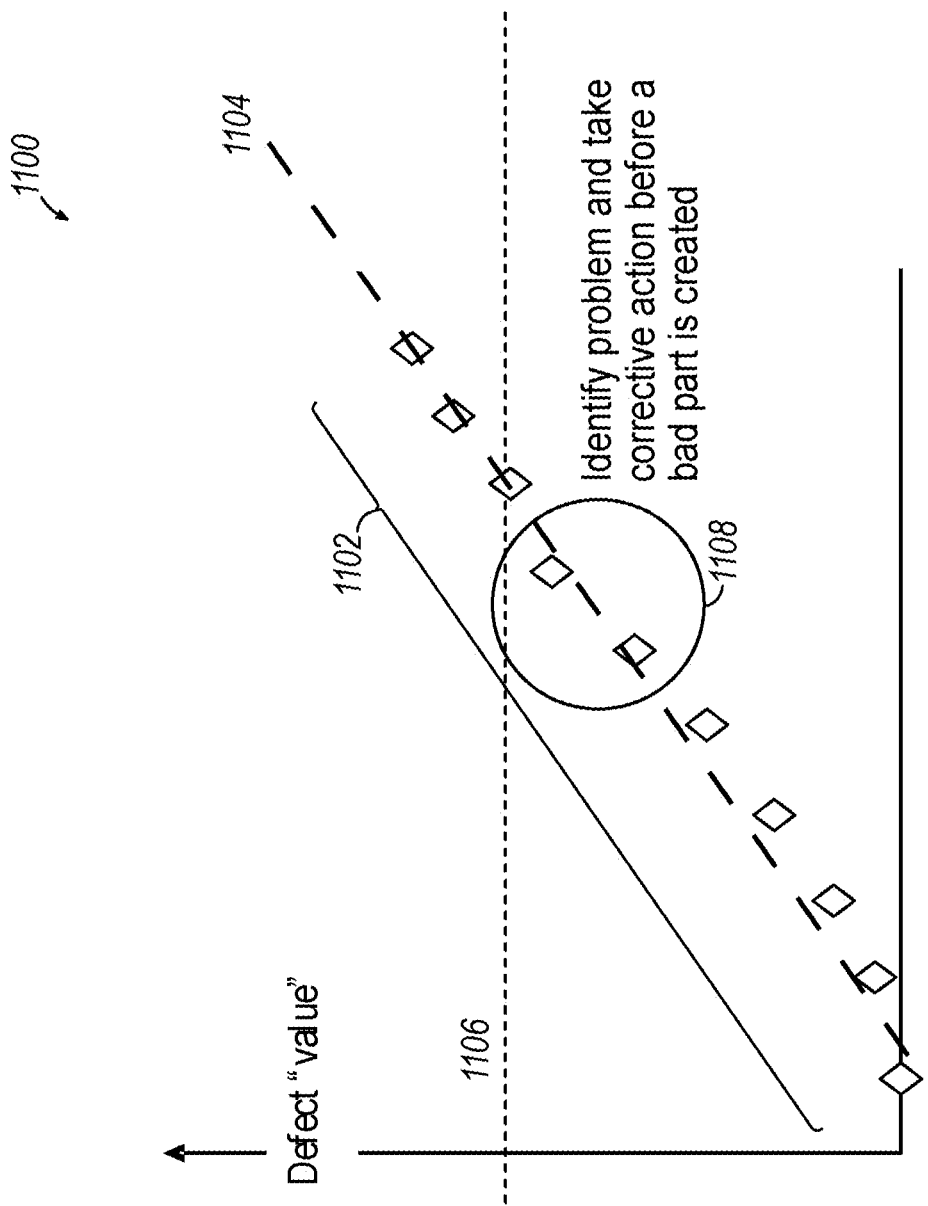
FIG. 43 is an example control chart for a manufacturing process that may be generated by the computing system and/or user device based on manufacturing data, NDE data, and/or quality related data associated with the manufacturing process.

FIG. 43 provides an example control chart 1100 that may be generated by the computing system 10 and/or user device 12 for a manufacturing process based at least in part on NDE data, quality related data, spatially correlated statistics, and/or manufacturing data associated with the manufacturing process. In this example, a plurality of spatially correlated statistics 1102 may be included on the control chart, where each spatially correlated statistic 1102 corresponds to a part of a type of part manufactured by the manufacturing process. Based on the spatially correlated statistics 1102, a manufacturing trend 1104 may be determined. As discussed, a baseline value and/or an acceptable range may be defined for a type of part, which in this example is represented by dashed line 1106. As shown, many of the spatially correlated statistics 1102 are acceptable based on the acceptable range 1106. Moreover, based on the manufacturing trend 1104, embodiments of the invention may be able to detect that the manufacturing process will begin producing unacceptable parts prior to actually manufacturing unacceptable parts (i.e., parts corresponding to the spatially correlated statistics 1102 that are above the acceptable range 1106). For example, the highlighted spatially correlated statistics 1108 may indicate parts in a sub-rejectable range, and embodiments of the invention may determine that the manufacturing process is not operating properly based at least in part on the trend 1104 and/or the highlighted spatially correlated statistics 1108, such that process adjustments may be made prior to the manufacture of unacceptable parts.

While the example illustrates a single control chart 1100 for a single spatially correlated statistic 1102 collected from each part, embodiments of the invention are not so limited. In general, embodiments of the invention may monitor a manufacturing process by collecting and monitoring a plurality of spatially correlated statistics for each part, where each spatially correlated statistic for each part may be included on a corresponding control chart. Therefore, embodiments of the invention may monitor a plurality of aspects of each part manufactured by a manufacturing process continuously. In some embodiments such monitoring may be substantially in real-time, such that developing and/or potential problems may be addressed in an efficient manner to reduce the production of unacceptable parts.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, one having skill in the art will appreciate that multiple filters may be used without departing from the scope of the invention. Moreover, one having skill in the art will appreciate that a plurality of datasets of NDE data from a plurality of portions of a plurality of parts may be processed without departing from the scope of the invention, and thus embodiments of the invention should not be limited to the modeling, monitoring, and analyzing examples disclosed herein.

Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method of modeling the manufacture of a type of part with a manufacturing process that includes at least one manufacturing step in a system including at least one processing unit and at least one memory, the method comprising:

receiving nondestructive evaluation (NDE) data associated with the type of part that corresponds to data collected during non-destructive evaluation of at least one particular part of the type of part;

aligning the NDE data to at least one corresponding simulated location on a simulated model of at least a portion of a part of the type of part; and associating manufacturing data with the simulated model, wherein the manufacturing data includes at least one of data indicating a manufacturing step of the manufacturing process, data indicating a manufacturing apparatus utilized in the manufacturing process, data indicating a manufacturing tool utilized in the manufacturing process, data indicating a process parameter of the manufacturing process, and data indicating evaluation equipment utilized in collecting the NDE data for a part manufactured by the manufacturing process;

wherein associating the manufacturing data with the simulated model includes associating the manufacturing data with at least one corresponding simulated location on the simulated model.

2. The method of claim 1, further comprising:
associating the manufacturing data with NDE data that is aligned to at least one particular simulated location.

3. The method of claim 2 further comprising:
analyzing NDE data that is aligned to the at least one particular simulated location and the associated manufacturing data and identifying a manufacturing step of the manufacturing process that is associated with the NDE data aligned to the at least one particular simulated location.

4. The method of claim 2 further comprising:
analyzing NDE data that is aligned to the at least one particular simulated location and the associated manufacturing data and identifying a manufacturing apparatus that is utilized in the manufacturing process associated with the NDE data aligned to the at least one particular simulated location.

5. The method of claim 2 further comprising:
analyzing NDE data that is aligned to that at least one particular simulated location and the associated manufacturing data and identifying a manufacturing tool that is utilized in the manufacturing process associated with the NDE data aligned to the at least one particular simulated location.

6. The method of claim 1, wherein the manufacturing data includes data indicating evaluation equipment that is utilized in collecting the NDE data during non-destructive evaluation of the at least one particular part, the method further comprising:
analyzing the NDE data and the aligned NDE data to determine whether the evaluation equipment utilized in collecting the NDE data is operating properly.

7. A method of analyzing a manufactured part of a particular type of part, wherein the manufactured part is manufactured using a manufacturing process that includes a plurality of manufacturing steps in a system including at least one processing unit and at least one memory, the method comprising:
aligning a non-destructive evaluation (NDE) dataset associated with the manufactured part to a simulated model of at least of a portion of a part of the particular type of part, including aligning NDE data associated with an area of interest on the manufactured part to at least one corresponding simulated location on the simulated model;
the NDE dataset corresponding to data collected during non-destructive evaluation of the associated manufactured part;

analyzing the aligned NDE data associated with the area of interest on the manufactured part and the at least one corresponding simulated location to determine whether the manufactured part includes a manufacturing defect that is associated with the area of interest;

aligning an indication of a determined manufacturing defect associated with an area of interest to at least one corresponding simulated location on the simulated model; and analyzing the aligned NDE data associated with the area of interest, the at least one corresponding simulated location of the aligned manufacturing defect on the simulated model, and the aligned manufacturing defect and determining at least one manufacturing step that is associated with the manufacturing defect on the manufactured part.

8. The method of claim 7, wherein analyzing the aligned NDE data associated with the area of interest on the manufactured part and the at least one corresponding simulated location includes determining a spatially correlated statistic for the area of interest for the manufactured part, and comparing the spatially correlated statistic to baseline data associated with the area of interest on the simulated model.

9. The method of claim 7, further comprising:
in response to determining that the manufactured part includes a manufacturing defect associated with the area of interest, analyzing the aligned manufacturing defect to determine a root cause problem associated with the at least one corresponding simulated location of the aligned manufacturing defect on the simulated model.

10. The method of claim 9, wherein analyzing the aligned manufacturing defect includes analyzing manufacturing data that is associated with the at least one corresponding simulated location of the aligned manufacturing defect on the simulated model; and the associated manufacturing data of the at least one corresponding simulated location of the aligned manufacturing defect including historical data for the type of part indicating any manufacturing defects associated with least one corresponding simulated location of the aligned manufacturing defect and any root cause problems that are associated with the manufacturing defects for the type of part.

11. The method of claim 7, further comprising:
identifying at least one manufacturing apparatus which is utilized in the at least one manufacturing step that is associated with the identified manufacturing defect on the manufactured part.

12. The method of claim 11, further comprising:
identifying at least one manufacturing tool which is associated with the manufacturing apparatus that is associated with the manufacturing defect on the manufactured part.

13. A method of monitoring the manufacture of a composite aircraft part of a particular type of composite aircraft part by a manufacturing process that has a system including at least one processing unit and at least one memory, the method comprising:
receiving a plurality of non-destructive evaluation (NDE) datasets, wherein each NDE dataset is associated with at least a portion of a manufactured composite aircraft part of the particular type;
each NDE dataset corresponding to data collected during non-destructive evaluation of the associated at least a portion of the manufactured composite aircraft part;

aligning the plurality of NDE datasets to a simulated model associated with the at least a portion of the particular type of composite aircraft part;

analyzing each aligned NDE dataset to determine at least one spatially correlated statistic for each composite aircraft part;

aligning each spatially correlated statistic to at least one corresponding simulated location on the simulated model; and analyzing the aligned spatially correlated statistics for at least a subset of the composite aircraft parts to determine a manufacturing trend associated with the manufacturing process based on the analyzed spatially correlated statistics.

14. The method of claim 13 further comprising:

analyzing the manufacturing trend and base line data that is associated with the at least one corresponding simulated location on the simulated model to determine whether the manufacturing process is operating properly.

15. The method of claim 14, further comprising:

in response to determining that the manufacturing process is not operating properly, determining a root cause problem associated with the manufacturing process based at least in part on the aligned NDE datasets.

16. The method of claim 13, wherein the spatially correlated statistic is one of average porosity, average thickness or average distance for a region of the at least a portion of a manufactured composite aircraft part of the particular type.

17. The method of claim 13, further comprising:

receiving manufacturing data associated with the manufacturing process for the particular type of part;

the manufacturing data including at least one of:

data indicating a manufacturing step of the manufacturing process associated with at least one physical location on the particular type of part, data indicating a manufacturing apparatus utilized in the manufacturing process associated with at least one physical location on the particular type of part, data indicating a manufacturing parameter of the manufacturing process associated with at least one physical location on the particular type of part, data indicating a manufacturing tool utilized in the manufacturing process associated with at least one physical location on the particular type of part, and data indicating at least one possible root cause problem of the manufacturing process associated with at least one physical location on the particular type of part; and associating the manufacturing data with the simulated model.

18. A method of monitoring the manufacture of a composite aircraft part of a particular type of composite aircraft part by a manufacturing process that has a system including at least one processing unit and at least one memory, the method comprising:

receiving a plurality of non-destructive evaluation (NDE) datasets, wherein each NDE dataset is associated with at least a portion of a manufactured composite aircraft part of the particular type;

each NDE dataset corresponding to data collected during non-destructive evaluation of the associated at least a portion of the manufactured composite aircraft part;

aligning the plurality of NDE datasets to a simulated model associated with the at least a portion of the particular type of composite aircraft part; and analyzing each aligned NDE dataset to determine at least one spatially correlated statistic for each composite aircraft part;

receiving manufacturing data associated with the manufacturing process for the particular type of part;

the manufacturing data including at least one of:

data indicating a manufacturing step of the manufacturing process associated with at least one physical location on the particular type of part, data indicating a manufacturing apparatus utilized in the manufacturing process associated with at least one physical location on the particular type of part, data indicating a manufacturing parameter of the manufacturing process associated with at least one physical location on the particular type of part, data indicating a manufacturing tool utilized in the manufacturing process associated with at least one physical location on the particular type of part, and data indicating at least one possible root cause problem of the manufacturing process associated with at least one physical location on the particular type of part; and associating the manufacturing data with the simulated model.

* * * * *